United States Patent
Yamakawa (12)

(10) Patent No.: US 6,184,860 B1
(45) Date of Patent: *Feb. 6, 2001

(54) IMAGE EDITING APPARATUS

(75) Inventor: Tadashi Yamakawa, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/313,397

(22) Filed: Sep. 27, 1994

Related U.S. Application Data

(63) Continuation of application No. 08/013,218, filed on Feb. 1, 1993, now abandoned, which is a continuation of application No. 07/590,491, filed on Oct. 1, 1990, now abandoned, which is a continuation of application No. 07/090,037, filed on Aug. 27, 1987, now abandoned.

(30) Foreign Application Priority Data

| Aug. 29, 1986 | (JP) | 61-201607 |
| Aug. 29, 1986 | (JP) | 61-201608 |
| Aug. 29, 1986 | (JP) | 61-201609 |
| Aug. 29, 1986 | (JP) | 61-201610 |
| Sep. 10, 1986 | (JP) | 61-201767 |
| Sep. 10, 1986 | (JP) | 61-201768 |
| Nov. 6, 1986 | (JP) | 61-262774 |
| Nov. 6, 1986 | (JP) | 61-262775 |
| Nov. 6, 1986 | (JP) | 61-262776 |

(51) Int. Cl.$^7$ .................................................. G09G 5/08

(52) U.S. Cl. .......................................... 345/146; 345/352

(58) Field of Search ..................................... 345/121, 125, 345/146, 157, 163, 168, 113, 126, 115, 352, 353, 434; 395/156

(56) References Cited

U.S. PATENT DOCUMENTS 4,586,035 * 4/1986 Baker et al. ......................... 340/712

(List continued on next page.)

FOREIGN PATENT DOCUMENTS

| 0100097 | 2/1984 | (EP) . |
| 0180902 | 5/1986 | (EP) . |
| 171120 | 2/1988 | (EP) . |

OTHER PUBLICATIONS

Lisa Draw, Apple Computer, Inc. 1983, pp. 98–103, 1–5.*
"Fundamentals of Interactive Computer Graphics" James D. Foley & Andries V. Dam, Addison–Weley Publication, 1982.*

(List continued on next page.)

* cited by examiner

Primary Examiner—Amare Mengistu
(74) Attorney, Agent, or Firm—Fitzpatrick, Cella, Harper & Scinto

(57) ABSTRACT

An image editing apparatus has a display screen such as a CRT screen on which are displayed or stacked a plurality of partial image elements so as to form an image of a desired illustration with a sense of depth. The apparatus has a memory for storing a plurality of the partial image elements, a pointing device such as a mouse for appointing a desired partial image element from amongst the partial image elements constituting the image, a first storage device for storing a group of the partial image elements which are under the partial image element appointed by the appointing means; and a second storage device for storing a group of the partial image elements which are overlaid on the partial image element appointed by the appointing means. The partial image element appointed by the appointing means is displayed after an editing operation at a position between the group of the partial image elements stored in the first storage device and the group of the partial image elements stored in the second storage device.

24 Claims, 47 Drawing Sheets

U.S. PATENT DOCUMENTS

| | | | | |
|---|---|---|---|---|
| 4,679,038 | * | 7/1987 | Bantz et al. | 345/113 |
| 4,686,522 | * | 8/1987 | Hernandez et al. | 340/709 |
| 4,689,616 | * | 8/1987 | Goude et al. | 345/113 |
| 4,698,625 | * | 10/1987 | McCaskill et al. | 340/709 |
| 4,821,211 | * | 4/1989 | Torres | 395/156 |
| 4,868,766 | * | 9/1989 | Oosterholt | 395/156 |
| 4,894,646 | * | 1/1990 | Ryman | 345/126 |
| 4,901,063 | * | 2/1990 | Kimura et al. | 345/115 |

OTHER PUBLICATIONS

"Interactive Information Retrieval System: Sub–Icon Selection", in IBM Technical Disclosure Bulletin, vol. 28, No. 12 (May 196), pp. 5395–96.

Grami et al., "Plazierungs– und Verdrahtungsalgorithmen bei Leiterplatten–Layout–Entwurf" in CAD/CAM–Rech. Konst. und Fert. (1982) 604:22.

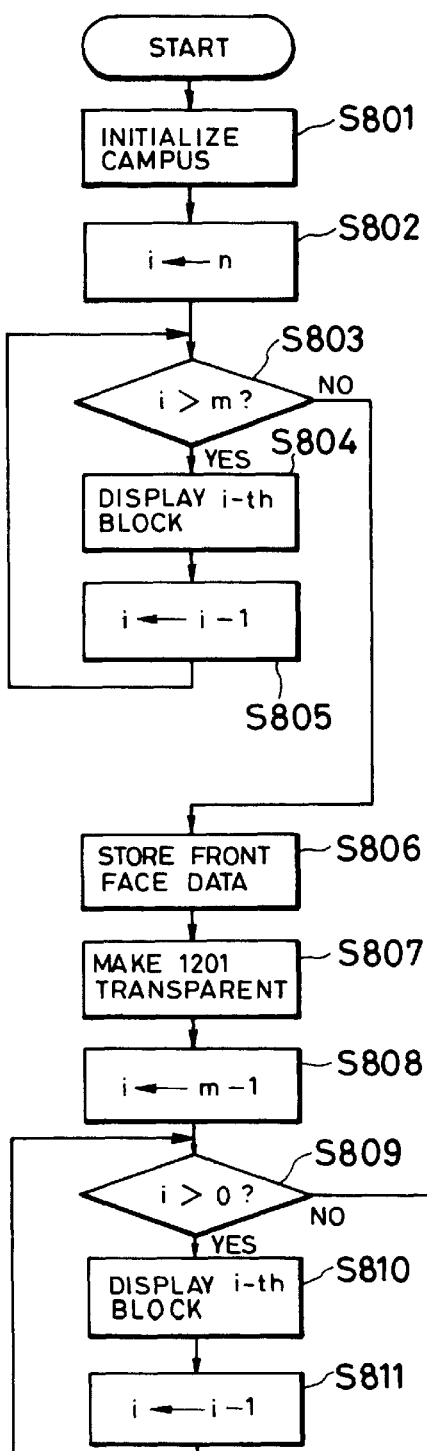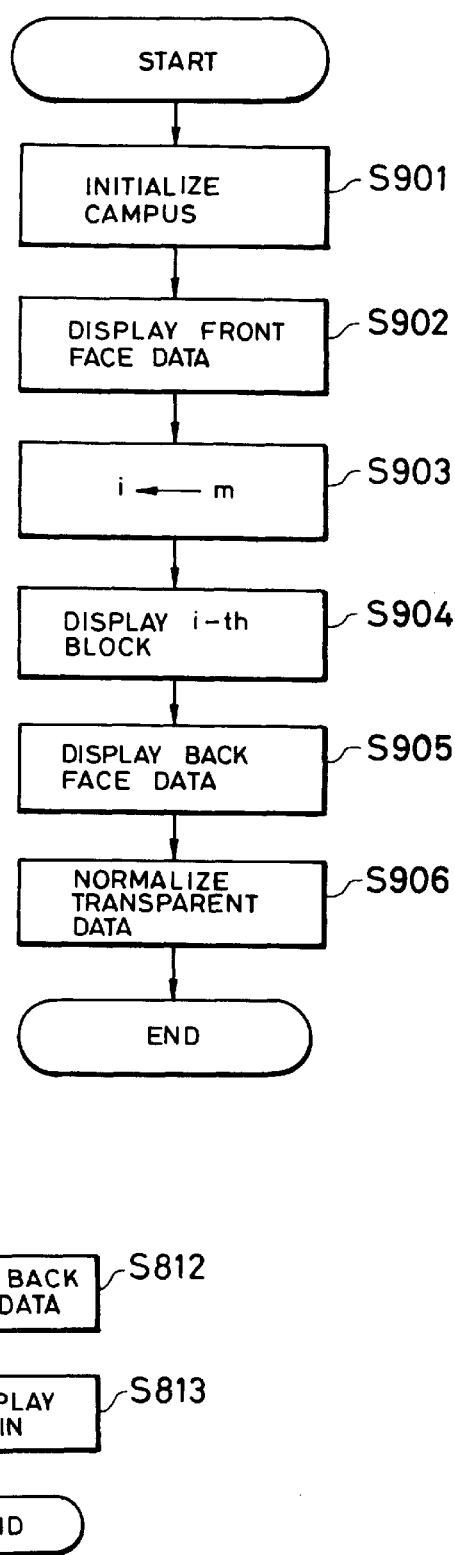

FIG. 20
| | 3010 | | |
|---|---|---|---|
| $e_1$ | MOUNTAIN ; | $x_1$ | $y_1$ |
| $e_2$ | MOUNTAIN ; | $x_2$ | $y_2$ |
| $e_3$ | PERSON ; | $x_3$ | $y_3$ |
| $e_4$ | ; | | |
| | | | |
| $e_n$ | ; | | |
3020　　　3030
FIG. 21A
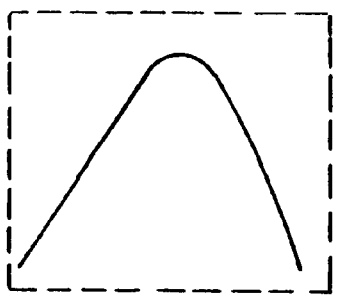
FIG. 21B
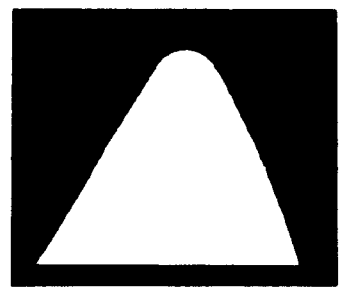

FIG. 25A
8010
FIG. 25D
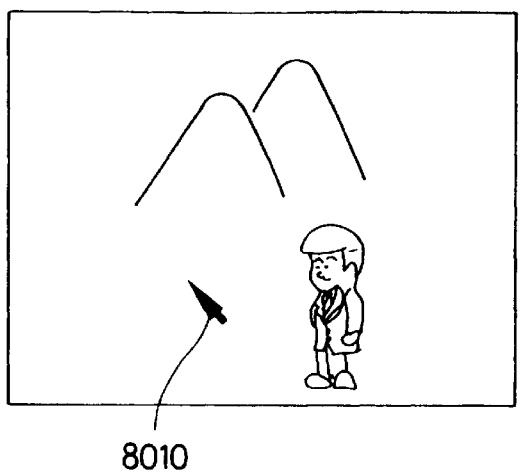
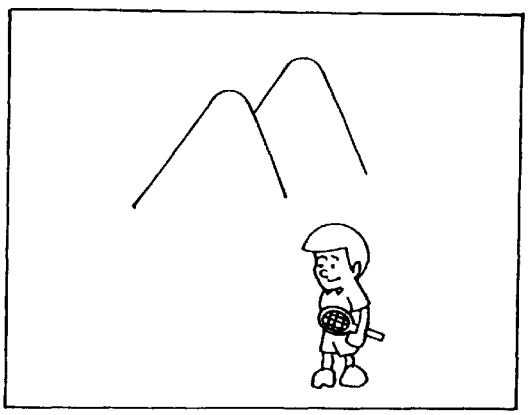
FIG. 25B
8010
FIG. 25E
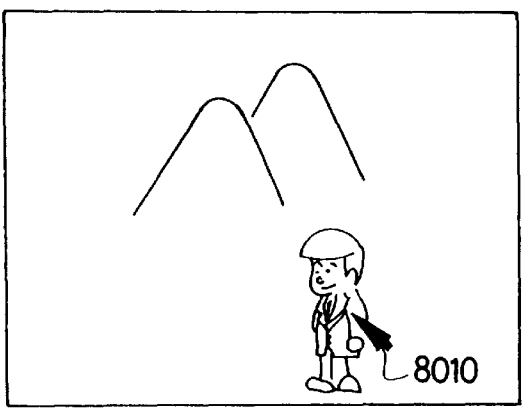
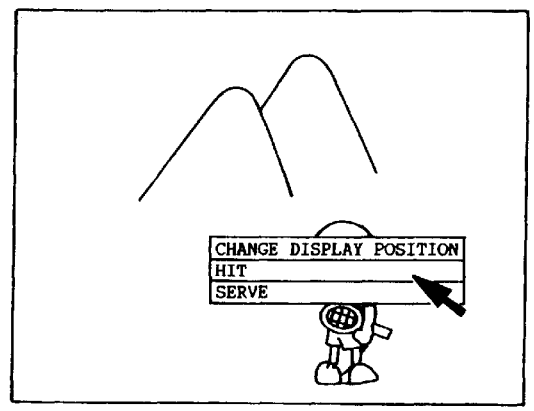
FIG. 25C
FIG. 25F
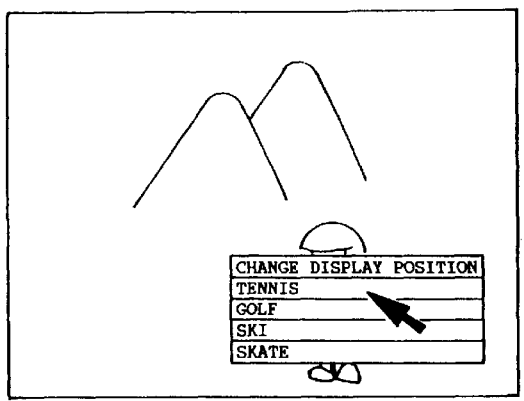
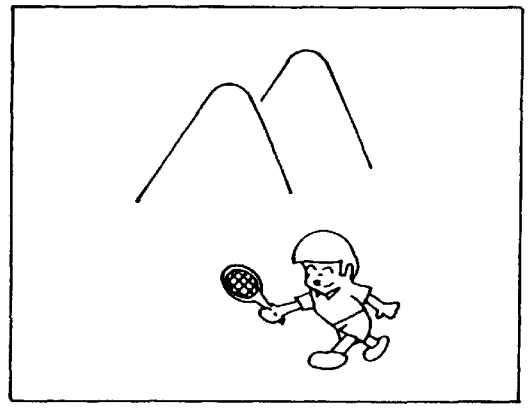

FIG. 28
| | 1101 | |
|---|---|---|
| $f_1$ | TENNIS; | PERSON 00; |
| $f_2$ | GOLF; | PERSON 01; |
| $f_3$ | SKI; | PERSON 02; |
| $f_4$ | SKATE; | PERSON 03; |
| $f_5$ | ; | |
| | | |
| $f_m$ | ; | |
1102   1103
FIG. 29
| | 3010a | |
|---|---|---|
| $e_1$ | MOUNTAIN; | $x_1$  $y_1$ |
| $e_2$ | MOUNTAIN; | $x_2$  $y_2$ |
| $e_3$ | PERSON 01; | $x_3$  $y_3$ |
| $e_4$ | ; | |
| | | |
| $e_n$ | ; | |
3020   3030
FIG. 30
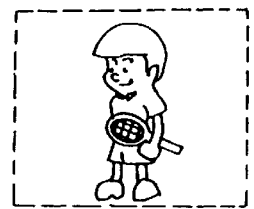
FIG. 31
| | 1401 | |
|---|---|---|
| $f_1$ | HIT; | PERSON 04; |
| $f_2$ | SERVE; | PERSON 05; |
| $f_3$ | ; | |
| | | |
| $f_m$ | ; | |
1402   1403
FIG. 32
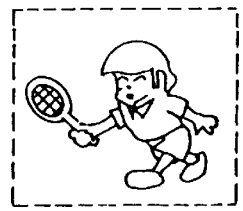

FIG. 50
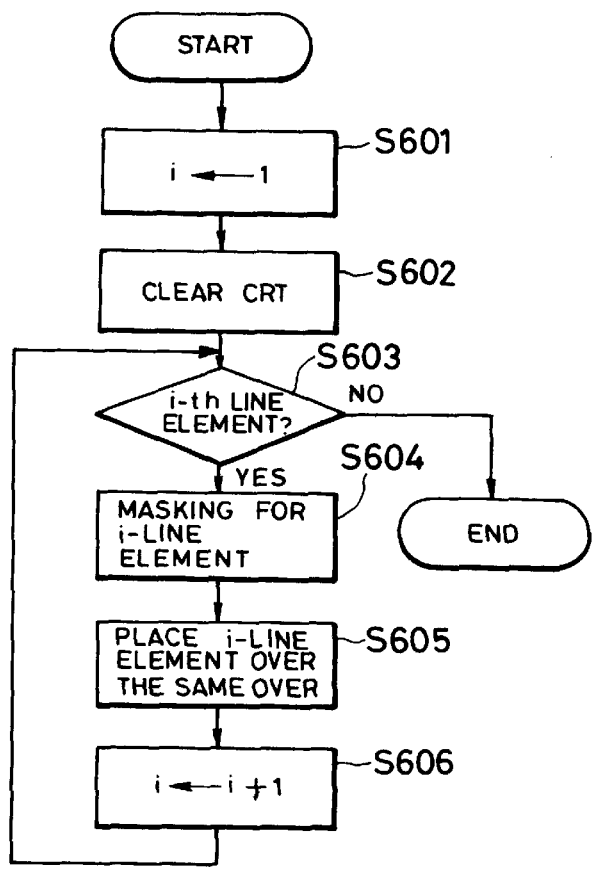
FIG. 51
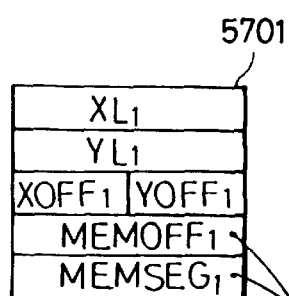
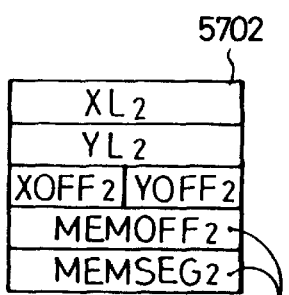
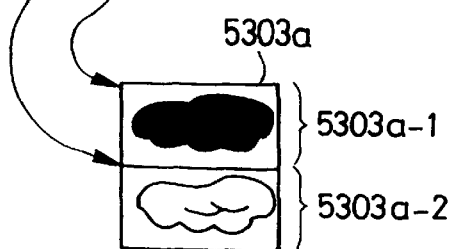
FIG. 52
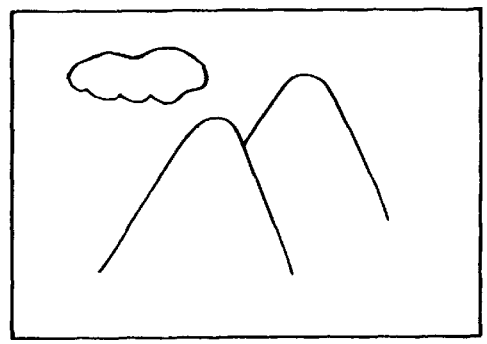

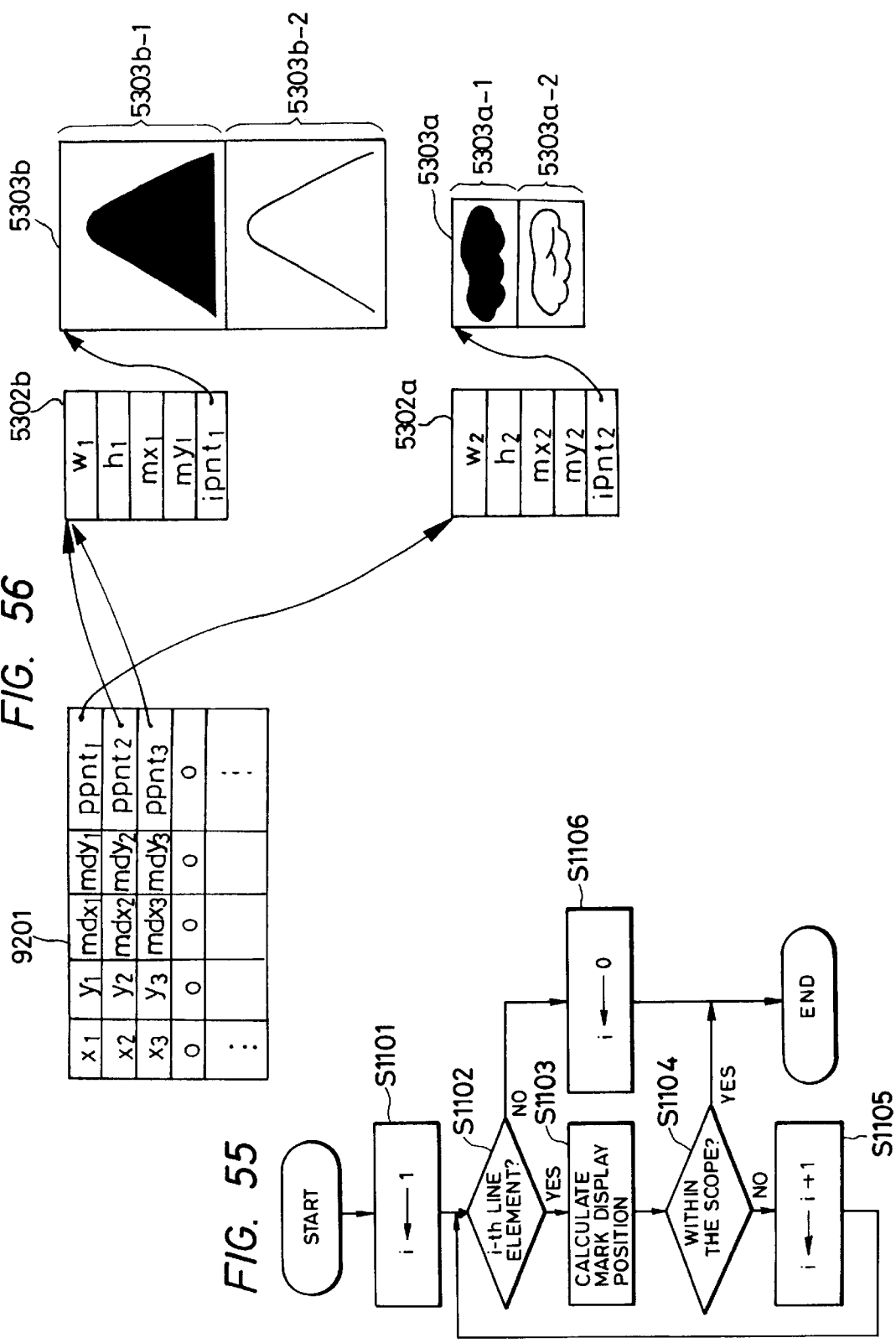

FIG. 57A
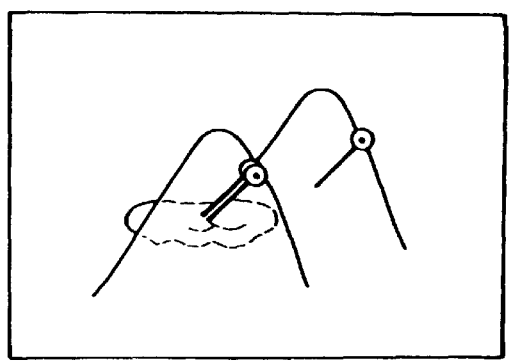
FIG. 57B
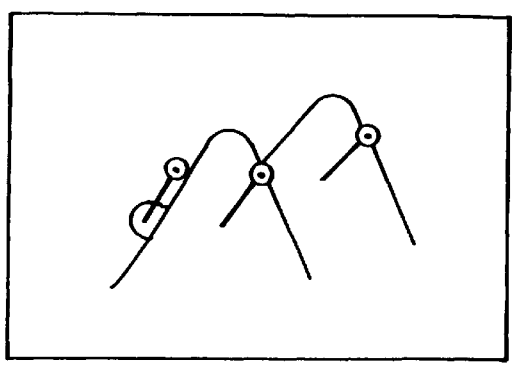
FIG. 58
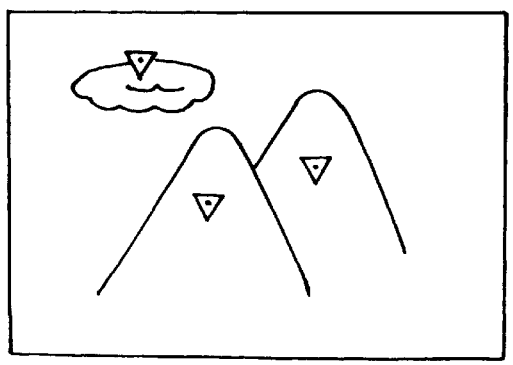
FIG. 59
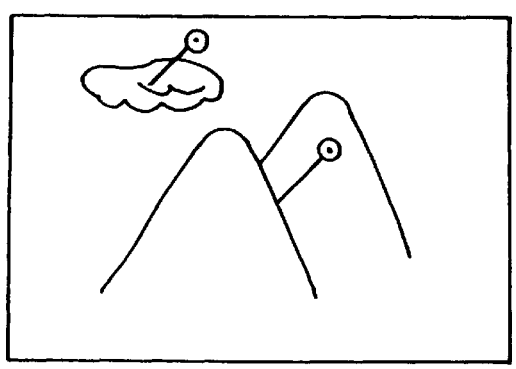

FIG. 64
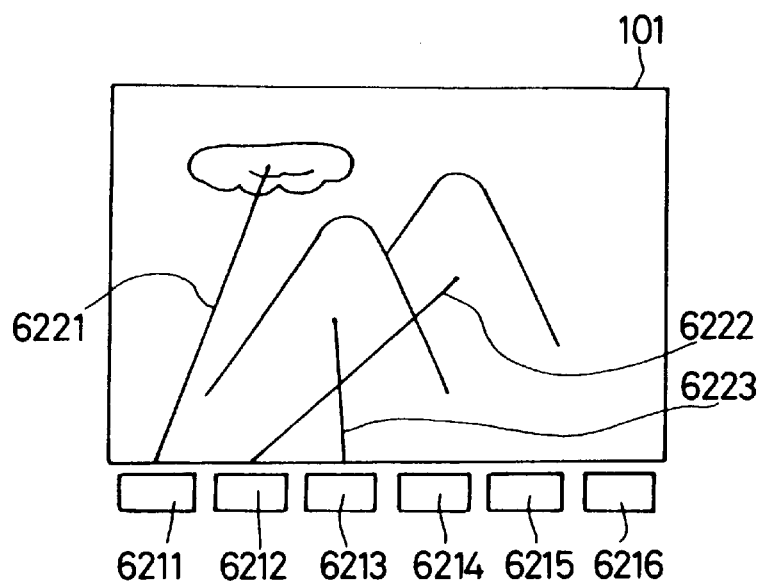
FIG. 66
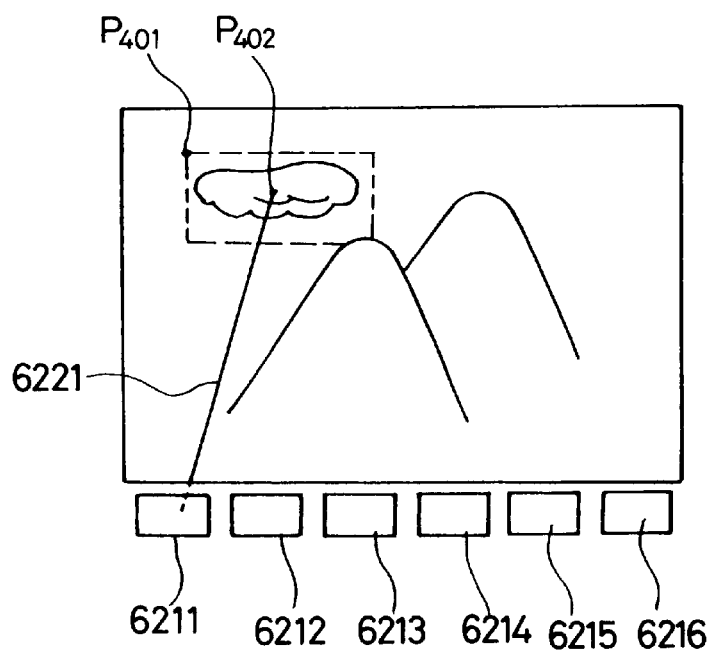
FIG. 67

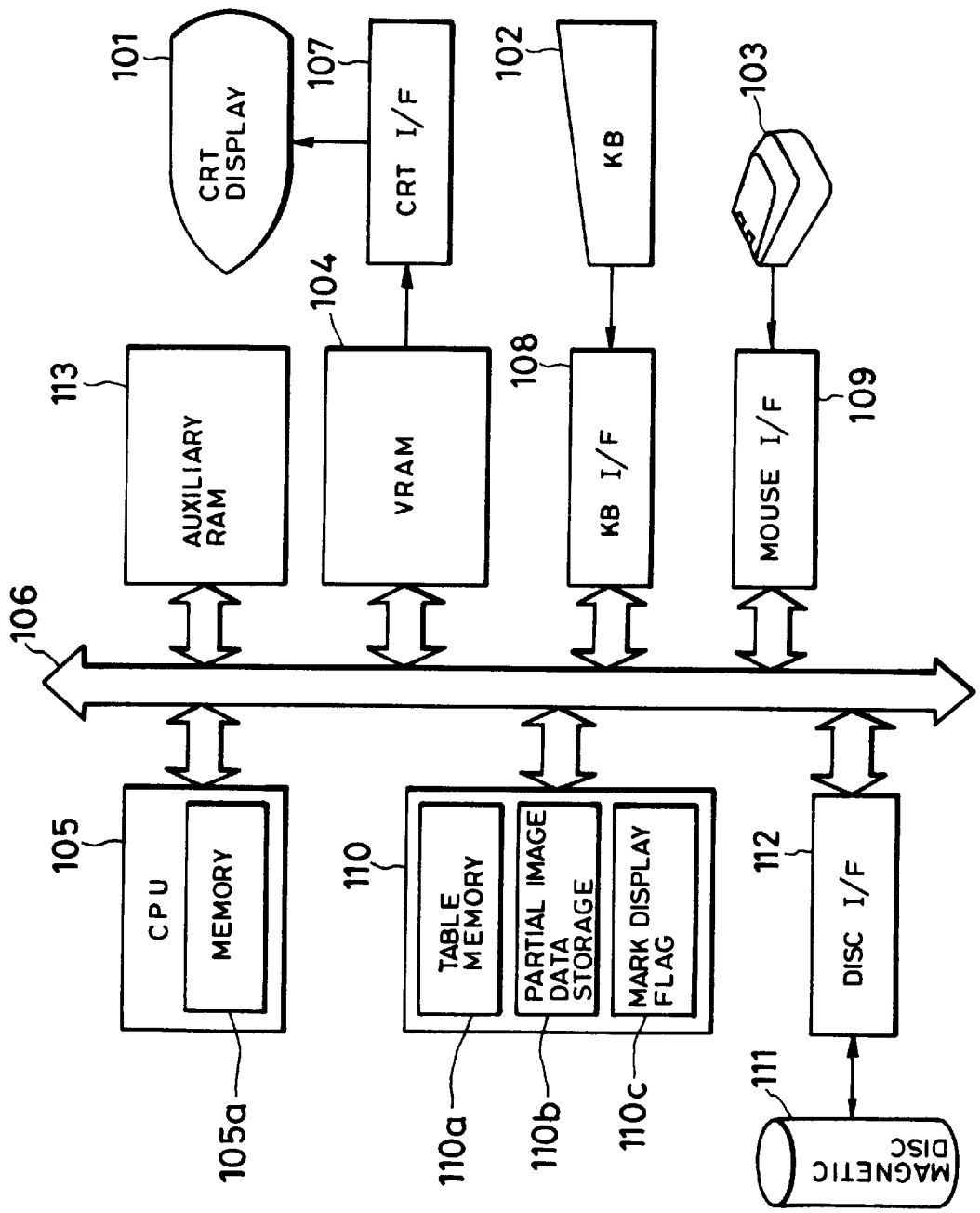

IMAGE EDITING APPARATUS

This application is a continuation of application Ser. No. 08/013,218 filed Feb. 1, 1993, which was a continuation of application Ser. No. 07/590,491, filed Oct. 1, 1990, which was a continuation of application Ser. No. 07/090,037, filed Aug. 27, 1987, all now abandoned.

BACKGROUND OF THE INVENTION

1. Field of the Invention

The present invention relates to an image editing apparatus and, more particularly, to an image editing apparatus which enables an operator to efficiently process and edit various images such as the image of a cut-in illustration, a pattern and so forth.

2. Related Background Art

The current progress in the field of word processors has enabled everybody to produce clean documents with a high degree of printing quality which well compares with that of conventional type printing. This in turn has given a rise to the demand for a facility which enables the user to edit documents together with pattern data such as of cut-in illustrations or figures.

A typical known system for editing pattern images together with document images incorporates drawing commands corresponding to a multiplicity of basic patterns or partial figure data such as a dot, a straight line, a circle, polygons and so forth, and the user drafts the illustration or drawing by making selective use of such drawing commands.

Edition of a portion of an illustration which has been formed already, requires a suitable editing operation such as deletion, movement and replacement of one of the elements of the illustration. Such an editing operation requires processing the whole of the illustration with the result that the operator is burdened heavily, even if only a part of the illustration is to be edited.

To explain in more detail, it is often required that a document, e.g., a letter, contain an illustration which enables the reader to recognize the content at a glance, as in the case of Christmas cards which usually have various attractive illustrations representing greetings. Such an illustration can be formed, in the known system, by suitably combining a plurality of illustration elements. The formation of a complicated illustration often requires that one or more illustration elements be superposed one on another, and there often is a need to edit only the underlying (or inner) element(s) amongst the superposed elements.

It will be very helpful and editing efficiency will be improved appreciably if the operator is allowed to select only the underlying or inner element and to confirm that such element has been selected.

Unfortunately, however, there has been no apparatus having an editing function capable of meeting such a demand.

It is to be pointed out also that the formation of a desired illustration by means of the drawing commands mentioned before requires a high level of skill and, hence, can be conducted only by well-trained persons.

In recent years, there has been remarkable progress in the field of apparatus for forming and editing patterns and images. A typical one of these apparatus makes use of a plurality of pattern elements and the operator forms a desired illustration by suitably selecting and positioning such pattern elements. In some of the apparatus of this type, when there is a need to edit of only one element of the illustration which has been formed already, the operator is required to appoint or select only the pattern element to be edited and to effect the desired editing operation such as correction or movement by a suitable means such as a coordinate input device (digitizer) or a keyboard. This editing operation can be conducted without substantial difficulty provided that the pattern elements are isolated discretely from each other. However, when one or more pattern elements are superposed or arranged in the close proximity to one another, the problem is encountered that, when the operator appoints one of these elements, the apparatus contrary to what is needed by the operator, selects another element superposed on or adjacent to the designated element.

When one of the illustration elements of an illustration image on a display of the apparatus is to be edited or corrected, it is necessary that such illustration element be appointed correctly. In most cases, the appointment of such a specific illustration element is conducted by moving a movable graphic cursor to the position of the designated illustration element in the image displayed on a display device by a suitable coordinate input means such as a mouse or a digitizer, and then inputting an appointing signal by means of a suitable key such as a key provided on a mouse.

This method of appointing a specific illustration element is disadvantageous in that it often fails to enable the operator to recognize which one of the illustration elements has been actually pointed out through a visual check of the image on the display device. In addition, it is not easy correctly to position the graphic cursor to the designated illustration element, particularly when the element has an extremely small size.

A typical example of the known methods for forming a desired illustration by combining a plurality of partial picture data, i.e., illustration elements, will be described hereinbelow.

FIG. 11 is a block diagram showing a typical example of known system for forming and editing illustrations.

The system has a CRT display 1101 on which are displayed various data such as characters, figure patterns and bit patterns. Input of data in the form of characters is conducted through a keyboard, while a mouse 1103 is used as a pointing device for pointing a desired position on the display and for selecting desried item in a menu on the display. The control and processing of the input and output signals are conducted by a microprocessor (referred to as "CPU", hereinunder) 1105 which is connected to the display and the input means though a bus via a crt interface 1107, keyboard interface 1108 and a mouse interface 1109. Programs and data to be used in the processing by the CPU are stored in a main memory 1110 or in a magnetic disk 1111. The main memory 1110 is directly connected to the BUS 1106, while the magnetic disk 1111 is connected to the BUS 1106 through a disk interface 1112.

The partial picture data or the illustration elements representing the basic patterns from which illustrations are to be synthesized are stored before-hand in the main memory 1110 or the magnetic disk 1111. In operation, the partial picture data are transferred to the display while logical computation is conducted with these data in connection with the display, whereby the image of the desired image is synthesized and displayed.

In general, the data displayed on the display is stored in the form of a V-RAM (video RAM) in the memory and is read through the CRT interface 1107 in synchronism with the display on the CRT 1101 so as to be displayed on the display.

The writing of data in V-RAM in the CPU 1105 may be conducted directly or indirectly by sending a command to the CRT interface 1107, and which one of these two types of writing is used does not matter in the present invention.

FIG. 12 shows an example of an illustration formed by synthesizing a plurality of partial picture data. The broken lines in this Figure are not actually displayed but are shown in this Figure for the purpose of showing the regions.

The rectangle shown by a broken line and including a point $P_0$ on the upper left corner thereof, represents the frame of the display for displaying the illustration. The illustration is composed of a plurality of partial picture data having the respective rectangular regions identified by points $P_1$ to $P_5$ on their upper left corners. This illustration is formed by conducting memory allocation and content in a manner shown in FIG. 13. More specifically, the number n of the partial picture data is stored in a memory region 1301. In the illustrated embodiment, the number "5" is stored because the illustration is composed of five partial picture data. A reference numeral 1302 designates an image structure table which is composed of a plurality of display position defining blocks 1302-1 to 1302-n (n being 5 in this case) for defining the positions at which the respective partial pictures are to be displayed. Each display position defining block 1302-i has regions $x_i$ and $y_i$ for storing the x and y coordinates values of the position where the associated partial picture data is to be displayed, a region $DOFF_i$ for storing the initial address of the partial data defining table 1303-i identifying the partial picture data and a region $DSEG_i$ for storing the segment address of the partial data defining table 1303-i. The offset address and the segment address are concepts which are used when there is an ample storage capacity (64 K bytes unit), and a specific address is generated by means of these two addresses.

As will be seen from FIG. 13, each partial data defining table 1303-i has regions for indicating two partial picture data. The first region is for defining the non-transparency definition data 1304-i of the partial picture data, while the second region is for defining display definition data 1305-i. That is, the fourth and fifth words (each word being constituted by two bytes) indicate the initial address where the non-transparency definition data 1304-i is stored, while the ninth and tenth words indicate the initial address of the display definition data 1305-i. The contents of each data definition table 1303-i are shown by 1401 in FIG. 14. As stated before, the initial address of the image data storage region 1402 is stored as the offset address and the segment address at the fourth word (MEM-OFF) and the fifth word (MEM-SEG). The first to third words are used to denote the types of the image data storage area. More specifically, a number which is "word number minus 1", the word number representing the lateral length of the image data with each word having 16 bits, is stored in the region X–L. At the same time, a number which is given by "line number minus 1", the line number representing the vertical length of the image data, is stored in the region Y–L. The sequence of storage of data is determined by conducting lateral scanning along each line starting with the word data containing the left end in a word-by-word fashion over a distance corresponding to (X–L+1) and then commencing scanning of the next line. Thus, the lateral scanning is conducted in a word-by-word fashion. In order to convert the scanning data into dot-based data, S-OFF and E-OFF regions are used in the following manner. The bit Number of the first effective bit in the left-end word and the bit Number of the last effective bit in the right-end word are stored in the regions S-OFF and E-OFF, respectively. The Numbers of the left end bit and the right end bit of each word are represented by 0 (LSB) and 15 (MSB), respectively.

It is assumed here that the black circle shown in FIG. 15 is to be defined as image data of a size given by NH words in the lateral direction and NV lines in the vertical direction, and also that NS dots from the left end and NE dots from the right end constitute unnecessary data, while the central portion (i.e., the portion not including these end dots) constitute the defining rectangular region, and therefore (NH–1) and (NV–1) are set in the regions X–L and Y–L, respectively, while (NS–1) and (15-EN) are set in the regions S-OFF and E-OFF, respectively.

In this case, the value "1" in the non-transparency definition data 1304-i corresponds to "black", while "0" corresponds to "white". Similarly, "1" and "0" in the display definition data 1305-i correspond to "black" and "white", respectively.

FIG. 16 shows a typical example of a control flow suitable for forming the image (pattern) shown in FIG. 12.

In Step S 1601, whole image data, i.e., the whole area of the frame of display, is cleared. That is, an operation is conducted to turn the whole area in the rectangle 1201 into white.

In Step S 1602, "1" is substituted for i as the initial value, and an increment of i one by one is conducted in Step S 1606. Then, in Step S 1603, a comparison is conducted between the number n of the partial picture data stored in the memory region 1301 and the number i after the increment. When i is equal to or below n, steps S 1604 and S 1605 are followed repeatedly. More specifically, in Step S1604, the non-transparency definition data 1304-i is extracted from the image constitution table with reference to the i-th display definition block and a process is conducted for "cutting out" this data.

More specifically, the non-transparency definition data 1304-i is read out and the developing position $P_i$ is computed on the basis of the values in the regions $x_i$ and $y_i$ in the i-th display definition block. Then, the non-transparency definition data 1304-i read out from this position is inverted and the logical product (AND) of the inverted data and the display frame is obtained. Although the black portions and white portions of the non-transparency definition data 1304-i are represented by "1" and "0", respectively, this is not exclusive and the black and white portions may be represented by "0" and "1", respectively. In such a case, it suffices only to compute the logical product of the non-transparency data 1304-i and the display frame which is inmost cases a V-RAM. Anyway, the above-explained process enables the region on which the partial picture data to be displayed is going to be written (a part or the whole of the partial picture data which was displayed immediately before this operation) to be changed into white blank.

In Step S 1605, the partial picture data 1305-i stored in the position defined by the segment address MEM-SEG and offset address MEM-OFF is read in the white blank position $P_i$ which has been turned into white blank in Step S 1604, and an arithmetic operation is conducted to determine the logical sum (of the read out partial picture data 1305-i and the white blank position). In consequence, only the portion of the partial picture data represented by black is displayed on the same display region.

More specifically, assuming here that data as shown in FIG. 13 have been stored, and assuming here that the coordinates positions of the points $P_1$ to $P_5$ are given by $(x_1, y_1)$ to $(x_5, y_5)$, a horizontally elongated circle is first cut out (but no substantial change takes place because the display frame has been cleared), and the contour of the horizontally-elongated circle is drawn. When this elongated circle is read, the number i is "1". In the next cycle, i.e., when the number i is "2", a diamond-shaped portion is cut-out by the non-transparency definition data 1304-2, with the point $P_2$ positioned at the left upper corner of the rectangle. In consequence, a diamond-shaped white blank is formed near the right end of the horizontally elongated circle, with a portion of the diamond placed on the elongated circle, as if the white-blanked elongated hole were placed under or inside the white-blanked diamond. When the third partial picture data is read, since the non-transparency data 1304-3 is black only on the outer periphery of a circle, only the circumference of the circle is cut out and is superposed because the surface definition data 305-3 is the same. In consequence, a black circle surrounding a circular white blank is displayed as if superposed on the horizontal elongated circle and the diamond. A white blank square and a white blank trapezoid are displayed in the same manner in sequence. Since the circle in the trapezoid is white in terms of the non-transparency definition data while the triangle in the same is black, the triangle in the trapezoid is shown as a white blank while the circle is shown as a transparent circle through which the underlying portion of the square is visible.

An example of the image forming process has been described, in which the image to be obtained is formed by superposing five partial picture data. Practically, however, drafting of a desired image or illustration requires a good deal of partial raster image data and geometric basic patterns to be assembled together.

It will be seen that a desired figure or illustration is formed on a display screen such as that of a CRT as if a plurality of pieces of configured paper sheet cut out by scissors were glued one on another to form the desired figure. When this "patching" operation has proceeded to a certain degree, it is difficult to alter the partial picture data which is on the "inner or deeper side" of the frame, i.e., which is overlain by a plurality of partial data. The alteration of such a image data, however, will be conducted without difficulty provided that data concerning the sequence of the "patching" of a plurality of partial picture has been stored. With such data, the operator temporarily stops the operation and starts the "patching" operation from the beginning so that he can easily access to the desired partial picture data to effect the required alteration.

This operation, however, requires that the "patching" on the display be commenced from the beginning each time the correction or the alteration is conducted. This operation is laborious, particularly when only a specific partial picture data is to be moved while other, superposed data are to be kept unmoved. In such a case, the designated partial picture data has to be moved bit by bit, requiring building up of the final image after each movment for the purpose of visual check of the final image after each movement. Thus, the operator is required to appoint the specific partial picture data, move the data over s small distance, and wait for the building up of the final image and to repeat these operations until the desired final image is obtained. This operation is quite time-consuming and seriously impairs the efficiency of the editing operation.

SUMMARY OF THE INVENTION

Accordingly, an object of the present invention is to provide an image editing apparatus which provides, when the operator has selected one of a plurality of partial picture data constituting an illustration or the like, means for clearly identifying the selected partial picture data, thereby enabling the operator to easily draft and edit the illustration even when he or she is not so highly trained in the manipulation of the apparatus, thereby overcoming the above-described problems of the prior art.

Another object of the present invention is to provide an image editing apparatus which enables even those who are not so familiar with this type of apparatus easily to conduct drafting and editing of illustrations.

A further object of the present invention is to provide an image editing apparatus which enables the operator to select the designated partial picture data without fail.

A still further object of the invention is to provide an image editing apparatus in which a masked partial picture data is selected automatically, thereby enabling the operator to select the designated partial picture data without fail.

A still further object of the present invention is to provide an image editing apparatus in which operability concerning the edition of one or more of partial picture data or illustration elements constituting an illustration is improved.

A still further object of the present invention is to provide an image editing apparatus which enables the operator to easily appoint the designated one of a plurality of partial picture data on display and which can clearly identify the object of the edition.

BRIEF DESCRIPTION OF THE DRAWINGS

FIG. 8 is a flow chart of a process for storing a group of partial picture data conducted when a specific partial picture element is appointed in the apparatus shown in FIG. 7;

FIG. 9 is a flow chart showing the process for displaying an image;

FIG. 20 is an illustration of the image constitution table;

FIG. 21A is an illustration of an example of partial picture data constituting an illustration of a "mountain";

FIG. 21B is an illustration of a masking data of the partial picture data in the partial picture data shown in FIG. 21A;

FIGS. 25A to 25 F are illustrations of movements of the display screen;

FIG. 28 is an illustration of a table of editing items;

FIG. 29 is an illustration of a image constitution table;

FIG. 30 is an illustration of partial picture data constituting an illustration of a person playing tennis;

FIG. 31 is an illustration of an editing item table;

FIG. 32 is an illustration of partial picture data constituting an illustration of the person shown in FIG. 30 hitting a ball;

FIG. 50 is a flow chart illustrating the process for explaining the process of display of partial image;

FIG. 51 shows the relation between the partial image table and the partial image pattern when the partial image "cloud" is actually realized using conventional hardware;

FIG. 52 is an illustration of the relationship between the partial image table and partial image pattern when the partial image "cloud" is realized by existing hardware;

FIG. 55 is a flow chart illustrating what partial image data is appointed by the graphic cursor;

FIG. 56 is an illustration of the relationship between a illustration constitution table and partial image in a different embodiment of the invention;

FIGS. 57A and 57B are illustrations of the position of marks;

FIG. 58 is an illustration of a state in which the display of marks is zero;

FIG. 59 is an illustration of an example of display of marks in a state in which a single partial image is formed by two pictures;

FIG. 64 is an illustration of state in which leaders are used for the respective partial images;

FIG. 66 is an illustration of a state in which a leader is used for a partial image "cloud";

FIG. 67 is an illustration of a function key coordinates table;

FIG. 75 is a block diagram of a process performed in a different embodiment of the image editing apparatus of the present invention;

DESCRIPTION OF THE PREFERRED EMBODIMENTS

Figure 1:
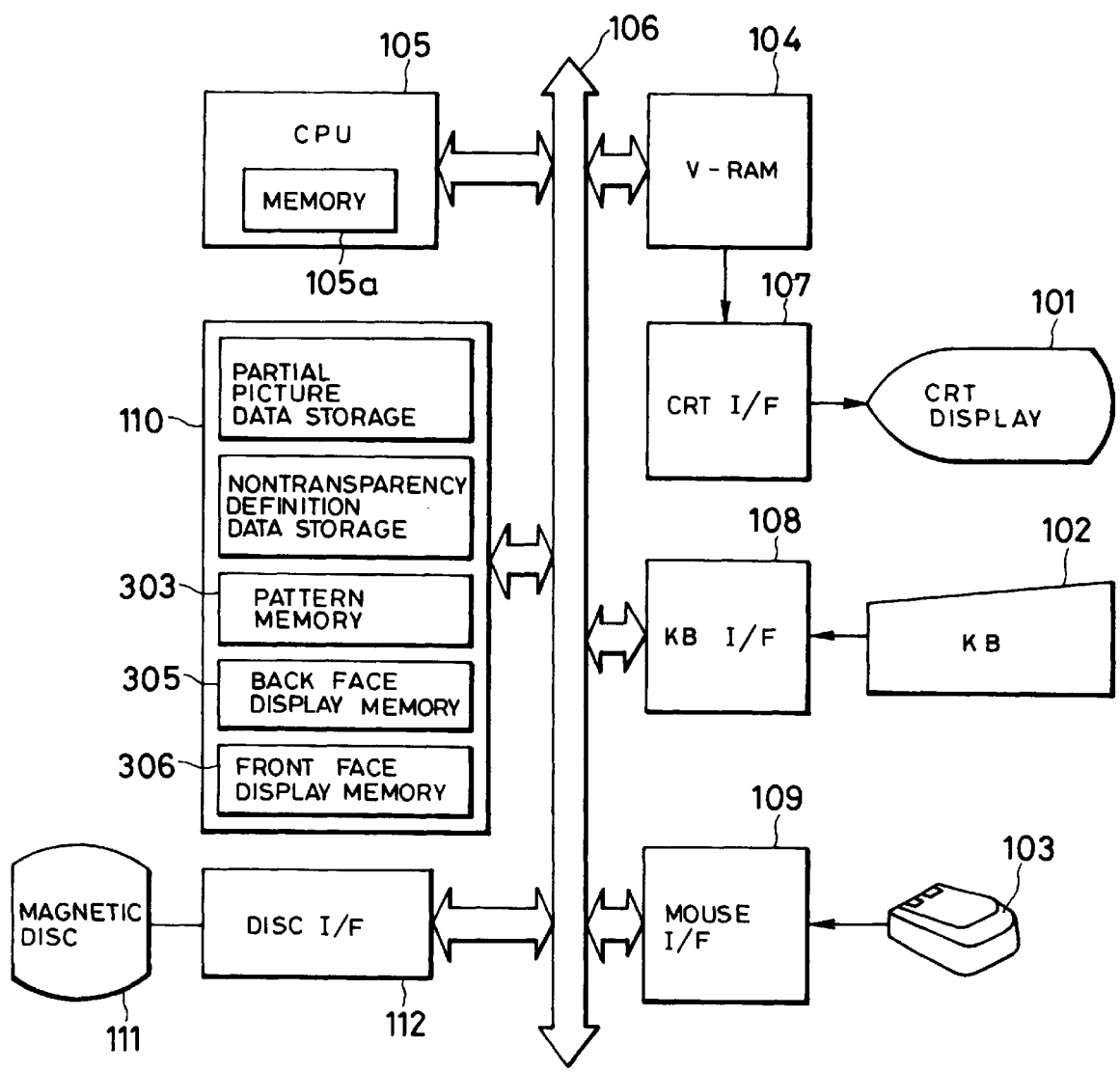
FIG. 1 is a block diagram of an image editing apparatus embodying the present invention.

The preferred embodiments of the present invention will be described hereinunder with reference to the accompanying drawings. In the following description, the same reference numerals are used to denote the same parts or members as those used in the preceding description of the prior art.

[Process for Storing Group of Partial Picture Data]
(FIGS. 1 to 3, 5A to 5I)

FIG. 1 is a block diagram of an image editing apparatus embodying the present invention.

Referring to FIG. 1, the image editing apparatus has a CPU 105 adapted for controlling the whole apparatus. The CPU 105 is adapted for executing programs stored in the internal memory 105a. A reference numeral 110 denotes a memory which has a partial picture data storage section for storing a plurality of partial picture data for constituting images, a non-transparent definition data storage section for storing non-transparent definition data which masks superposed region of a plurality of partial picture data when the data are displayed, a pattern memory 303, a back face memory 305 and a front face memory 307. These memories 303, 305 and 307 will be detailed later.

Figure 2:
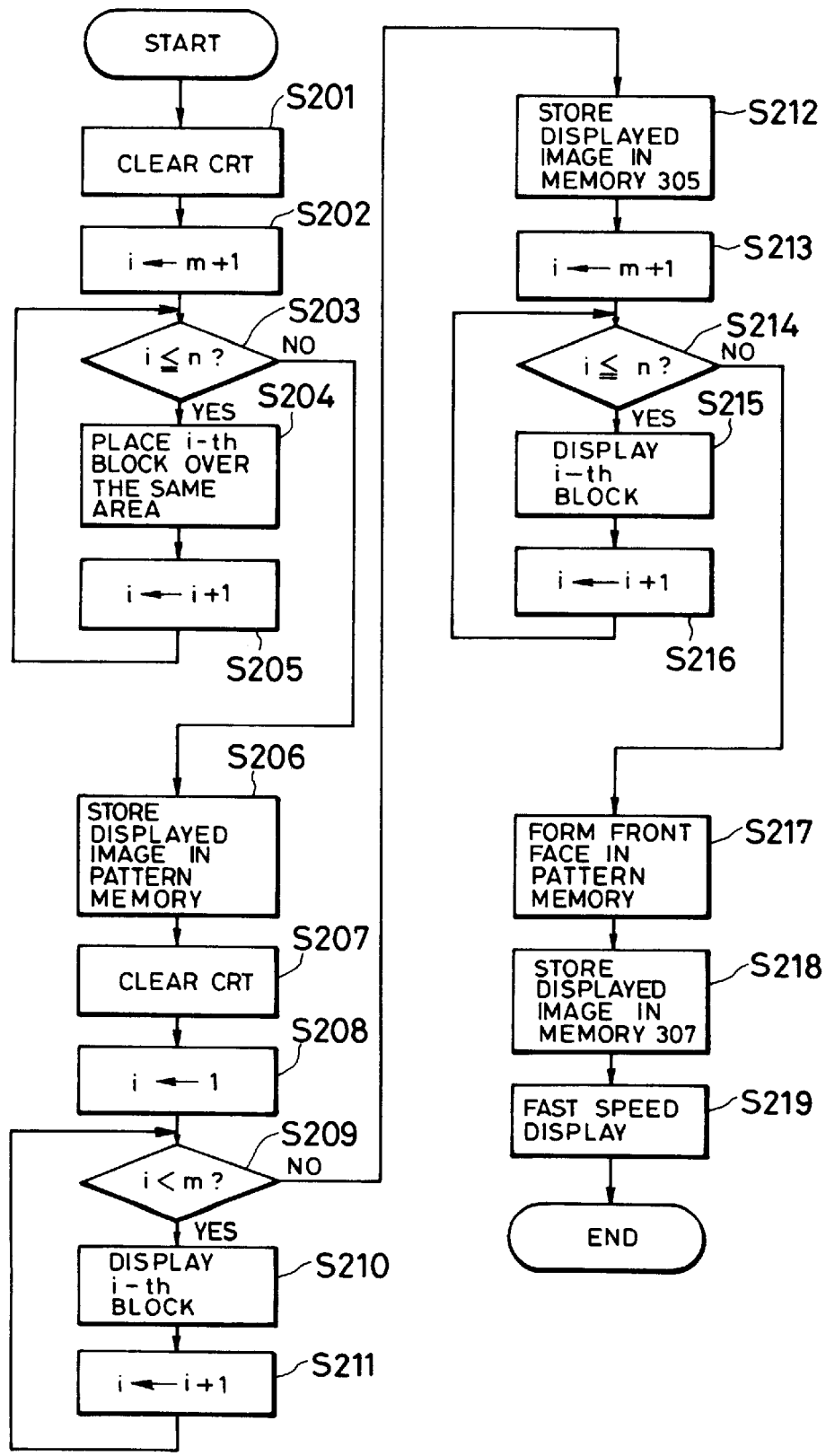
FIG. 2 is a flow chart illustrating the process of storage of a group of partial picture data conducted when a specific partial picture data is appointed.
Figure 3:
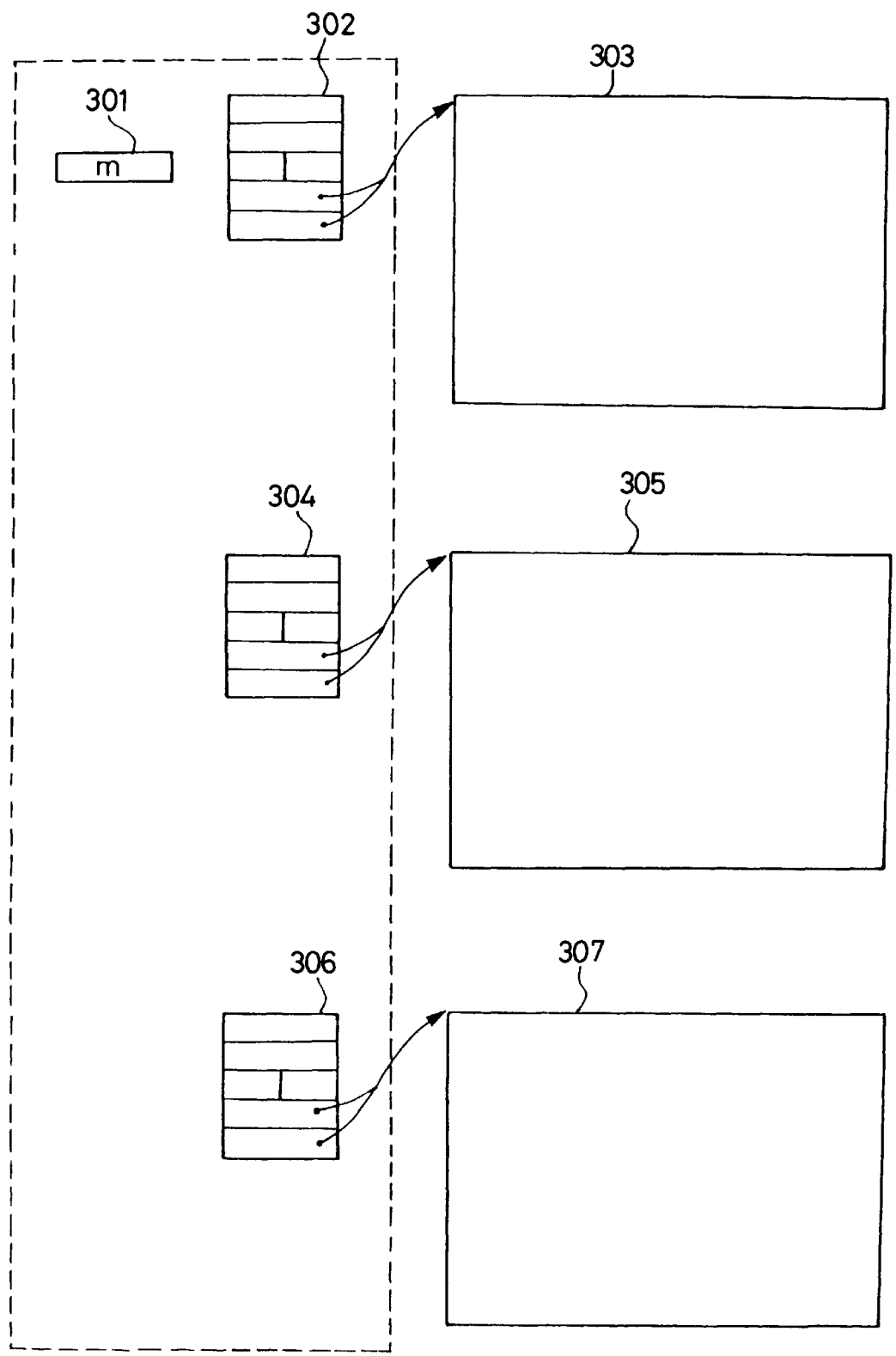
FIG. 3 is an illustration of a pattern memory, back face memory and a front face memory which are stored by the process shown in FIG. 2.

FIG. 2 is a flow chart showing the process for storing a group of partial picture data in this embodiment, while FIG. 3 shows allocation of the memories 303, 305 and 307. The process of the flow chart shown in FIG. 2 is stored in the memory 105a. This process is conducted when one of the partial picture data constituting an image formed on the CRT display 101 is appointed by a mouse 103.

In Step S 201, the display on the CRT display is cleared and the rectangular region on which an illustration is to be formed is changed into white blank. This Step S 201, therefore, is the same as Step S 1601 explained before in connection with FIG. 16. In Step S 202, a value which is obtained by adding "1" to the Number m of the partial picture data as the object of editing is substituted for the value i. The partial picture data as the object of the is selected by moving the graphic cursor to the position of this partial picture data by means of a mouse 103 and then pressing a mouse button, thereby enabling the operator to conduct editing on this partial picture data. Several methods are available for detecting which one of the partial picture data has been selected in response to the operation conducted by the operator for appointing the partial picture data to be edited. Such methods, however, are not described because they do not constitute any critical portion of this invention.

The number m ($1 \leq m \leq n$) corresponds to the m-th block of the picture constitution table 302, and the partial picture data defined by this block is the object which is to be edited.

A loop of control flow is formed by Steps S 203 to S 205. In Step S 203 a comparison is conducted whereas, in Step S 205, increment of the number i is conducted. In Step S 204, non-transparent definition data 1304-i corresponding to the partial picture data which is displayed next to the partial picture data as the editing object to the uppermost or outermost partial picture data are successively put on the display in logical sum (OR) relation to the display screen. Thus, Steps S 203 to S 205 constitute a routine which successively stacks on the display screen the non-transparent definition data 1304-i corresponding to the partial picture data next to, i.e., on the upper or outer side of, the partial picture data which is to be edited, through computation of logical sums (OR) of the non-transparent definition data 1304-i.

Figure 5A:
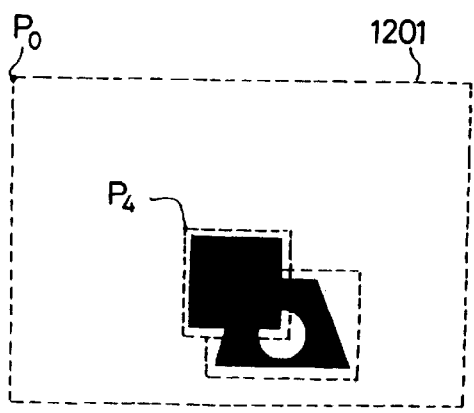
FIGS. 5A to 5I are illustrations of the display on a display screen in the course of processing in accordance with the present invention.

This operation may be conducted, for example, by AS-300 of CANON INC. (OPERATING SYSTEM MS-DOS). In this system, the content of a region $x_i$ of the i-th display definition block is put in an AX register, while the content of $y_i$ is placed in a BX register. Then, "0" is put in a CL resister and a command "INTO15$_H$" (soft interruption command) is executed and the current point is determined as a point $P_i$. Subsequently, the content of the region DOFF$_i$ is input to a DI register, and the content of the region DSFG$_1$ is put into an ES register. Then, a code "12" is input to CL, while a code "14" representing "DISPLAY ALTERED BY LOGICAL SUM 9OR0 OF DISPLAY SURFACE AND IMAGE DATA" is put into DL thereby executing the command "INTO15$_H$". In consequence, non-transparent portion is superposed and displayed. Assuming here that the number m is 3, the Step S 204 conducts operation for the cases of i=4 and i=5. In consequence, an image as shown in FIG. 5A is obtained on the display. This content of the display is transferred to the pattern memory 303 in a next step S 206. Practical example of such a transfer will be explained with reference again to the system AS-300 mentioned before. The current point (assuming here that the coordinates of the point $P_0$ is expressed by $(x_0, y_0)$, is set at $(x_0, y_0)$. (That is, as described before, $x_0$ and $y_0$ are set in the AX register and the BX register, while CL register is set at "0" thereby to execute "INT15".) Assuming here that the coordinates of the point $P_0'$ on the right lower end of the display screen are $(x_0', y_0')$, $x_0'$ and $y_0'$ are set in the AX register and the BX register, respectively, and the initial address of the data administration table 302 is decomposed into offset address and segment address. The offset address is input to the DI register, while the segment address is input to the ES register. At the same time, a code "11" representing the data transfer from the V-RAM 104 to the memory is input to the CL register. The offset address and the segment address of the pattern memory 303, which are the regions for storing the front face shape as the image data, are set in the fourth and fifth words of the data administration table 302. When a command "INTO15$_H$" is executed, the image data shown in FIG. 5A is transferred to the pattern memory 303 and the parameters of the first to third words of the table 302 representing the instant effective area are computed by the system and written.

As a result of this operation, the data concerning the non-transparent portion formed by over-lapping portions of a plurality of partial picture data, which are on the "upper" or "outer" side of the objective data (a circle in this case) is stored in the pattern memory 303.

Figure 5D:
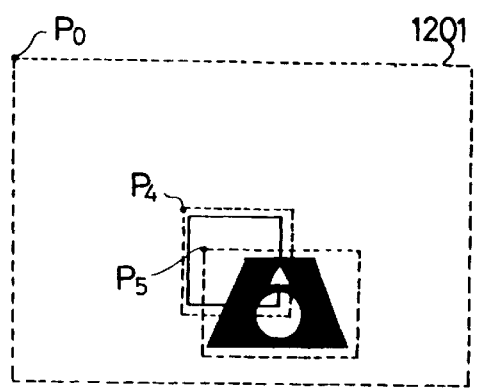
Figure 5B:
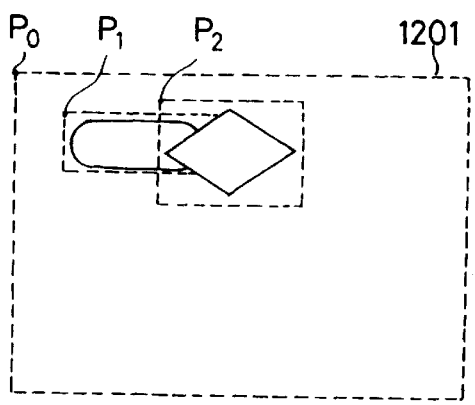

In Step S 207, the display screen is cleared once again and the building up of the image is commenced. This is conducted by a loop constituted by Steps S 209 to S 211 which are adapted to conduct, respectively, comparison between i and m and increment of i. In the intermediate step S 210, therefore, the partial picture data are successively displayed from the innermost one to the one immediately under the picture data to be edited. Thus, the loop constituted by Steps S 209 to S 211 is similar to that formed by Steps S 203 to S 205. Assuming here again that the number m is 3, the display is conducted up to the partial display data immediately before the data representing the circle, so that an image as shown in FIG. 5B is displayed on the display. When the Number i becomes equal to the Number m of the partial picture data to be edited, the comparison conducted in Step S 209 produces an output which advances the process to Step S 212, skipping over the Steps S 210 and S 211. In this state, the background of the objective partial picture data has been formed on the display. The image data representing this background is transferred to and stored in the back face display memory 305. This storage can be conducted in the same manner as the Step S 206 explained before, except that the offset address and the segment address of the initial address of the data administration table 304 are set in the DI register and the ES register, respectively, and that the fourth and fifth words of the data administration table 304 store the offset address and the segment address of the back face display memory 305.

Figure 5E:
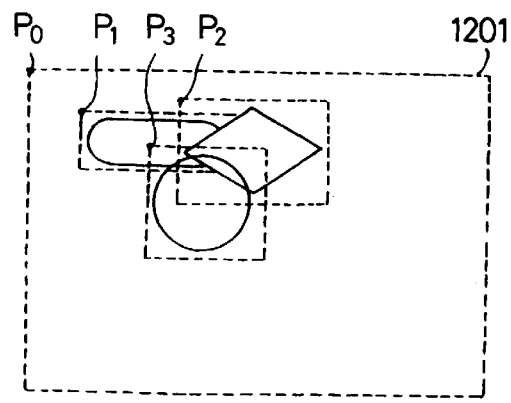
Figure 5C:
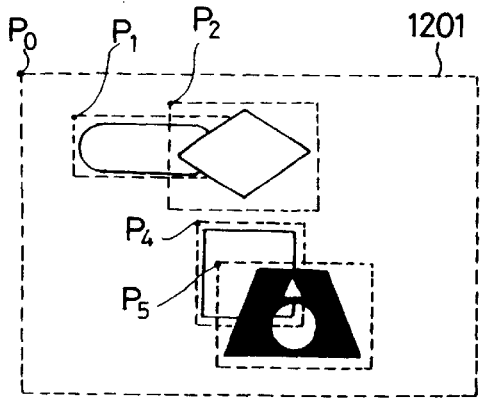

Then, in Step S 213, the Number i is initialized to (m+1) and the Steps S 215 and S 216 are repeatedly executed until the judgment in Step S 214 reveals that the Number n of the uppermost or the latest partial picture data is reached. Since increment of i is conducted in Step S 216, Step S 215 conducts an operation for displaying the partial picture data from the one which is immediately on the objective partial image data to the uppermost or the latest partial picture data. This operation may be conducted in the same manner as that in Step S 210. When a condition of i=n+1 is confirmed in Step S 214, the process proceeds to Step S 217. In this state, an image as shown in FIG. 5C is formed on the display. That is, an image devoid of the objective partial picture data, i.e., an image devoid of the partial picture data showing a circle, is formed on the display.

In Step S217, the content of the pattern memory 303 is displayed on the display screen through computation of logical product (AND) with the display screen. This can be conducted by setting the raster operation in logical product (AND) mode.

In the case of the system AS-300 mentioned before, the x- and y-coordinates $x_0$ and $y_0$ of the point $P_0$ are set in the AX register and the BX register, respectively, and the CL register is set to "0" so that the command "INTO15$_H$" is executed, thereby shifting the current point to the coordinates ($x_0$, $y_0$). Then, the offset address and the segment address of the data administration table 802 are set in the DI register and the EX register, respectively, while a code "12" representing the data transfer from the memory to the V-RAM 104 is input to the CL register. At the same time, a code "2" appointing the logical product (AND) mode is input to the DL register, thereby to execute the command "INTO15$_H$". In consequence, an image of the plurality of partial picture data on the "upper" or "outer" since of the objective partial image data is displayed as shown in FIG. 5D. The display of the partial image data on the "upper" or "outer" side of the objective partial picture data may be conducted by clearing the display and then successively displaying the partial image data one by one. This, however, is not preferred because the processing speed is lowered particularly when the number of the partial picture data is large. In contrast, in the described embodiment, the display of the partial picture data on the "upper" or "outer" side of the objective partial picture data can be conducted by a single logical product-transfer operation regardless of the number of the partial picture data because the computation for obtaining the logical product is conducted with the image which is already stored in the back face memory 305 as explained before.

In Step S 218, an operation similar to those in Steps S 206 and S 212 is conducted so as to transfer the displayed image to the front face display memory 307. More specifically, the addresses of the data administration table 306 defining the initial memory address of the front face display memory are set in the DI register and the EI register, and the command "INTO15$_H$" is executed to transfer the content of the V-RAM to the memory.

As a result of the operation described hereinbefore, the pattern memory 303 stores the image shown in FIG. 5A, while the back face display memory 305 stores the image (group of partial picture data) shown in FIG. 5B. Similarly, the front face display memory 307 stores the image shown in FIG. 5D which also is a group of partial picture data.

Finally, in Step S 219, a high-speed display of the overall image is conducted.

[Editing of Image]
(FIGS. 4A, 4B and FIGS. 5A to 5I)

Figure 4B:
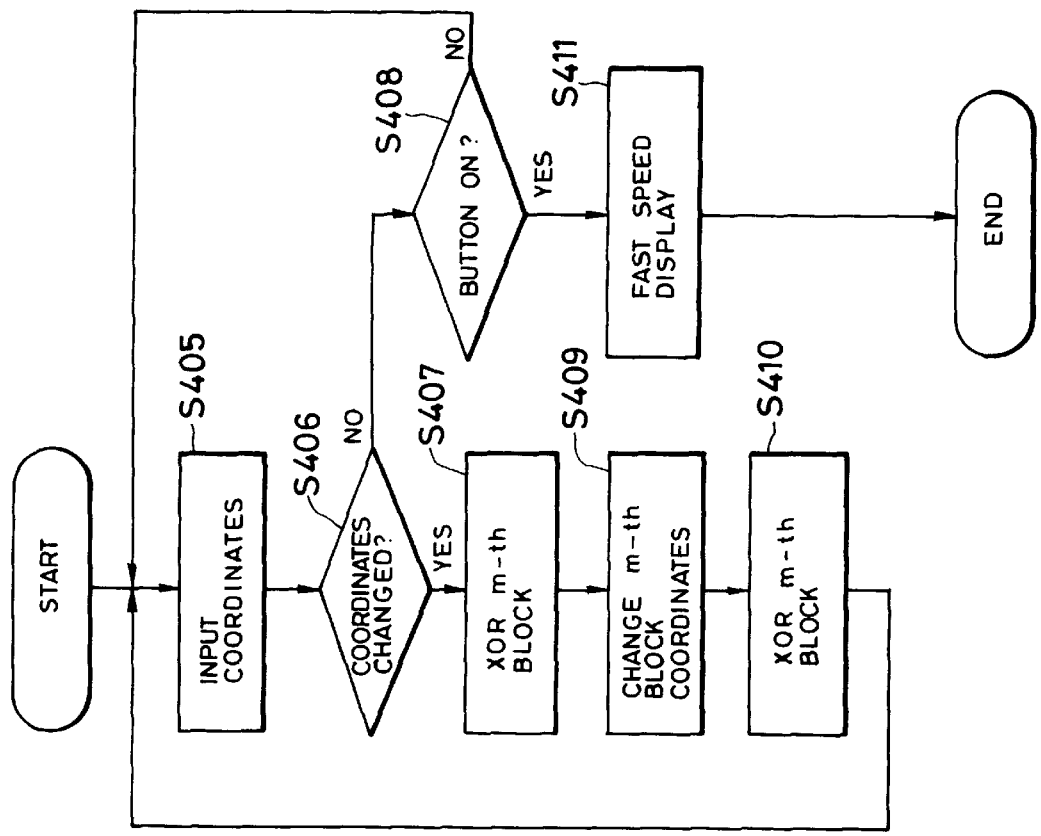
FIG. 4B is a flow chart of a process for moving a specific partial picture data.
Figure 4A:
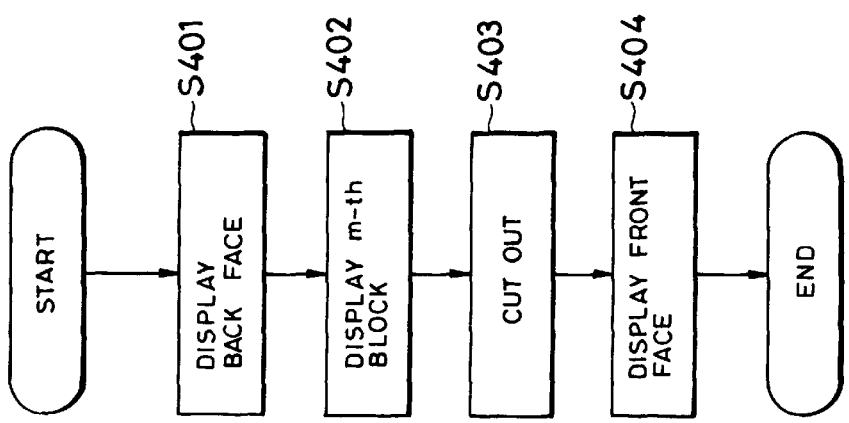
FIG. 4A is a flow chart illustrating the process of display of a picture.

The detail of the process for effecting edition on a selected partial picture pattern will be described hereinunder with reference to a flow chart shown in FIG. 4A. It is to be understood that this flow chart also is stored in the memory 105a.

In Step S 401, the content of the back face display memory 305 is transferred to the V-RAM 104. The transferring method may be materially the same as that explained before. In this case, however, the raster operation is set for a mere rewriting. When the system AS-300 mentioned before is used, this rewriting operation is effected simply by inputting to the DL register a code 15 indicative of writing of the source.

Figure 5F:
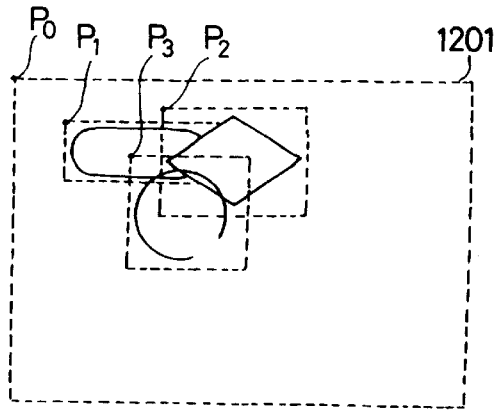
Figure 12:
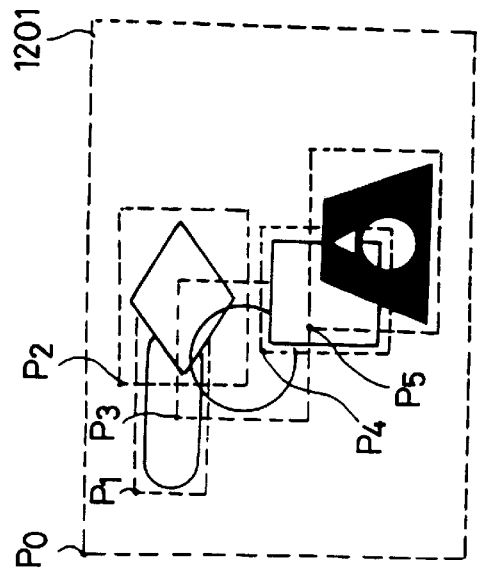
FIG. 12 is an illustration of an image of a picture formed by a plurality of partial picture data.
Figure 13:
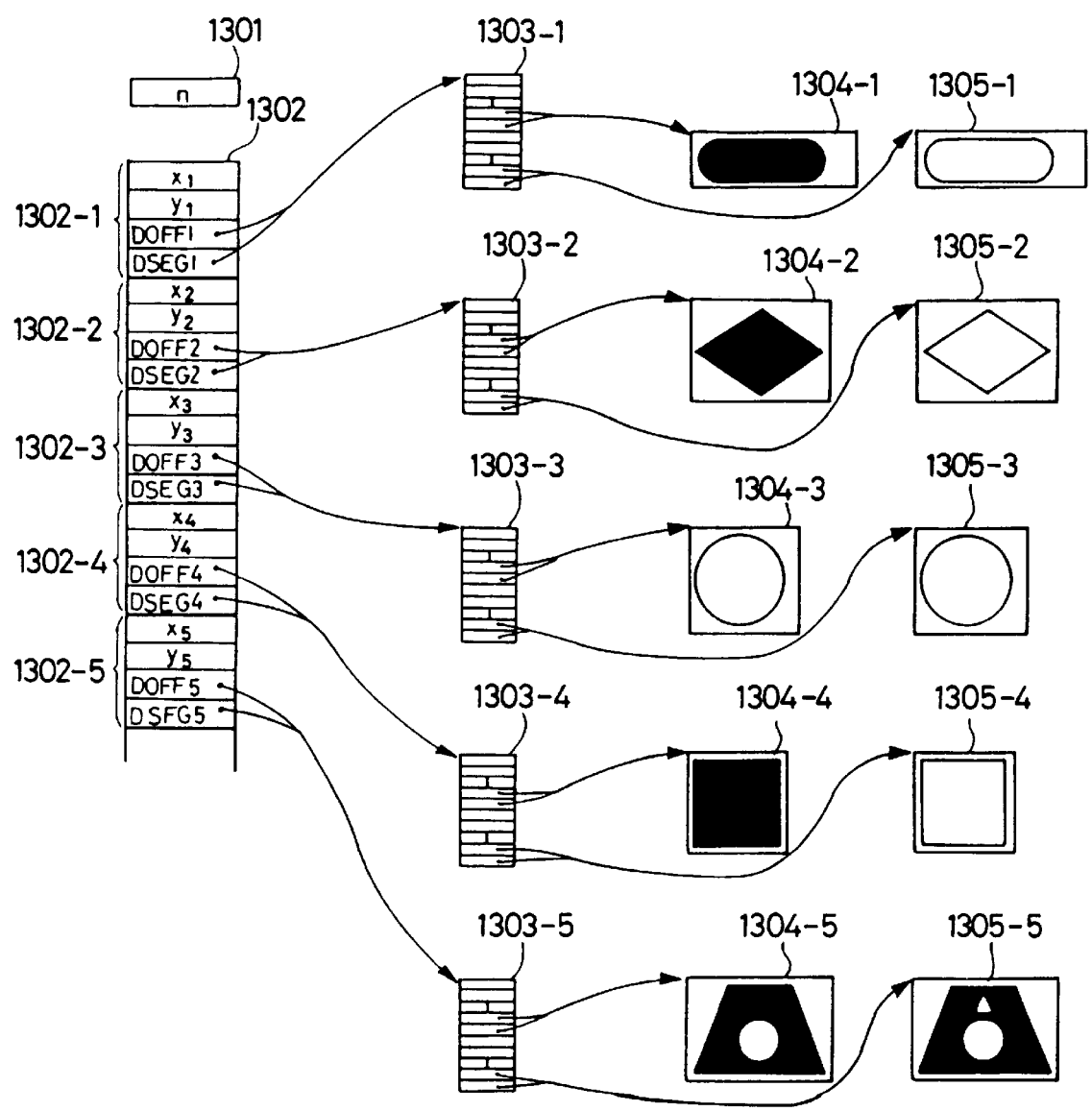
FIG. 13 is an illustration of the manner in which the partial picture data are allocated.
Figure 15:
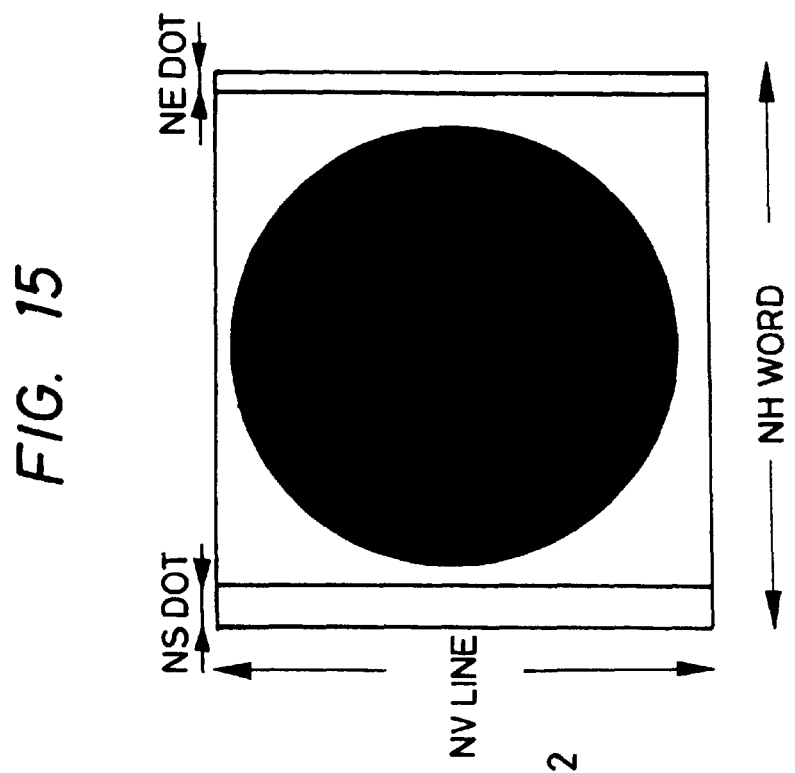
FIG. 15 is an illustration of an example of the partial picture data.

This operation enables the image shown in FIG. 5B to be displayed without requiring clearing of the display screen. In Step S 402, the objective partial picture data to be edited is displayed. This can be conducted by substituting the content m of the region 301 for the Number i and then executing the same operation as step S 204 explained before. In this case, since m is 3, an image as shown in FIG. 5E is obtained. In Step S 403, an inversion of the data in the pattern memory 303 is conducted by substituting "1" and "0" of the data for each other, and a logical product (AND) with the V-RAM 104 is computed, whereby the non-transparent portion of the partial pictures on the "outer" or "upper" side of the objective image is removed. This operation also can be conducted by executing the command "INTO15$_H$". In consequence, as shown in FIG. 5F, an image is formed in which the right lower portion of the "circle" is removed. In Step S 404, logical sum (OR) of the data in the front face display memory 307 and the content of the V-RAM 104 is computed so that the partial picture data on the "upper" or "outer" side of the objective partial picture data is displayed once again, whereby an overall image as shown in FIG. 12 is formed. This operation also is conducted by executing the command "INTO15$_H$" Since the batch transfer of the data on display can generally be conducted at a high speed, the transfer of data to the V-RAM 104 from the memories such as the back face display memory 305, pattern memory 303 and the front face memory 307 can be completed almost instantaneously. Thus, the result of edition of the objective picture data can be immediately incorporated in the final image on display.

As a practical example of the editing operation, it is assumed here that the editing object, which is in this case the partial picture data for the circle is to be moved by means of,for example, the mouse. The process of this editing operation will be explained hereinunder with reference to the flow chart shown in FIG. 4B. It is to be noted that this flow chart also is stored in the memory 105a.

In Step S 405, the coordinates of the destination position to which the partial picture data is to be moved are input by a pointing device which is in this case the mouse 103. When the system AS-300 mentioned before is used, a code "3" is input to the AX register thereby executing the command "INTO33$_H$", so that the information concerning the state of a first button on the mouse is set in the AX register. For instance, "1" is set when the state of the button is "ON", while, when the button is in "OFF" state, "0" is set in the AX register. Meanwhile, the state of a second button on the mouse is set in the CX register, while the x-coordinate and y-coordinate of the cursor are set in the BX register and DX register, respectively.

In a subsequent Step S 406, a comparison is made between the contents of the regions $x_i$ and $y_i$ of the display definition block 1302-m and the coordinates input in Step S 405. When there is a difference in either one or both of the x- and y-coordinates, the process proceeds to Step S 407. However, the process proceeds to Step S 408 when coincidence is obtained both in the x- and y-coordinates.

Figure 5G:
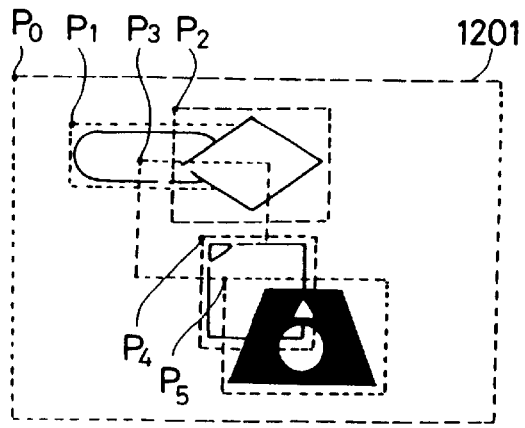

In Step S 407, the contents of the regions $x_i$ and $y_i$ of the display definition lock 1302-m are input to the AX register and BX register, respectively, while "0" is set in the CL register thereby executing the command "INTO15$_H$", thereby moving the current point to the position of the point $P_m$. Then, an address is formed by adding 10 (ten) to the address on the partial definition table appointed by the regions DOFF$_m$ and DESG$_m$, and the offset address and the segment address of the thus formed address are put into the DI register and the ES register, respectively. Then, a code "6" representing exclusive OR with the display screen is input to the DL register, while the code "12" representing writing into the V-RAM 104 is input to the CL register. The command "INTO150$_H$" is then executed. In consequence, the partial picture data in the m-th block is extinguished. More specifically, white=black inversion is effected in the portion where the partial picture data on the "upper" or "outer" side of the objective partial picture data overlap one another. This inversion, however, may be neglected when the process is conducted at a high speed. As a result, an image as shown in FIG. 5G is formed on the display.

In Step S 409, the regions $x_m$ and $y_m$ of the display definition block 1302-m obtained in Step S 405 are rewritten. In a subsequent Step S 410, the same operation as that in Step S 407 is conducted.

In consequence, the EXCLUSIVE OR with the new coordinates is computed and the objective partial picture data, which is in this case the circle is displayed at the destined position.

Figure 5H:
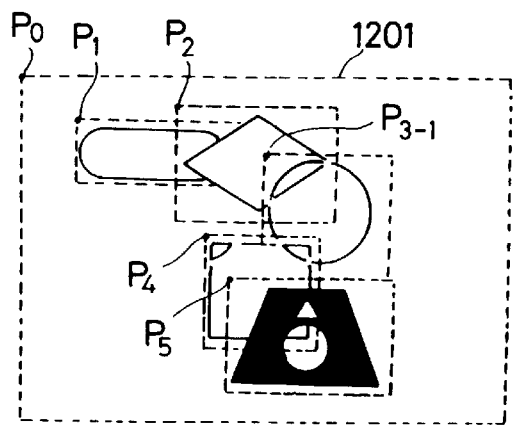
Figure 5I:
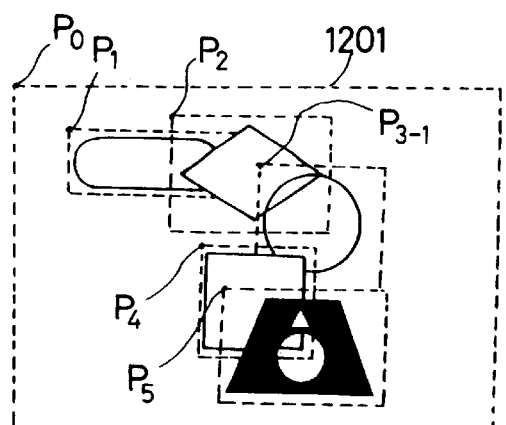

In the case where the Number m is 3, when the point $P_{3-1}$ is input in Step S 405, the EXCLUSIVE OR of the display definition data 1305-3 with the rectangular region having left upper corner at the point $P_{3-1}$ is computed so that an image as shown in FIG. 5H is obtained on the display.

The process then returns to Step S 405 and the above-described series of operation is repeated.

When there is no change in the coordinates, i.e., when the judgment in Step S 406 has proved that the contents of the regions $x_i$ and $y_i$ of the display definition block 1302-m are the same as the coordinates input in Step S 405, the process proceeds to Step S 408. In Step S 408, the state of the first button at the time of input of the coordinates is examined. If this button is not pressed, the process is returned to Step S 405 so that the described operation is repeated. This means that the "circle" moves over the display screen in accordance with the movement of the mouse, unless the first button is pressed. When the circle has reached the desired position, the operator presses the mouse button. This operation is detected in Step S 408 so that the process proceeds to Step S 411.

In Step S 407, the process explained before in connection with FIG. 4A is conducted. Thus, the background is first displayed and the circle is displayed at the right position and then the picture on the "outer" or "upper" side of the circle is displayed again thereon. Thus, in the meantime, a portion of the circle is displayed on the left upper corner of the square and the portion of the circle overlapping the diamond and the square are blanked as shown in FIG. 5H. Such transient state of display, however, is finished in a very short time and a high-speed display is conducted to produce the image shown in FIG. 5I on the display screen.

[Application to Color Display]
(FIGS. 6 to 10)

In the system described hereinbefore, the non-transparent data and the display data on the non-transparent portion are prepared and displayed separately.

A description will be made hereinunder as to the system for conducting color display. In some of color display systems, each picture element is represented by a plurality of bits. (In another case, non-transparent data is used for each of three planes R, G and B. In such a case, the operation described hereinbefore may be conducted for each of the R, G and B planes. Description of such an application, therefore, is omitted.)

By constructing the CRT interface 110 suitable device such as, for example, a CR controller HD 63484 produced by HITACHI, it becomes possible to allocate both a transparency and a color to a single picture element. The use of a CRT controller having such a function makes it possible to eliminate the pattern memory 303 which is used in the monochromatic display operation described herein before. That is, in the case of monochromatic display, only two states of the picture element are available: a state in which the picture element has been set, and a state in which the picture element has not been set. In this case, therefore, it is necessary to employ the non-transparent data besides the picture data. In contrast, in color display, each picture element can be expressed in terms of a plurality of bits, usually three or more bits, so that non-transparent data can be formed by making use of one of these plurality of bits.

An embodiment of the invention will be described hereinunder in which the CRT controller HD 63484 is used in a graphic bit mode of 4-bits/picture element.

Figure 6:
FIG. 6 is an illustration of the relationship between pixels and pixel data when the image editing apparatus is used for editing of a color image.

In this case, as shown in FIG. 6, each word has 16 bits which are grouped into four picture elements each having 4 bits. Thus, each word contains data corresponding to four picture elements. Each picture elements has four bits including signal Y (brightness), signal B (blue), signal G (green) and signsl R (red). The combination of these colors may be altered to change the colors by means of a look-up table. Alternatively, the arrangement may be such that the brightness is set to a standard level when the level of the signal Y is "1" and at a reduced level when the level of the signal Y is "0". In the latter case, when the bit "B" is "1" while other three bits are "0", i.e., when the display is made only in blue color with reduced brightness, the display color is changed almost into black. In this embodiment, therefore, this darkened blue color is not used for the purpose of display but the 4-bit code "0100" representing this state is defined as being "transparent". Although in the following description the transparent data is constituted by "0100", this is not exclusive and the transparent data may be formed by other bit patterns.

In this embodiment, the background color of the display screen is defined as being transparent. This enables that only the background color (transparent data) to be changed into another display color. In this embodiment, the blue color with reduced brightness is used as the transparent data, so that the background color is not so stimulative to the operator's eyes during the operation.

Figure 7:
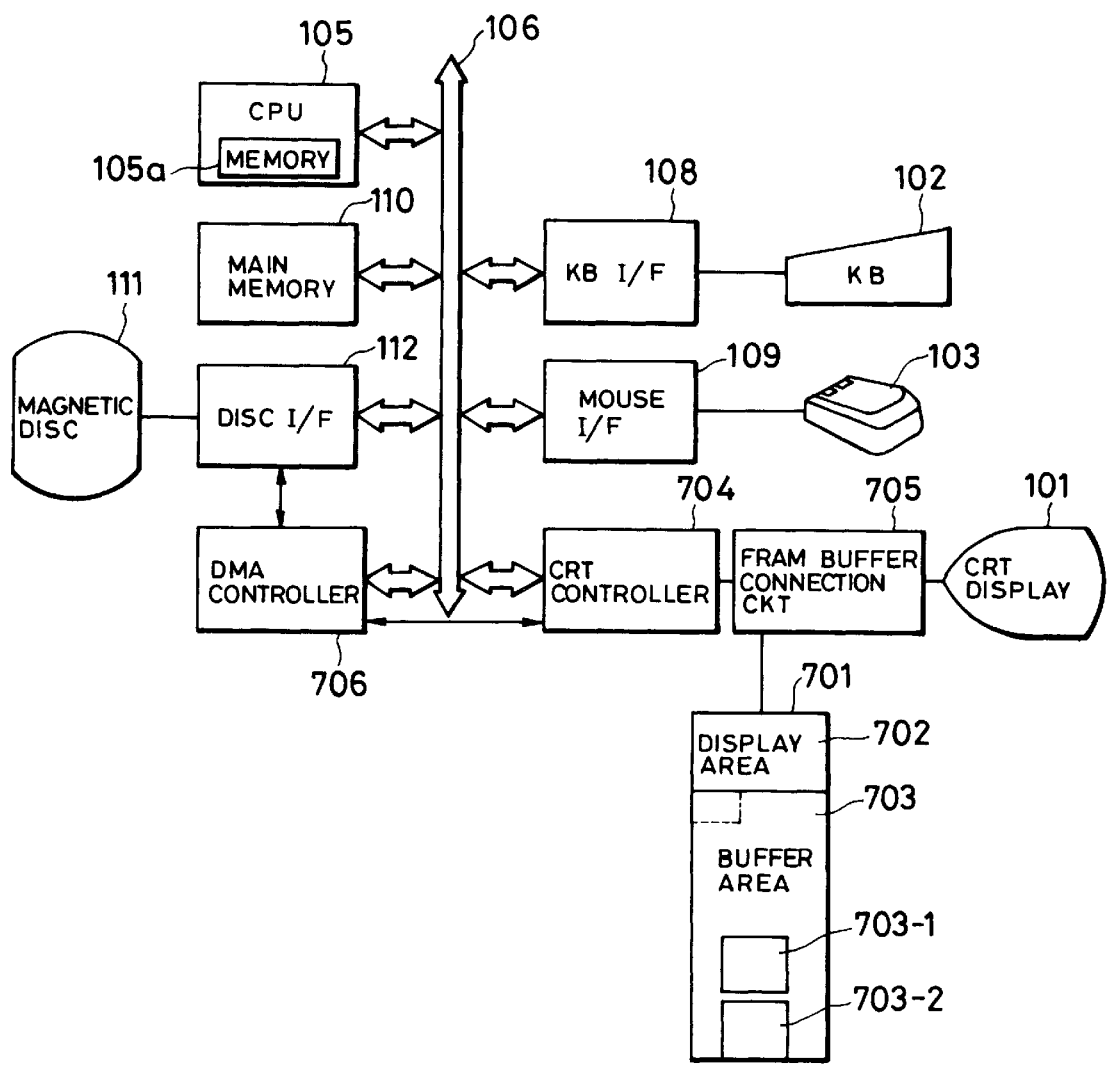
FIG. 7 is a block diagram of another image editing apparatus suitable for use under the condition of FIG. 6.
Figure 10:
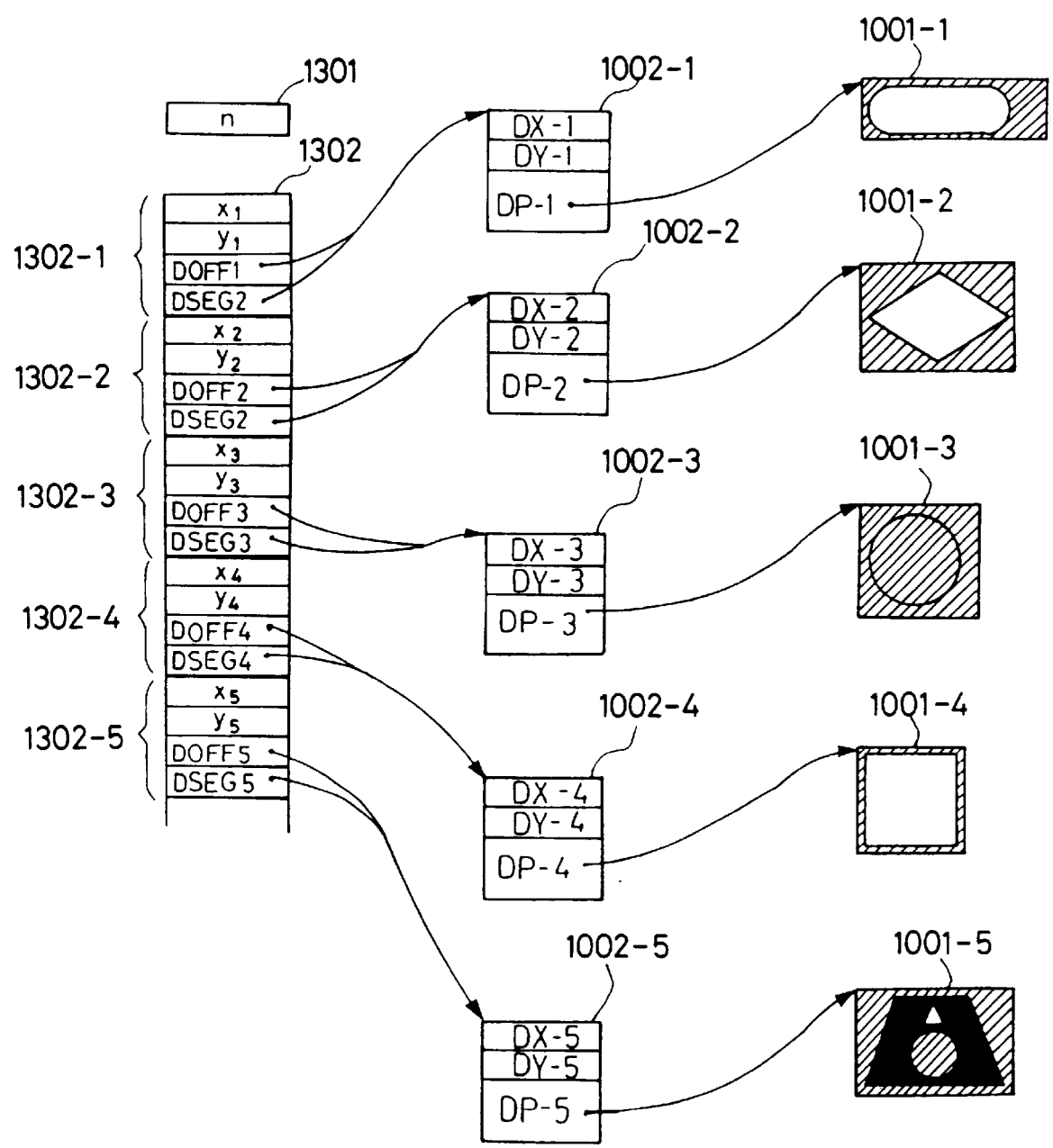
FIG. 10 is an illustration of the manner in which the partial picture data are allocated.
Figure 11:
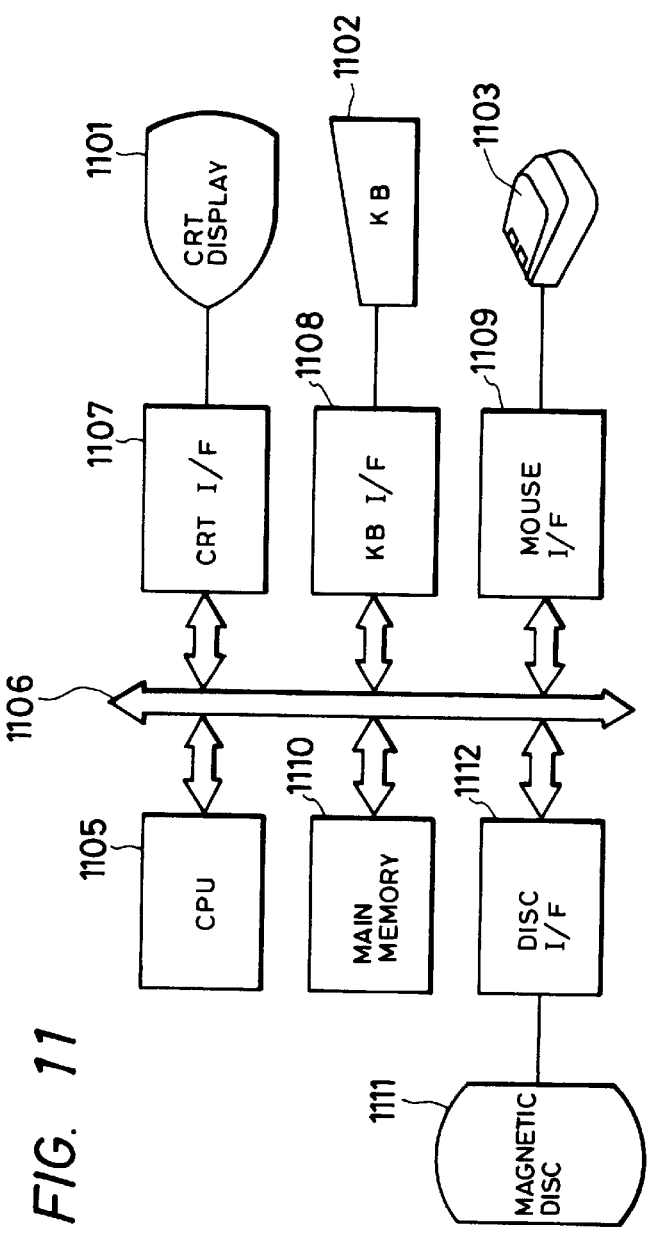
FIG. 11 is a general block diagram of the image editing apparatus.

FIG. 7 illustrates a system suitable for use in the display operation explained above. A frame memory 701 has a display area 702 corresponding to the display screen and a buffer area 703. Partial picture elements are transferred from an external memory such as a magnetic disk 111 into the buffer area 703, and the display area is sent to HD 63484 by means of, for example, a graphic copy command. The CRT controller 704 used in this embodiment is, for example, the HD 63484 mentioned above, and is connected to the frame memory 701 and the CRT display 101 through a frame buffer connection circuit 705. The CRT controller 704 (HD 63484) is adapted to enable the transfer of data between the frame memory 701 and the disk 111 or the main memory 110, by means of DMA. To this end, a DMA controller 706 is connected to the BUS 106 so that the CRT controller 704 or a disk interface 112 conducts the DMA transfer under the control performed by the DMA controller 706.

More specifically, two regions 703-1 and 703-2, each having the same size as the picture display in the display area 702, are allocated in the buffer area 703. These regions 703-1 and 703-2 maybe regarded as being materially equivalent to the front face display memory 307 and the back face display memory 305 which were mentioned before, in this case, the partial picture data is recorded in a manner which will be explained in connection with FIG. 10 hereinunder.

In the system described before, the partial definition block 1303-i is appointed by the regions $DOFF_i$ and $DSEG_i$ of the display definition block 1302-i. In the system under description, however, a disk pointer DP-1 is adapted to point the positions on the magnetic disk where the 4-bit partial picture data 1001-i are stored. The number of dots counted in the x-direction is stored in the region DX-i of the partial definition block 1002-i, while the number of dots counted in the y-direction is stored in the region DY-i of the same.

The number of dots counted in the x-direction is a multiple of 4. When the size of the rectangular region in the x-direction in terms of number of dots is not a multiple of 4, transparent data is attached to the left or the right side of the rectangular region thereby to make the rectangular region have a length which is a multiple of 4. In each of the partial picture data 1001-i, the picture elements in the hatched area are represented by 4-bit data "0100" (transparent data), while the picture elements in the black region are made to correspond 4-bit data of the respective colors, e.g., "0000". Similarly, the picture elements in the white region are made to correspond to "1111". Thus, picture data composed of words each containing four picture elements each having four bits is formed in the horizontal direction to the full length of the region. Then, the data is formed in the same manner starting with the left end position of the next line of the picture elements. The thus formed data are suitably stored.

The CRT controller HD 63484 has a command which moves a desired rectangle in the frame memory, while conducting comparison between a comparison color register and a drawing point data and conducting a computation for replacing the drawing point data with the source data only when a coincidence is obtained as a result of comparison.

A description will made as to an image processing operation conducted with a CRT controller of the type explained above, with specific reference to flow charts shown in FIGS. 8 and 9.

The program of the processes shown by these flow charts are stored in the memory 105a.

In Step S 801, the whole picture display are a 701 is painted by the color code "0100" (transparent data), thereby changing all the picture elements in the display area into transparent code. At the same time, the color code "0100" is set in the comparison color register. In Step S 802, the number n of the partial picture data is substituted for i as the initial value. The number i is decremented in a further Step S 805 and a judgment is conducted in Step S 803 as to whether the number i is greater than the Number m of the objective picture data. When the judgment has proved to be i>m, the step S 804 is executed repeatedly in this loop.

That is, the step S 804 is repeatedly conducted on successive partial picture data starting from the innermost or lowermost one. In Step S 804, the address of the display definition block 1002-i is computed with reference to the display definition address 1303-i, and the position of storage of the partial picture data on the disk is picked up from the region DP-i. The picked up address is set as the disk reading address in the disk interface 112. At the same time, data writing instruction if given to the CRT controller 704 for enabling the writing of data into the frame buffer by means of the DMA data transfer. This writing instruction includes parameters which appoint the horizontal and vertical lengths of the data in terms of the values in the regions DX-i and DY-i. In advance to this operation, the read/write button of the CRT controller 704 is set so as to point the leading end of the buffer area 703. In consequence, the picture data 1001-i is transferred to the leading end of the buffer area 703 by means of DMA. In the HD 63484, the command and the parameter are executed by writing data in FIFO connected to specific registers.

Then, a shifting command for current point is transferred. The content of the region $x_i$ in the display definition block is set as a parameter in the first bit, i.e., x-coordinate, of the shifting command while the content in the region $y_i$ is set in the second bit, i.e., y-coordinate, of the shifting command.

Then, a copy command for copying the rectangular region is delivered. In this case, the computing mode is transmitted in the form of a drawing only when the drawing point data is equal to the content of the comparison color register. That is, partial picture data is written only when the data in the picture display area 701 is "0100". In consequence, the pictures which are sent to the picture display area 701 are observed as if they are developed inwardly. The sebsequent parameters are x-coordinate of the source data, y-coordinate of the source data, number of picture elements in x-direction and number of picture elements in y-direction. These parameters may be the data of the buffer area to which data has been transferred by DMA transfer. Thus, the display can be made the designated position by inputting the x- and y-coordinate values corresponding to the beginning end of the buffer area and then inputting the contents of the regions DX-i and DY-i as the respective numbers of picture elements.

As explained before, in the initial state, the whole display area has been converted into transparent code. Therefore, the data in the portion of the transparent data other than the portion changed into the picture data is rewritten in accordance with the portion of the overlying picture data other than the portion carrying the transparent code. Thus, the underlying picture data is viewed as if it is placed under the overlying picture data, because the rewriting with the underlying picture data is conducted only at the portion which has not been rewritten by the overlying picture data.

When it is desired to proceed the process from Step S 803 to Step S 806, therefore, the group of partial picture data which are on the "upper" or "inner" side of the objective picture data is displayed. If the number m has been set to be 3, an image as shown in FIG. 5D is obtained. In Step S 806, the content of display in this state is transferred to the region 703-1. This can be conducted by using, as the computing mode, a copy command for the rectangular region scribing the color data "000". In order that the transfer of the content of the display be made to the region 703-1, the current point is set at the coordinates of the left upper corner point $P_0$ of the region 703-1, and a copy command for rectangular region having parameters representing the number of the picture elements in the horizontal and vertical directions is sent to the CRT controller, whereby the transfer is conducted.

In Step S 807, the display screen 1201 is changed again into transparent state. In Step S 808, (m−1) is substituted for i. Then, Step S 810 is executed repeatedly by a loop constituted by Steps S 809 to S 811. The Step S 810 is executed for the successive partial picture data excluding the objective partial picture data, from the one which is immediately "under" the objective partial picture data down to the "innermost" partial picture data. Therefore, when the process has left the loop at Step S 809 for Step S 812, only the background is shown on the display screen 1201 as shown in FIG. 5B. In Step S 812, this background data is transmitted to the region 703-2. This transfer is conducted in the same way as the transfer to the region 703-1 explained before.

In Step S 813, the image is displayed again. This operation will be explained with reference to FIG. 9. In Step S 901, the whole display screen is set up with transparent data as in Step S 801 explained before, and the transparent code "0100" is set in the comparison register.

In Step S 902, the front face data stored in the region 703-1 is transferred to the display region 702, and i is changed to m in Step S 903 so as to enable the objective partial picture data to be displayed. The display of the objective partial picture data is conducted in Step S 904. The operation conducted in Step S 904 may be the same as that conducted in Step S 804. In Step S 905, the back face data stored in the region 703-2 is transferred to the display area 702 through operation in the computing mode "100".

An image composed of a plurality of partial picture data is thus formed. In this state, however, transparent code portions often remain on the display screen. In Step S 906, therefore, the transparent codes in these portions are changed into codes of a suitable color, e.g., white, so that the transparent portions are smeared in, for example, white. This can be conducted by executing a smearing command for smearing the rectangular region in the computing mode "100".

Subsequent editing operation is materially the same as that explained in connection with the monochromatic display and, therefore, is not described.

Although "movement" of specific partial picture data has been described as an example of editing operation, this is not exclusive and other types of editing operation such as rotation, correction and so forth can be conducted in the same manner.

As will be be understood from the foregoing description, in the described embodiments of the present invention, the back face data and the front face data are formed separately from each other when each partial picture is displayed so that, when one of the partial picture data is edited, the operator can confirm the result of the editing very quickly because the final image after such an edition is built up almost instantaneously. In consequence, the speed of editing operation is remarkably increased and the editing operation itself can be facilitated.

Although the embodiments described hereinbefore incorporate specific systems or devices such as the system AS-300 of CANON INC. and the CRT controller HD 63484 made by HITACHI, LTD., such systems or devices are only illustrative and other equivalent hardware can be used to achieve the same results. If necessary, the functions of such systems or devices can be realized by software.

Thus, in the described embodiments, the partial picture data on the "inner" or "lower" side of each partial picture data and the partial picture data on the "outer" or "upper" side of each partial picture data are formed and stored in groups, so that editing of any one of the partial picture data constituting an image can be effected easily and promptly, without requiring the use of any complicated system.

Figure 17:
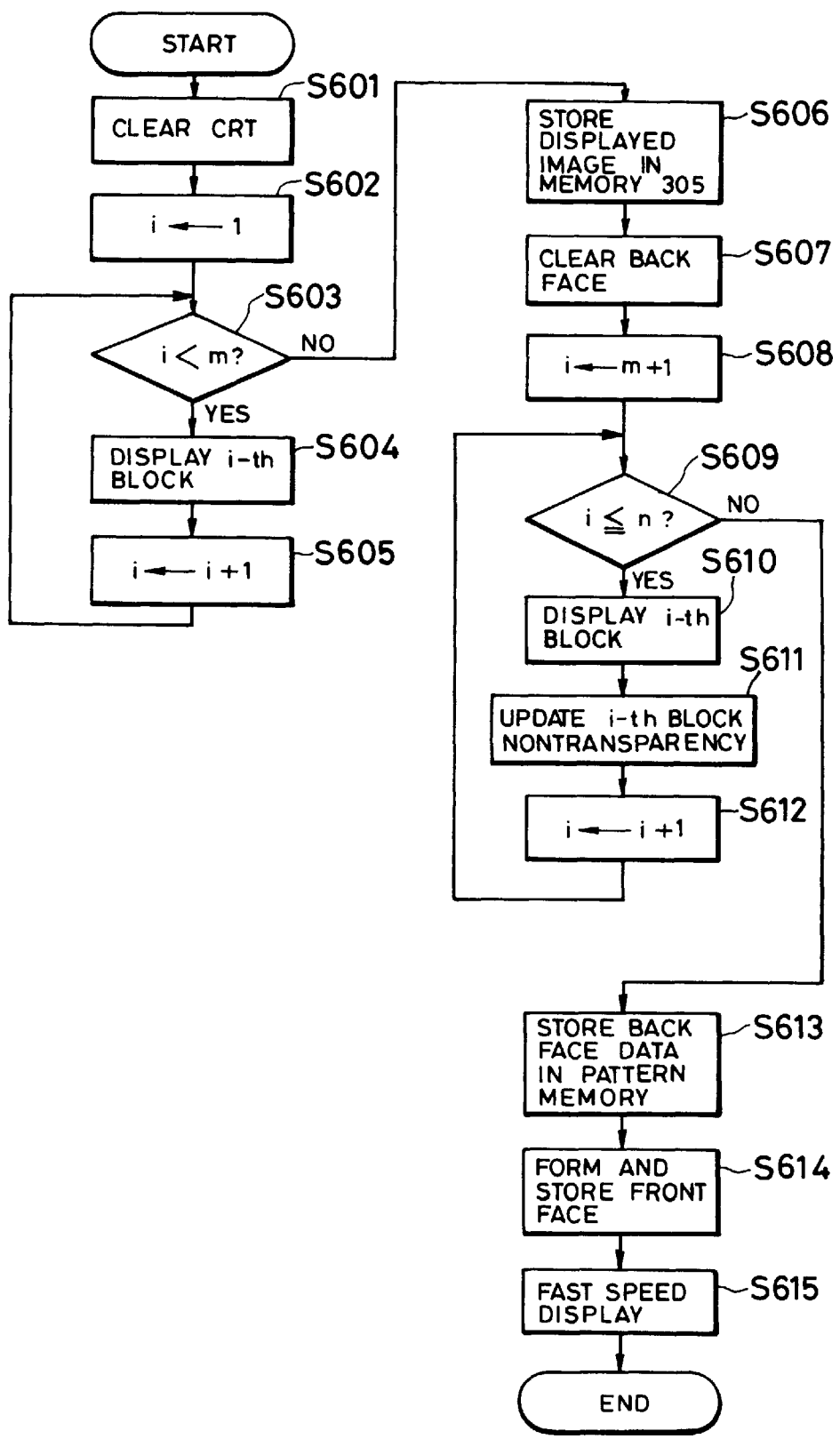
FIG. 17 is a flow chart showing another example of a process for storing a group of partial picture data when a specific group of partial picture data is appointed.

[Process for Storing Groups of Other partial Picture Data] (FIG. 17)

In the embodiments described before, the non-transparent portion of a picture formed by superposing partial picture data on the upper or outer side of a specific partial picture is formed and stored in the pattern memory 303. Then, the display screen is cleared and the partial picture data are successively displayed from the innermost one up to the partial picture data immediately under the specific partial picture data, with the non-transparent portion being corrected successively, and the image thus formed by the underlying partial picture data is stored in the back face display memory 305 as the back face display data. Then, the overlying partial picture data are successively displayed starting from the one which is immediately overlying the specific partial picture data up to the uppermost one while the non-transparent portion is corrected successively. Then, the logical product (AND) of the thus formed image and the non-transparent portion stored in the memory 303 is computed to obtain the front face image which is then stored in the front face display memory 307. After the desired edition of the specific partial picture, a series of operation including the display of the back face image, display of the specific partial picture, cut-out of the front face non-transparent portion and the display of the front face image is executed so that the final image can be builtup very quickly.

It will be seen that the described embodiments are not designed to conduct the series of operations in the sequence or order: display screen, display and storage of the front face data, clearing of the display screen, and display and storage of the front face non-transparent portion. This difference in the sequence or order of operations is not a mere matter of design but is a matter of a significance as explained hereinunder.

The method of display of an image on a display may be broadly sorted into two types: namely, a method in which the final image is put on the display at once when it is formed so that the state of the image during formation is not displayed, and a method in which the content of the display is momentarily changed to show the successive states of the image which is being formed. In general, the later-mentioned method is preferred by users, though this method may require a longer processing time than the first mentioned method, particularly when the formation of the image takes a certain length of time.

Users tend to feel uneasy when no particular response by the system is confirmed and are liable to hesitate to favor such a system. In the described embodiments, therefore, the formation of the non-transparent portion is conducted first and then the display of the back face image is commenced after the display screen is cleared. Then, without conducting the display of the specific partial picture and clearing of the display surface, the display of the front face image is conducted immediately after the display of the back face image, so that the operator can confirm what is being done, with a feel of ease. In the process for building up the image on the display screen. When the picture is completed except for the specific partial picture, the operation for obtaining the logical product (AND) of the thus formed image and the non-transparent data is conducted so that the front face data is obtained at once. Then, smearing of the whole display area is conducted at once, whereby the final image is displayed in a very short time, while imparting a natural feel to the operator.

These embodiments, however, still suffer from the following problem. Namely, since the display is started with the non-transparent data, only the shadow is formed on the display screen and the normal display is made only after the completion of formation of the front face non-transparent portion. This problem, however, can be overcome by an embodiment which will be described hereinunder with reference to FIG. 17.

In this embodiment, the picture under the specific picture data, i.e., the background or the back face, is formed and stored in the back face display memory 305 in Steps S 601 to S 606, without forming the non-transparent portion. These six steps may be the same as Steps S 207 to S 212 in the flow chart shown in FIG. 2.

Then, in Step S 607, the "rear screen" is blanked into white color. The term "rear screen" is used here to mean a memory area which enables writing of characters, patterns and bit patterns as in the case of the display screen but is not actually put on display. This can be conducted by preparing a plurality of V-RAMs and by using only one of them for the displaying purpose while other V-RAMs are not used for the displaying purpose. Such a system has been realized already as a monitor CRT having a plurality of frame buffers.

The system AS-300 mentioned before does not have the function of the rear screen but is equipped with V-RAMs arranged in a manner similar to that explained above. The system AS-300 used in the described embodiment is designed for use in monochromatic display system.

A model designed for color CRT is available in the system AS-300. The hardware of such a model has memories for R, G and B screens. In addition, V-RAMs for these three colors are mapped in the same memory space on an assumption that the bank switching is conducted. Thus, the data on screen of each color are transferred from each memory to the corresponding V-RAM as the bank switching is conducted consecutively.

Figure 14:
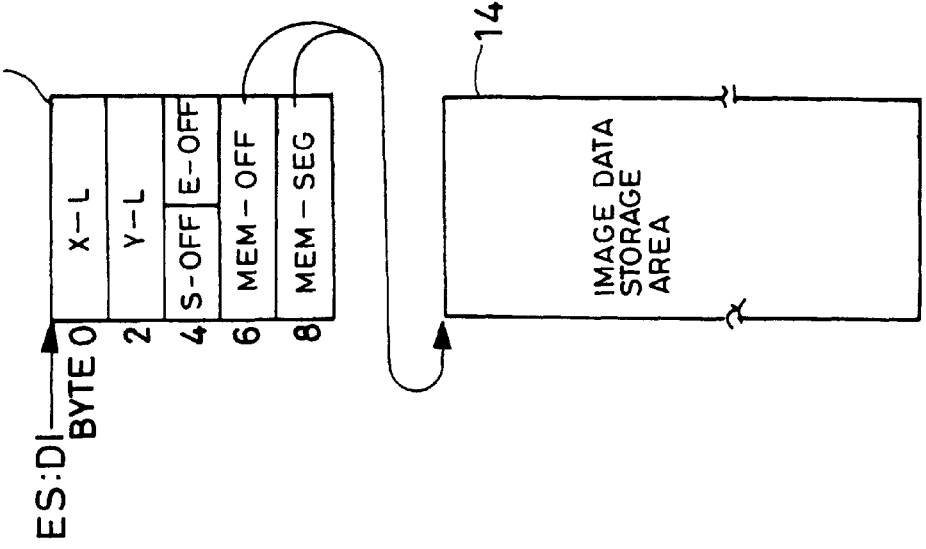
FIG. 14 is an illustration of a table showing the areas of storage of the partial image data and the manner in which the stored data are accessed.

Namely, in the model designed for use in color display, the image data storage area 1402 shown in FIG. 14 has a size which is three times as large as that in the system for monochromatic display. Thus, the first ⅓ area is used for "0" screen, the second ⅓ area is used for the first screen and the final ⅓ area is used for the second screen, and the respective ⅓ areas store the data of the respective colors. The transfer of the data between the V-RAM and the memory under the presence of the command "INTO15$_H$" is conducted by making use of the command "INTO10$_H$" of the display screen control utility. In operation, codes "23" and "1" are set in the AH register and in the AL register, respectively, while a code for appointing the V-RAM to be displayed, i.e., 0, 1 or 2, is set in the BL register. Then, the address on the memory where the data is stored is set in the ES and DI registers, and then the command "INTO10$_H$" is executed, whereby the data is transferred from the screen, i.e., the V-RAM, appointed by the BL register to the memory. In this operation, the command is executed while the X-Y coordinates of the upper left corner of the V-RAM, X-Y dot widths and the offset address and the segment address of the destination are appointed as the parameters, and the transfer of the memory is conducted in a word-by-word fashion. At the same time, the number of words in the x-direction, i.e., the word pitch, and the X-Y coordinates of the left upper corner of the effective image on the rectangular region at this word pitch are computed and stored. Conversely, the transfer of the data to the V-RAM memory is conducted by the following procedure. A raster operation code is stored as a parameter in addition to the parameters mentioned above, and the address of this storage is appointed by the ES register and the DI register. Then, setting "23" and "2" in the AH register and the AL register, one of 0, 1 and 2 is set in the BL register depending on the screen or V-RAM to which the data is to be transferred. Then, the command "INTO10$_H$" is executed thereby to conduct the data transfer. It is thus possible to conduct the transfer and computation for each of the screen of V-RAM, respectively. The command "INTO$^{10}{}_H$" is provided with a function code for conducting an operation such as writing of dot simultaneously for three color screens for each picture element. This command also is provided with a 3-bit register referred to as bank select register, in which the three bits are adapted for appointing validity/invalidity of the access to the V-RAM banks of the screens 0, 1 and 2. This can be conducted by setting "18" and "4", respectively, in the AH register and AL register, setting a selected one of the patterns 0 to 7 which are the content of the bank select register, and then executing the "INTO15$_H$" command. In consequence, even when the writing of dots is conducted in a color which turns all the dots ON, the data in the screen or V-RAM the access to which has been appointed as being invalid are not renewed. Thus, when the system A-300 designed for color display is used in such a manner that only the data on the 0-th screen (V-RAM) is used for the displaying purpose, the V-RAMs of the banks 1 and 2 can be used as the rear screens which not participate in the display. That is, when "1" is initially written in the bank register so as to allow access only to the 0-th screen, an ordinary V-RAM writing/display task is executed, whereas, when "2" is written, the writing is conducted not to the V-RAM of the 0-th screen but to the first screen when the writing operation for writing data in V-RAM is conducted in the ordinary manner. Then, as "1" is set again in the bank select register, the ordinary V-RAM writing/display routine is commenced again.

The principle of the rear screen has been described. Needless to say, the same effect will be produced by providing a memory (RAM) in addition to a single V-RAM.

Referring again to the process shown in FIG. 17, for the purpose of changing the rear screen into white blank in Step S 607, "2" is set in the bank select register for example, and "0" is written in all the memory spaces which are mapped, and then "1" is written in the bank select register. In the case of the system AS-300, the addresses 0C000H to 0CFFFH are mapped as V-RAMs, so that "0" is written in addresses 0C000H to 0CFFFH of the memory.

In Step S 608, (m+1) is substituted for i, and Steps S 610 and S 611 are repeatedly executed in a loop which is formed by a Step S 609 for judging the partial picture data from the partial picture data immediately after the objective partial picture data to the uppermost partial picture data and a Step S 612 in which the display object is successively changed to the overlying partial picture data. Step S 610 is the same as Step S 604, i.e., the partial picture data are successively displayed from the one which is immediately after the objective partial picture data to the uppermost partial picture data. In Step S 611, the non-transparent portion of the i-th partial picture data as the object is accumulated (logical sum) on the rear screen. More practically, in the case of the system AS-300 mentioned before, the non-transparent portion of the i-th partial picture element is bit-set on the reverse side, with the transparent portion and the non-transparent portion set as "1" and "0", respectively. Namely, the drawing of the non-transparent portion is conducted by setting "1" in the bank select register, and then "1" is set again in the bank select register. When the non-transparent portion is available in the form of the non-transparent bit pattern as in the preceding embodiments, the transfer to the V-RAM is conducted by making use of the memory of the aforementioned "INTO10$_H$" command. Then, "23" and "2" are set in the AH register and AL register, respectively, and the bank is set at "1" corresponding to the destined V-RAM to which the data is to be transferred. Then, "14", which represents logical sum (OR), is set as the function in the parameter. Then, after storing the position data concerning the source and destination of the data, the addresses of the parameter block are set in the ES:DI register, and then the "INTO10$_H$" command is executed, whereby the non-transparent portions are accumulated.

When the completion of the display and correction of the non-transparent portions up to the uppermost partial picture data is confirmed in Step S 609, the non-transparent data of the rear screen is inverted in Step S 613 and the inverted data is transferred to the front face pattern memory 803 so as to obtain the logical sum (AND). This operation also can be conducted by making use of the "INTO10$_H$" command. Namely, after setting "2" in bank select register, "23", "2" and "1" are set in the AH register, AL register and BL register, respectively, and the addresses of the parameter blocks are set in the ES and DI registers. Then, the position data concerning the position of the source and the memory address of the destination are set and then the "INTO10$_H$" command is executed.

In Step S 614, the logical product of the data on the present display and the data on the rear screen is computed, so that the front face display data can be formed. This front face data is stored in the front face display memory 307.

Preferably, this operation is conducted without changing the display on the screen. If a facility for computation between the data on both banks is available, the arrangement may be such that the data on the normal display screen is transferred to the rear screen so as to form logical product on the rear screen and then the content of the rear screen is transferred to the front face display memory 307. It is also possible to arrange such that the data on the normal display screen is transferred to the front face memory 307 and then the logical product (AND) of the content of the memory 303 and the display memory 307 is computed, followed by rewriting of the content of the front face memory in accordance with the result of computation of the logical product. This operation can be conducted at a very high speed because it can be executed in word-by-word fashion.

Step S 615 is materially the same as Step S 219 explained before. That is, an operation similar to that explained in connection with FIG. A is conducted so that the final image is formed at a high speed.

Figure 16:
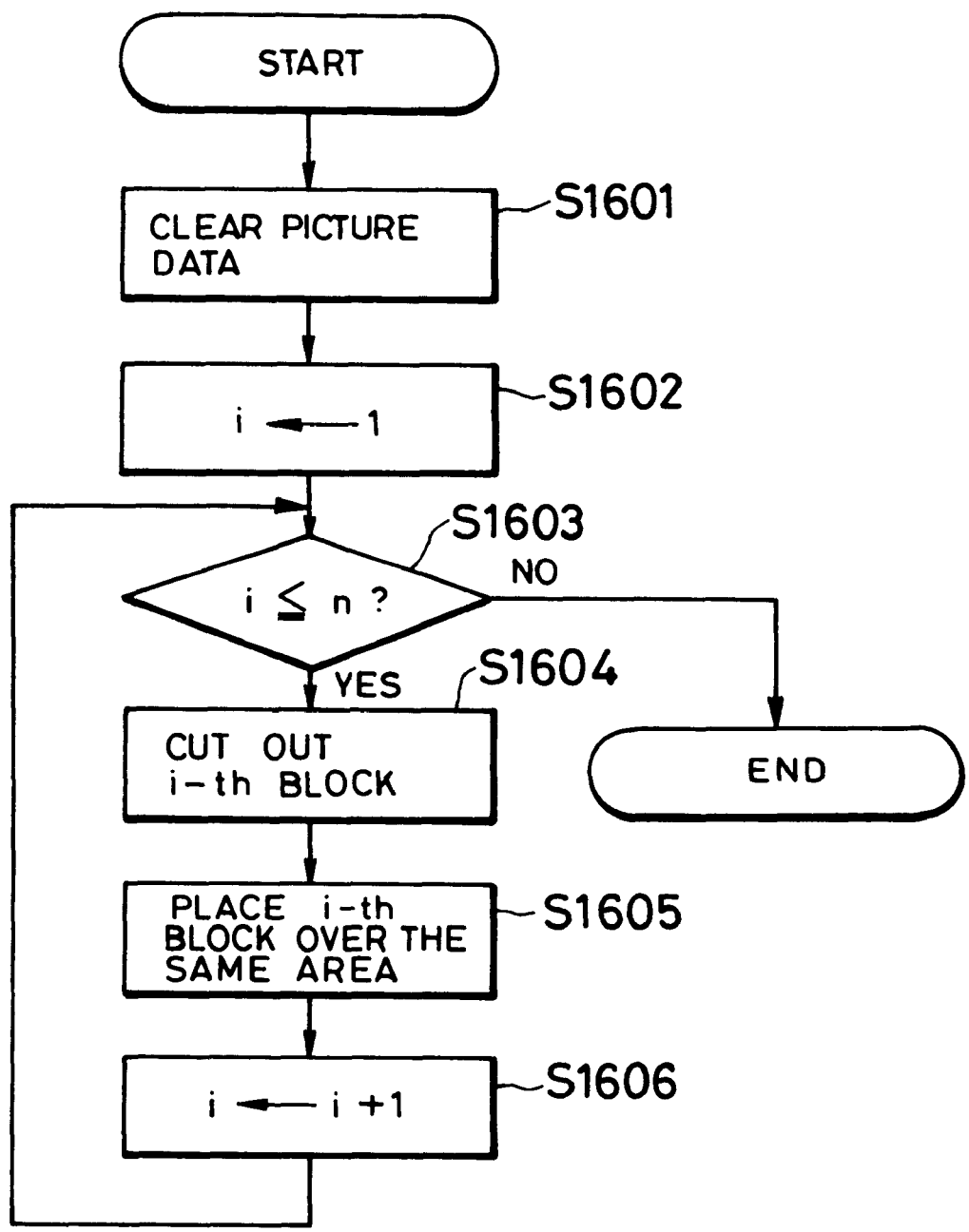
FIG. 16 is a flow chart showing the process for storing partial picture data.

In the case where the partial pictures are successively displayed and the back face or the background of the objective partial picture data is displayed immediately before the Step S 615 or the front face pictures are superposed on the back face picture as shown in FIG. 16, it is possible to execute Steps S 402 to S 904 in place of Step S 615. In this case, it is not necessary to display the back face picture repeatedly.

As will be understood from the foregoing description, in this invention, the back face picture is formed by successively putting the partial pictures from the lowermost or innermost one to the one which is immediately under the objective partial picture, and the thus formed back face picture is stored. Then, operation for displaying the group of partial picture data from the one which is next to the objective partial picture data to the uppermost or the last partial picture data and operation for forming a non-transparent portion of this group of partial picture data are conducted simultaneously. In consequence, the picture can be formed in a good order and, when the display has proceeded to the display of the uppermost or the last partial picture data, display data concerning the front face can be formed by using the non-transparent portion and the content of the display.

Therefore, when the objective partial picture data is edited or deformed, it is possible to instantaneously obtain the final image incorporating the edited or deformed partial picture data, whereby the operation is facilitated. In addition, the formation of the picture on the display can be done in such a manner as to impart a natural feel to the operator, so that the operator can operate the apparatus with ease.

In the described embodiments of the present invention, the back face data and the front face data can be formed separately from each other when each partial picture is displayed, so that, when one of the partial picture data is edited, the operator can confirm the result of the edition very quickly because the final image after such an edition is built up almost instantaneously. In consequence, the speed of editing operation is remarkably increased and the editing operation itself can be facilitated.

It is to be understood also that editing operation other than movement described hereinbefore, e.g., rotation or correction, can be conducted in the same way as the described embodiment.

Although the described embodiment incorporates specific system such as the system AS-300 of CANON INC., such a system is only illustrative and other equivalent hardware can be used to achieve the same results. If necessary, the functions of such systems or devices can be realized by software.

As will be understood from the foregoing description, in the described embodiment, the group of the partial picture data on the "inner" side of an objective partial picture and the group of the partial picture data on the "outer" or "upper" side of the objective partial picture data are formed and stored separately, so that the editing operation can be conducted quickly with a comparatively simple construction.

In addition, when the objective partial picture is edited, the operator can check the result of the edition because the final image incorporating the edited partial picture can be formed instantaneously, thus improving the efficiency of the operation. Furthermore, the formation of a picture on the display can be conducted in such a manner as to impart a natural feel to the operator, so that the operator can work with ease.

[Appointment of Partial Picture Data]

A further embodiment of the present invention will be described with reference to the drawings.

In the described embodiments, the partial pictures are geometrical patterns such as a circle, a rectangle and so forth. In this embodiment, however, the concept of the partial picture is extended such that each partial picture is an illustration of a certain object such as "mountain", "yacht", "man" and "woman", and a picture can be formed by combining these illustrations of objects formed by different partial picture data. In addition, when a certain partial picture is selected, the apparatus of this embodiment suggests various method of correction of the selected partial picture data in the form of a menu together with the expected result of correction, so that the operator can effect correction by selecting one of the suggested items of correction, whereby the correction of a picture can be conducted easily. This embodiment of the image editing apparatus having the described facility will be explained in more detail hereinunder.

Figure 18:
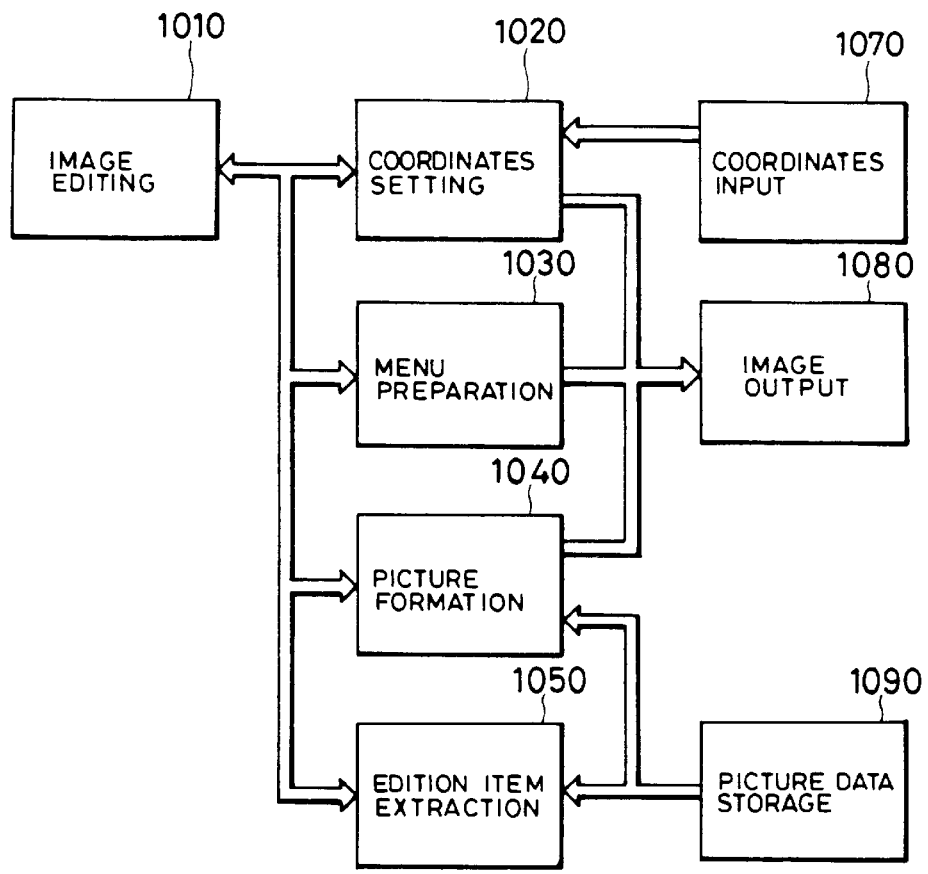
FIG. 18 is an illustration of the concept of an embodiment of the invention.
Figure 19:
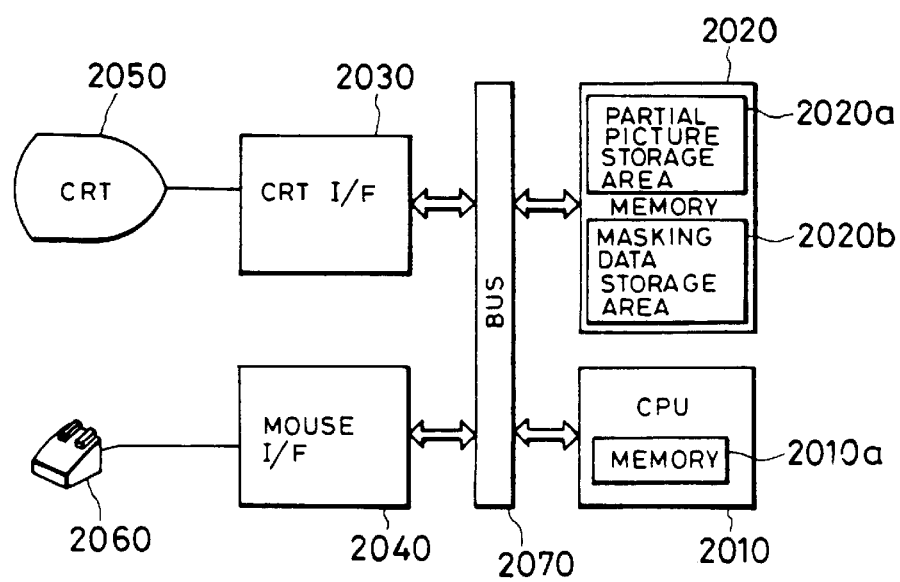
FIG. 19 is a block diagram of the hardware of this embodiment.

[General Description of Editing Apparatus]
(FIGS. 18 and 19)

FIG. 19 is a block diagram of an image editing apparatus embodying the present invention. Generally, image editing apparatus of this kind incorporate computing means such as a microcomputer or a minicomputer, and this embodiment also incorporates such a computing means.

Referring to FIG. 19, the image editing apparatus has computing means 2010 serving as a central processing unit CPU. The CPU 2010 has a memory 2010a storing various operation processes which will be explained later with reference to FIGS. 22, 26, 27, 33, 38 and 40. The CPU 2010 is connected, through a BUS 2070, to a memory 2020, a CRT interface 2030 and a mouse interface 2040. The memory 2020 has areas 2020a and 2020b for storing, respectively, partial picture data and masking data both of which will be described later. The mouse interface 2040 enables an operator to input desired coordinates to the CPU 2010 by suitably manipulating the mouse 2060, and to display image of a picture and/or a cursor on a CRT 2050 through the CRT interface 2030.

FIG. 18 is a block diagram illustrating the function of the image editing apparatus in accordance with the present invention.

Image editing means 1010 has a function to deliver to picture forming means 1040 various editing instructions such as alteration, movement and so forth of a partial picture data constituting a part of a picture, as well as other instructions such as command for displaying the picture image after the editing. The picture forming means 1040 is adapted to deliver partial picture data constituting a picture to an image output means 1080, thereby enabling a picture to be displayed.

The image output means 1080 is practically constituted by the CRT 2050 and the CRT interface 2030. Needless to say, it is not essential that the picture forming means 1040 make a direct access to the CRT interface 2030. Instead, the arrangement may be such that the display is controlled through the CRT interface 2030 through a suitable driver program. The display control system making use of such a drive program is used more commonly than the system which allows the direct access by the picture forming means. In such a case, the image output means 1080 is constituted by the drive program, CRT interface 2030 and the CRT 2050.

The image editing means 1010 is adapted to receive, through coordinates setting means 1020, coordinates appointed by the operator, thereby enabling the operator to inform the image forming means of the desired one of the partial picture data which constitute a picture. Coordinate input means 1070 is constituted, for example, by a mouse 2060, a mouse interface 2040 and a driver program, and is adapted to input coordinate setting data such as amount of movement or ON/OFF of keys which are produced by the operator through operation of the mouse 2060. The coordinate setting means 1020 delivers instructions to the image output means 1080 for outputting cursor data, while progressively changing the data concerning the cursor position in accordance with the moving amount data input through the coordinates input means 1070. The cursor output position is delivered momentarily to the image editing means. When the operator has set coordinates by pressing one of keys on the mouse (referred to simply as "mouse key", hereinafter), the thus set coordinates are delivered through the coordinates input means 1070 to the image editing means 1010 as the coordinates appointed by the operator.

Menu preparation means 1030 is adapted to receive menu items from the image editing means 1010 and to arrange these items in the form of a menu list, and enables the image output means to display the thus formed menu. The arrangement is such that, when the menu list is erased, the image which has been displayed immediately before the display of the menu is recovered on the display.

Namely, the area where the menu list is to be formed is fixed or, alternatively, the menu list is displayed after storage of data on the menu list display area and the stored data is put on the display again when the menu list is erased. The latter system is known as pop-up menu system.

[Picture Formation]
(FIGS. 20 to 24)

The formation of the picture to be displayed is conducted by the picture forming means 1040 in a manner which will be explained hereinunder by any of example.

Referring to FIG. 20, the picture forming means has a picture constitution table 3010. This table 3010 is stored as data in the memory 2020. The picture constitution table 3010 has a plurality of lines $e_1, e_2, e_3, \ldots, e_n$, and each of these lines corresponds to one element of the picture to be formed. These lines are sectioned into two columns 3020 and 3030. The column 3020 is intended for storing identifiers for identifying the partial picture data corresponding to the respective picture constituent elements, while the column 3030 is adapted to store various display mode constants concerning the partial picture data of the respective lines. The display mode constants are data or parameters which are used for processing and locating the partial picture data. Thus, in a simple system, coordinates conversion constants are set in the column 3030. When the apparatus is not required to conduct any rotation, enlargement and contraction of the image, amounts of displacement in x- and y-directions necessary for the translational movement are set in the column 3030.

In the picture constitution table shown in FIG. 20, data "mountain ;" is stored in line $e_1$, column 3020. The symbol ";" annexed to the data is a delimiter character which is not included by the identifier. Thus, the data "mountain ;" represents partial picture data which is identified by an identifier "mountain". Coordinates $x_1, y_1$ are set in column 3030 of the same line $e_1$. This means that the "mountain" should be located at the position represented by the coordinates $(x_1, Y_1)$. Similarly, the line $e_2$ of the table represents that the partial picture data "mountain" should be disposed at a position represented by coordinates $(x_2, y_2)$, while the line $e_3$ represents that partial picture data identified by the identifier "person" should be disposed at a position represented by coordinates $(x_3, y_3)$. The lines $e_4$ to $e_n$ have no identifier and contain only delimiters ";". This suggest that the picture be composed of the three partial picture data shown in lines $e_1$, $e_2$ and $e_3$. The construction of the data composed of an identifier and a delimiter is only illustrative, and the described method of inputting data to the picture forming table 3010 is not exclusive. All that is necessary is that the type of the partial picture data and the display mode constants are distinctively distinguished.

The partial picture date is stored in the partial picture storage area 2020a in the memory 2020, together with the attributes. In general, a variety of partial picture data is used so that the memory 2020 is required to have a large storage capacity. It is, therefore, advisable to use an external storage means such as a magnetic disk for the purpose of storage of the partial picture date. The hardware shown in FIG. 19 can be used without modification when the memory 2020 is composed of the external storage means and the main memory. On the other hand, when the external storage means has to be used separately, such an external memory means is connected through a BUS 2070. Anyway, no substantial change is caused in the hardware by the use of external storage means. When external storage device is used, the data stored in such an external storage device is stored into a plurality of files so that these data may be accessed according to the names of the files. For instance, it is possible to prepare files bearing the names cooresponding to the types of the identifiers, so that the partial picture data of the same identifier are handled in one file. For the purpose of simplification of the system, the partial picture data are stored in the form of a raster scan image file, with a suitable code representing, for example, the data size attached to the leading end of the file.

FIG. 21A shows, by way of example, the partial picture data having an identifier "mountain". This partial picture data is stored in the memory 2020 together with a masking data which includes, as shown in FIG. 21B, a white mountain-shaped area of "0" level and a black background portion of "1" level. Thus, the memory 2020 simultaneously store both the partial picture data as shown in FIG. 21A and the masking data as shown in FIG. 21B. When a plurality of partial picture data are superposed successively, the mountain portion is first blanked and then written again so that the partial pictures can be superposed in the correct positional relationship, by writing the successive partial pictures starting from the innermost one.

Figure 23:
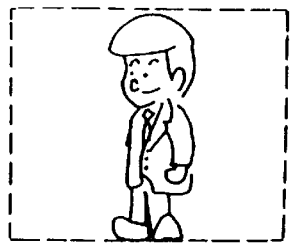
FIG. 23 is an illustration of the partial picture data for constituting an illustration of a "person"

FIG. 23 shows a partial picture data having an identifier "person". A masking data corresponding to this partial picture data also is stored in the masking storage area 2020b in the memory 2020. Thus, in this embodiment, a plurality of partial picture data having the same identifier are stored in the same file, and files thus formed are stored in the picture data memory means 1090.

The term "masking data" is used here to mean data which is formed by setting all the picture elements at "0" level on and within the contour of each partial picture data. For instance, FIG. 21B shows masking data corresponding to the partial picture data "mountain" shown if FIG. 21A. As will be seen from FIG. 21B, the masking data may mask other portions out of the configuration of the partial picture, such as the foot of the mountain.

Thus, in this embodiment, the partial picture data having the same identifier are stored in the same file so that a plurality of files are formed so as to constitute the picture data memory means 109.

Figure 22:
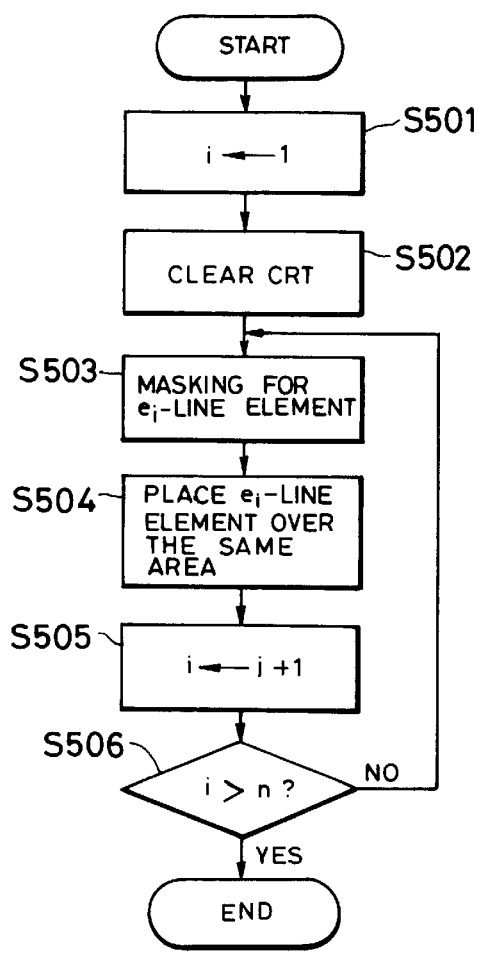
FIG. 22 is a flow chart illustrating the process for developing partial picture data.

FIG. 22 shows the flow chart of a process for forming the picture. It is assumed here that various identifiers and display mode constants are already set in the picture constitution table 3010. The picture constitution table 3010 is displayed on the disiplay screen and various parameters of this table are input through, for example, a keyboard which is not shown. The input of parameters, however, may be conducted by another means such as a touch panel which carries various identifiers to be touched by the operator. The coordinates in the parameters may be input through a suitable coordinates input device such as a mouse.

In Step S 501, the picture constitution table 3010 is looked at from the fist line, so that "1" is set as the initial value of "i". In step S 502, the display screen is cleared. In Step S 503, masking is effected from the coordinates ($x_1$, $y_1$) in accordance with the making data which corresponds to the partial picture identified by the identifier set in the i-th line $e_i$. That is, a computation is conducted to determine the logical product between the masking data and the data on the display screen, and the result of this computation is displayed as the display data.

For instance, when the masking data as shown in FIG. 21B is used in which the black and white portions have "1" and "0" levels, respectively, the logical product is obtained such that only the "mountain" portion is cleared while other data are retained. In Step S 504, partial picture data is picked up in place of the masking data and the partial picture is drawn on the display screen at the position determined by the coordinates ($x_1$, $y_1$). This can readily be achieved by computing logical sum (OR) in place of the logical product (AND).

A single partial picture is thus developed. In Step S 505, the number i is incremented by "1" and the process proceeds to Step S 506 in which the incremented number i is compared with the total number n of the input partial picture data, thereby judging whether the development (superposition) of all the partial pictures is completed. Namely, the operation described before is continued until all the partial picture data are developed and superposed.

Figure 24:
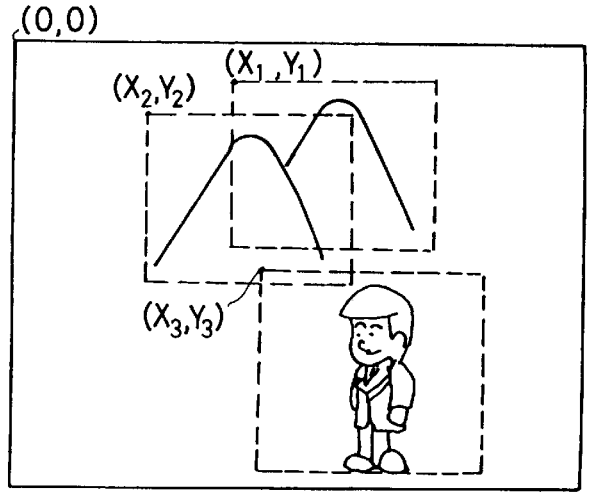
FIG. 24 is an illustration of partial picture data displayed on a display screen.

FIG. 24 shows the image formed through the described process for superposing a plurality of partial picture data. The broken lines appearing in FIG. 24 are not actually displayed but are shown for the purpose of indicating the relationships between the partial image data.

The position of development of each partial picture data is conducted by using the left upper corner of the display area as the origin (0, 0) of coordinates, and the translational movement of the picture constituent elements is conducted by using this point as the reference.

The partial picture data "mountain;" in the line $e_1$ of the table is developed at the position ($x_1$, $y_1$) appointed by the display mode constants of the data, so that the picture of mountain is displayed at the position corresponding to the coordinates ($x_1$, $y_1$) on the display. The partial picture data of the second line $e_2$ is to be displayed at the position ($x_2$, $y_2$). Therefore, as explained before in connection with Step S 503, a masking operation is conducted to clear the left lower portion of the mountain formed at the position ($x_1$, $y_1$) and the new "mountain" is written to partially overlap the first mountain as illustrated. Similarly, the partial picture data in the line $e_3$ of the picture constitution table is developed at the appointed position ($x_3$, $y_3$), so that a partial picture of a "person" is displayed, thus completing a picture as shown in FIG. 24.

[Retrieval of Partial Picture (Picture Constituent Element)]

A description will be made hereinunder as to a method for enabling the operator to retrieve a desired partial picture, i.e., a picture constituent element. This retrieving function is conveniently used when the operator wishes to alter or correct desired one of the plurality of partial pictures constituting the final picture. As explained before, since the final picture is composed of a plurality of partial pictures which are superposed one on another, each underlying partial picture may be hidden partially behind the overlying partial picture. In order to make access to such a partially hidden partial picture, it is necessary that a suitable means be available for retrieving the corresponding partial picture data.

It is assumed here that a picture image as shown in FIG. 25A is displayed on the display screen in accordance with the output from the image output means 1080. In this state, the coordinates setting means 1020 outputs the graphic cursor 8010 and the graphic cursor 8010 is moved in accordance with the movement of the mouse 2060 caused by the operator. In FIG. 25B, the graphic cursor 8010 has been moved in accordance with the movement of the mouse 2060 to a position where it points the "person". Though the graphic cursor 8010 seemingly points the "person", it is still uncertain whether the partial picture data "person" is appointed by the cursor from the view point of operation of the apparatus. Thus, a problem is posed as to the manner in which the operator confirms the partial picture data actually pointed by the graphic cursor 8010.

As explained before, the operator pushes a mouse key to commence the retrieval of the desired partial picture data. The process for retrieving the partial picture data will be explained with reference to the flow chart shown in FIG. 26. The coordinates of the point which is pointed by the head of the graphic cursor 8010 in FIG. 25B are $(x_c, y_c)$.

In step S 901, the number i is initialized by n, and the number i is decremented by "1" in Step S 905. Operation is stopped when i=0 is confirmed in Step S 906, and otherwise the process returns to Step S 902. Thus, Steps S 902 to 904 are repeatedly executed to scan the lines $e_n$ to $e_1$. That is, the lines in the picture constitution table 3010 are successively read starting from the lowermost line. This means that the successive picture constituent elements are checked, starting with the uppermost or the latest one, for the presence of the coordinates $(x_c, y_c)$. Therefore, when the graphic cursor points a portion where two mountains overlap each other, the "new" mountain which was formed next to the "old" mountain is selected. This operation will be described in detail with reference to the flow chart. In Step S 902, a check is conducted as to whether the picture constituent element written in the line $e_1$ is actually contained in the picture. In this embodiment, this checking operation can be conducted by examining the table as to whether the line $e_1$ contains an identifier, i.e., whether the column 3020 of the line $e_1$ contains only the delimiter or both an identifier and the delimiter. When only the delimiter exists, it is judged that the data in this line does not constitute any part of the picture, so that the process proceeds to Step S 905 for checking the upper line. Conversely, when an identifier is found, the process proceeds to Step S 903 and the file corresponding to the identifier shown in the column 3020 of the line $e_1$ is extracted. Then, the effective size of the partial picture data is computed from the data shown in the file.

Any known format can be used as the format of the header of the file in the invention. Anyway, the effective size of the partial picture data can be computed from the format or, even when the size data is not contained in the format, the data size can be known from another portion of the memory in connection with the identifier. In some cases, the effective size is fixed. In the described embodiment, raster image is used for the purpose of simplification, so that x-direction length $\Delta x_i$ and the y-direction length $\Delta y_i$ of the rectangular region are computed. The thus computed lengths are converted in accordance with the display mode stored in the column 3030 of the line $e_1$, whereby the region on the display area to be occupied by this partial picture is computed. In the illustrated embodiment, since the movement is a simple translational movement, the rectangular region having lengths $\Delta x_i$ and $\Delta y_i$ from the point $(x_i, y_i)$ is the region to be occupied by the picture constituent element shown in the line $e_i$ of the picture constitution table. Thus, the x-coordinate is computed to be not smaller than $x_i$ but below $x_i+\Delta x_i$ while the y-coordinate is computed to be not smaller than $y_i$ but below $y_i+\Delta y_i$. In Step S 904, a judgment is conducted as to whether the given coordinates $(x_c, y_c)$ falls within the region mentioned above. If these coordinates fall within the above-mentioned region, it is judged that the objective picture constituent element is the one which is set in the line $e_1$ of the picture constituting table, and the process is finished. However, if the judgment is Step S 904 has proved that the given coordinates $(x_c, y_c)$ do not fall within the above-mentioned region, the process proceeds to Step S 905 so as to check the partial picture data specified in the upper line of the table. Thus, when the number i attained at the time of completion of this process ranges between 1 and n, the objective partial picture is judged to be the one which is specified by the partial picture data set in the line $e_i$. A condition (i=0), therefore, means that there is no partial picture, i.e., that the graphic cursor does not point any partial picture.

[Editing of Image]

(FIGS. 25B to 25F, FIGS. 27 to 32) It will be understood that the desired partial picture constituent element can be retrieved by the operator can as desired. The operator then effect a desired editing operation on the thus retrieved partial picture. The manner in which the editing is conducted will be described hereinunder with reference to FIG. 27 which shows the flow of the editing process.

The picture constituent element to be edited is determined in Step S 1001. The method of determination may be the same as that explained before in connection with the flow shown in FIG. 26. That is, the operator moves the mouse so as to move the graphic cursor 8010 to a position where it points, for example, the partial picture constituent element "person". Then, the operator presses a mouse key, so that the coordinates $(x_c, y_c)$ pointed by the head of the graphic cursor 8010 are examined as to whether they belong to the region of any one of the partial picture data listed in the picture constitution table 301*b*. In this case, since the pointed coordinates $(x_c, y_c)$ belong to the region of the partial picture constituent element shown in the line $e_3$ of the table, this picture constituent element (person) is judged to be the one which is appointed by the operator for the editing purpose.

In Step S 1002, items of edition which can be effected on the thus appointed picture constituent element are determined and presented in the form of a menu list. More specifically, the identification name of the partial picture data allocated to the partial picture constituent element retrieved in Step S 1001 is picked up by means of the picture forming means 1040. Practically, the picture forming means picks up the identification name appearing in the column 3020 of the line $e_3$ in the picture forming table 3001 is picked up. The thus picked up identification name is extracted by editing item extraction means 1050 and is used as an item in the menu list. The operation of the editing item extraction means 1050 is as follows. An editing item table 1101 (see FIG. 28) is formed for each of the partial picture data. The table 1101 contains a plurality of pairs of data, each pair including a plain descriptive explanation of editing item which can be applied to the partial picture and the content of the edition. More specifically, the editing item table 1101 includes a column 1102 which contains the editing items and a column 1103 which contains the contents of edition. In a simple system in which the editorial work includes only substitution of partial pictures, the column 1103 contains only the identification name of the partial picture data as the object of the substitution together with the delimiter. As in the case of the picture constitution table 3010, the line in which the column 1102 contains only the delimiter is judged as being invalid. Each edition item table 1101 thus formed is stored in the file in which the pertinent partial picture data are stored. In operation, therefore, the partial picture data file pertaining to the objective partial picture data is picked up by appointing the file name, and the editing item table is picked up from this table, and the contents of this table are picked up as the menu list item until the column having only the delimiter is reached. The formation of the menu list for the selected picture constituent element is completed by adding to the above-mentioned menu list items any items which are common to all the types of partial pictures. Examples of such common items are an alteration of the position at which the picture constituent element is output, a change in the form of display, and so forth. For instance, when the partial picture "person" has been selected, the menu list can contain, for example, five types of menu such as "change display position", "play tennis", "play golf", "ski" and "skate". When the items of the menu list are determined, these items are delivered to the menu forming means 1030, thereby to form and display the menu. This can be done in a known manner such as by "pop-up menu" technique.

In consequence, the menu is put on display as shown in FIG. 25C, so that the user can select a desired menu by means of the mouse 2060, in Step S 1003. When the "change display position" is selected, the position of display of the partial picture "person" is changed in Step S 1004, whereas, when another menu is selected, # the process proceeds to a substitution process (Step S 1005) for changing the forms of the partial picture "person". The selection of items in the menu may be conducted by allocating code Numbers to the items and appointing one of the code Numbers by, for example, a keyboard.

The process will be described hereinunder on an assumption that the operator has moved the graphic cursor 8010 to a position where it points "play tennis" and pressed the mouse key.

Practically, edition data is extracted by edition item extracting means. That is, the content of the column 1103 in the first line of the edition item table shown in FIG. 28 is extracted. This data has an identification name "person 00". Then, the content of the column 3020 in the line $e_3$ of the picture constitution table 3010 is changed to "person 00", thus completing the substitution. Thus, the picture constitution table 3010 is rewritten as a picture constitution table 3010a in FIG. 29. When the identifier "person 00" identifies the partial picture as shown in FIG. 30, the display content as shown in FIG. 25C is changed into that shown in FIG. 25D.

Figure 27:
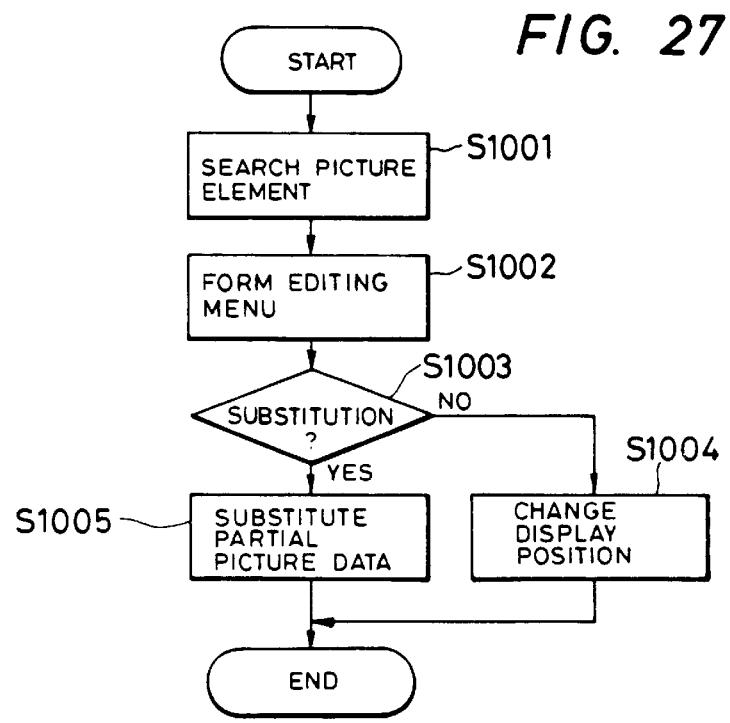
FIG. 27 is a flow chart illustrating the process for editing an image in this embodiment.

An edition item table 1401 shown in FIG. 31 is prepared for the identifier "person 00", and the edition is conducted in accordance with the procedure shown in FIG. 27. When the operator appoints the person holding a tennis racket, the display content is changed into that shown in FIG. 25E. When the identifier "person 04" identifies a partial picture as shown in FIG. 32, the display content is changed to that shown in FIG. 25F as the operator selects "hit" on the menu.

As will be understood from the foregoing description, in this embodiment, after a plurality of partial picture data are located, one set of these data which the operator wishes to edit is selected and then a suitable editing is effected to change the form of display thereof. Thus, the form of display can be progressively changed from the initial form of the display. More specifically, in this embodiment, the partial picture data "person" is selected from a plurality of sets of partial picture data and the thus selected "person" is changed to a tennis player and the tennis player if finally shown in a state hitting a ball.

The described change in the state of the display is only illustrative and various modifications are possible. For instance, the partial picture data "person" may be sorted into "man" and "woman" or "adult" and "child". These sorting data may be added by means of menu when the operator has pressed the mouse key after moving the graphic cursor to point the "person" on the display.

Although the change in the state of display has been described with specific reference to the partial picture data "person", it will be understood by those skilled in the art that the same process can be applied also to the partial picture data "mountain". The menu can have a wide variety depending on what kinds of partial picture data are prepared for the "mountain". For instance, it is possible to display the appearance of the mountain in four different seasons. The selection of the illustration will be further widened if the color display function is available.

Thus, the number of variations of each set of partial picture data can be increased by increasing the quantity of the partial picture sets of data. These data, however, have to be stored beforehand in the memory 202. Therefore, as explained before, the memory 202 may be stored in an external memory device such as a disk device and the partial picture data and the masking data are read as desired from the external memory device.

As has been described, picture data corresponding to a significant portion of a picture is registered as partial picture data. At the same time, a variety of editing operations which can be applied to each set of partial picture data are registered together with display form data which appropriately represent the contents of the editing.

A picture may be constituted by a single set of partial picture data or may be assembled from two or more set of partial picture data, by suitably positioning such data through, for example, coordinates conversion.

In operation, as the operator selects one of the sets of partial picture data as the object of editing, an editing menu is automatically formed in accordance with the above-mentioned editing data. The operator then selects a desired edition item or an item which is considered as approximating the desired edition item. In consequence, the picture is automatically corrected and the desired picture to be obtained is formed progressively. In general, drafting of a picture by an image forming system is rather difficult to conduct unless the operator has a sense of painting or drawing. With the apparatus of the invention, however, a picture can be drafted very easily substantially in the same manner as "patching" of configured paper sheets on an illustration book. The thus formed illustration can be then suitably trimmed through a suitable selection of items on the menu, so that the desired picture is obtained finally.

Although no description has been made as to the method of conducting initial lay-out of the partial picture data, it will be understood that the lay-out can be accomplished by selecting the desired partial picture data according to their identification names, and locating them in the same manner as that explained before in connection with the movement of display position. Thus, the lay-out system is materially the same as that of known geometric pattern editing systems and, hence, detailed description of the lay-out system is omitted.

Although in the described embodiment various data are set and stored in the form of tables, this is not exclusive and the storage of data may be conducted by other means than tables, such as lists and other known data storage and reference systems.

It will be also understood that the partial picture data may be vector data formed by combining various geometrical data, although the described embodiment makes use of raster scan images.

The use of the graphic cursor is not essential and the combination of the cursor and the mouse may be substituted by other suitable coordinate input means such as a touch panel or other direct input system.

Thus, the embodiment described hereinabove has a plurality of partial picture constituent elements and a plurality of modifications for each of such constituent elements. The lay-out and selection of such data and modifications can be conducted very easily so that drafting and edition of pictures can be conducted even by those who are not so skilled in this type of work.

[Clarification of Selected Picture Constituent Element] (FIGS. 33 to 39)

A description will be made hereinunder as to a further embodiment in which the retrieval of the picture constituent elements is further improved.

In the preceding embodiment, as explained in connection with FIG. 27, the retrieval of a desired picture constituent element is conducted by moving the mouse 2060 to bring the graphic cursor 8010 to a position where it points the desired picture constituent element and pressing the mouse button. In response to this operation, the plurality of picture constituent elements are retrieved in the order which is the reverse of the order of display, until the picture constituent element containing the appointed coordinates is found, thus selecting the picture constituent element to be edited. In this embodiment, however, there is no means of indicating the picture constituent actually selected, so that the operator cannot know which one of the picture constituent elements has been selected actually.

This problem, however, is overcome by this embodiment as will be understood from the following description of the process taken in conjunction with the accompanying drawings.

The program of this process also is stored in the memory 2010a, and the CPU 2010 operates in accordance with the stored program to carry out this process.

In Step S 1601, the coordinates ($x_c$, $y_c$) appointed by the operator are input in the same manner as that described before. In Step S 1602, a retrieving operation is conducted to search out this coordinate ($x_c$, $y_c$).

Figure 26:
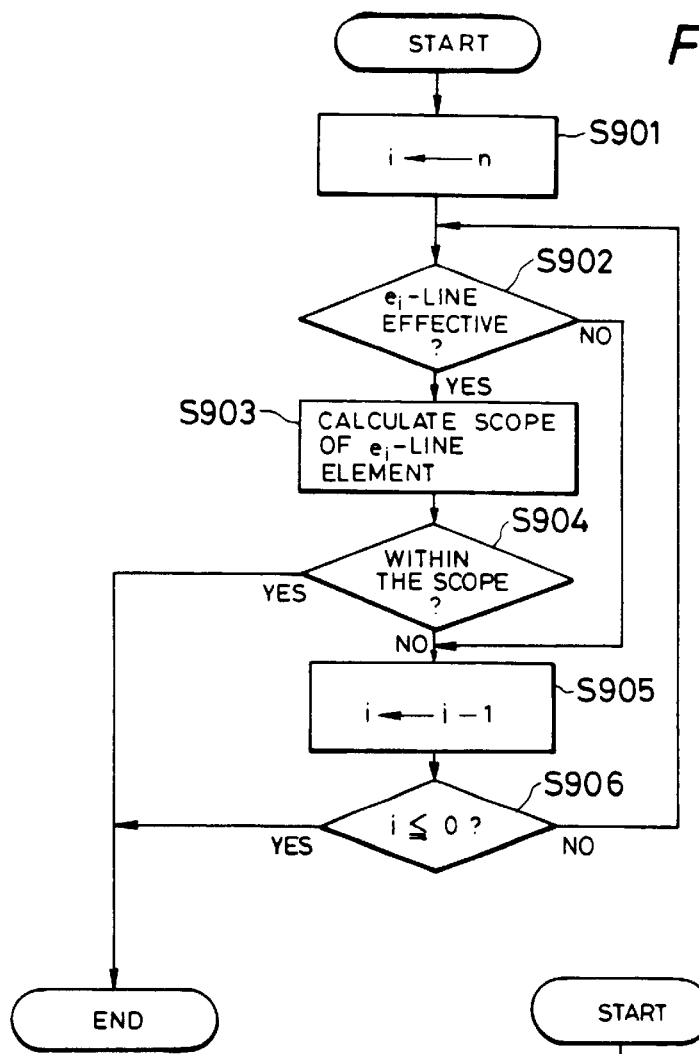
FIG. 26 is a flow chart illustrating the process of retrieval in the described embodiment.

These steps can be conducted by the flow chart shown in FIG. 26. In Step S 1603, a judgment is conducted as to whether there is any object. In this embodiment, as in the case of the preceding embodiment, it is judged that there is no object when the number i has been reduced to 0. Otherwise, the partial picture data shown in the line $e_1$ is determined as the objective partial picture data found out through the retrieval. The process is completed when there is no object. Needless to say, the operator can finish this process after effecting a suitable edition such as addition of a picture, even when there is no objective partial picture data.

In Step S 1604, a half-tone or meshing operation is conducted. The meshing operation can be carried out by, for example, computing the logical sum (OR) of the pattern shown in FIG. 34 and the image on the display screen. For instance, an image as shown in FIG. 35 is obtained by the OR of the pattern shown in FIG. 34 and the display image as shown in FIG. 25A.

Figure 34:
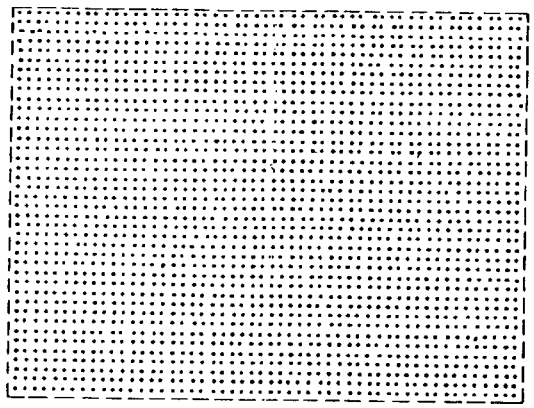
FIGS. 34 to 37 are illustrations for explaining the flow chart shown in FIG. 33.
Figure 35:
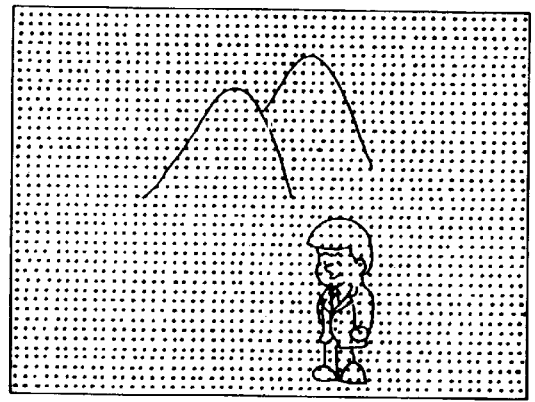
Figure 36:
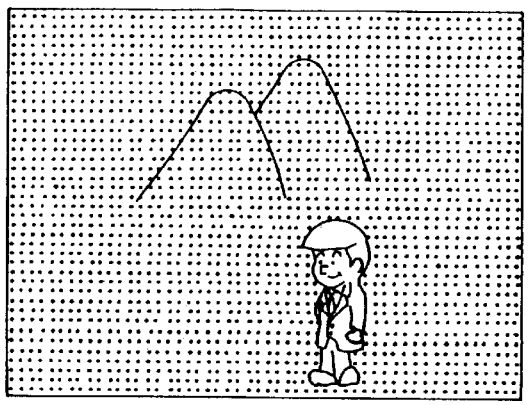

The display of a fixed pattern may be conducted by repeating a unit pattern in a small section, without using the image data over the whole display area as shown in FIG. 34. In step S 1605, the objective partial picture constituent element is displayed. In this Step, therefore, the partial picture data contained in the line $e_i$ identified by the value of i determined in Step S 1602 is put on display. This operation can be conducted substantially in the same way as Steps S 503 and S 504 in the flow chart shown in FIG. 22. In consequence, the display content is changed as shown in FIG. 36 so that the operator can confirm that the designated partial picture has been selected correctly.

Figure 37:
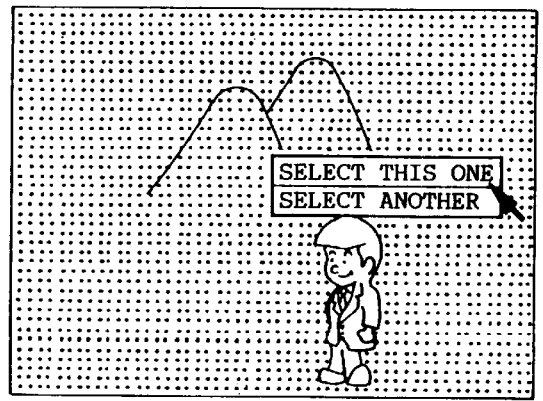

In Step S 1606, an acknowledgment is given by the operator to acknowledge the correct selection of the desired partial picture. This can be conducted through giving an answer YES or NO through the keyboard in response to a message shown on a suitable portion, e.g., the lower blank, of the display screen, or may be done by selecting appropriate item in a menu which is displayed, for example, as shown in FIG. 37. In the latter case, when the operator has selected "Select This" by means of the mouse 2060, the CPU judges that the partial image now on display is the very one that the operator wishes to edit. However, if the operator has pointed "Select Another" or an area out of this menu, the CRT judges that the partial display data now on display is not the one which the operator would like to select. Namely, when the operator has given consent to the displayed partial picture constituent element, the process proceeds from Step S 1607 to Step S 1608. If no consent is given, the process is ceased.

Step S 1608 is constituted by sub-steps which are materially the same as Steps S 1002 to S 1005 in the flow chart shown in FIG. 27. An editing operation which has already been described can be effected in Step S 1608 on the selected partial picture constituent elements. When the partial picture data longed for by the operator could not be selected in Step S 1607, the operator can retrieve another partial picture constituent element.

Figure 38:
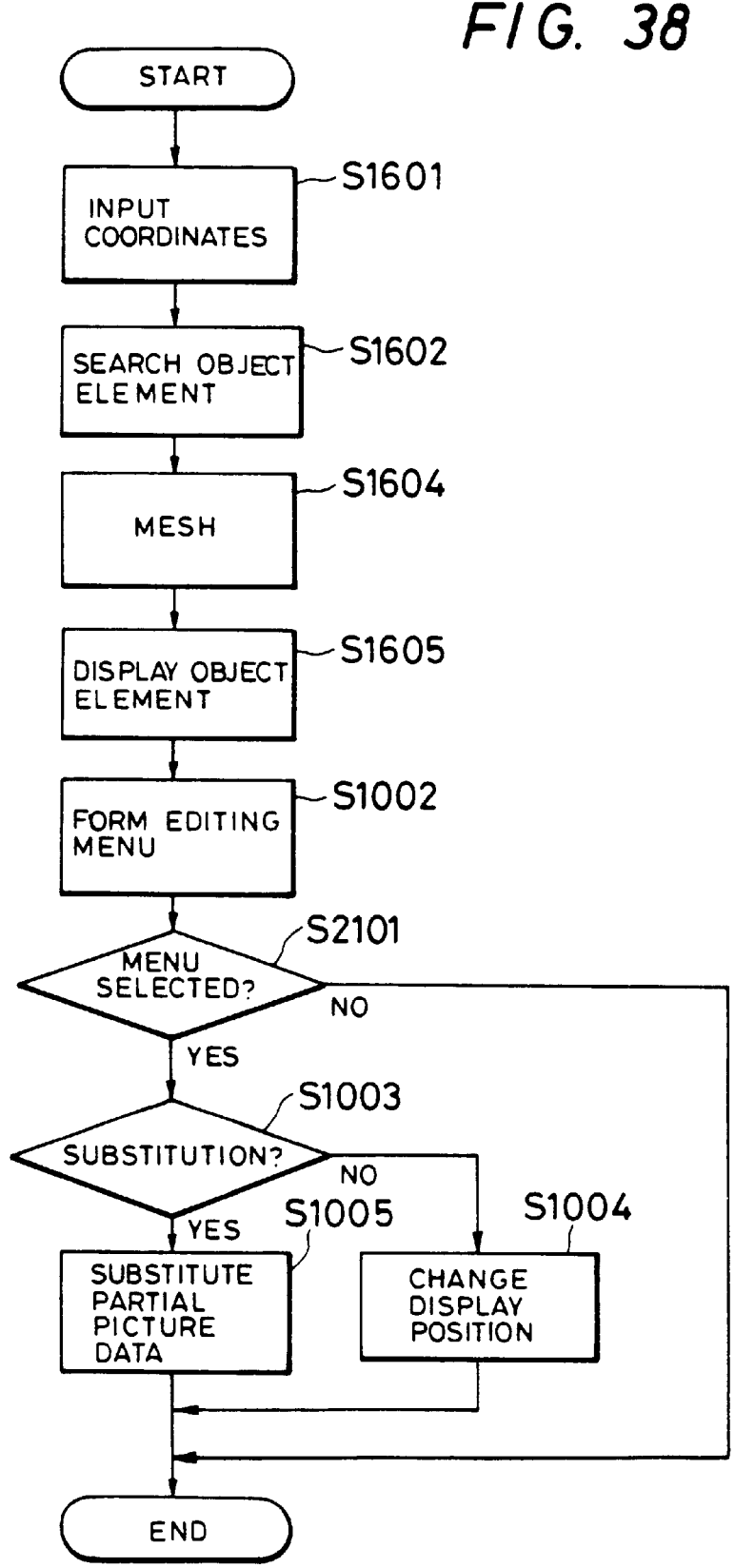
FIG. 38 is a flow chart of an alternative of the process shown in FIG. 33.
Figure 39:
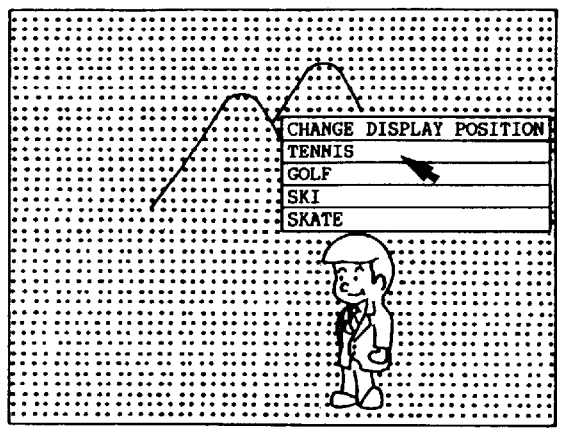
FIG. 39 is an illustration of retrieved partial picture constituent element.

Thus, in the described embodiment, the retrieved partial picture constituent element is displayed after half-tone or meshing operation and a chance is given for the operator to confirm whether the desired partial picture constituent element has been selected correctly. This, however, is not exclusive and the arrangement may be such that an editing menu is displayed when the partial picture constituent element is put on display so that the operator conducts an edition by appointing one of the editing items if the displayed partial picture is the very one which he would like to edit. However, when the displayed partial picture is not the one to which he would like to access, the operator gives a sign of refusal by pointing an area out of the editing menu, whereby the edition is prohibited. It is possible to arrange such that an editing menu for use in the case where no object is found is prepared so that the same process as that in the case where the objective partial picture data is found may be applied also to the case where there is no objective partial picture data. In such a case, a flow chart as shown in FIG. 38 is applied. The program for executing this process is stored in the memory 2010. It is also to be understood that, in this flow chart, the same reference numerals are used to denote the same Steps as those in the flow charts explained before.

Figure 33:
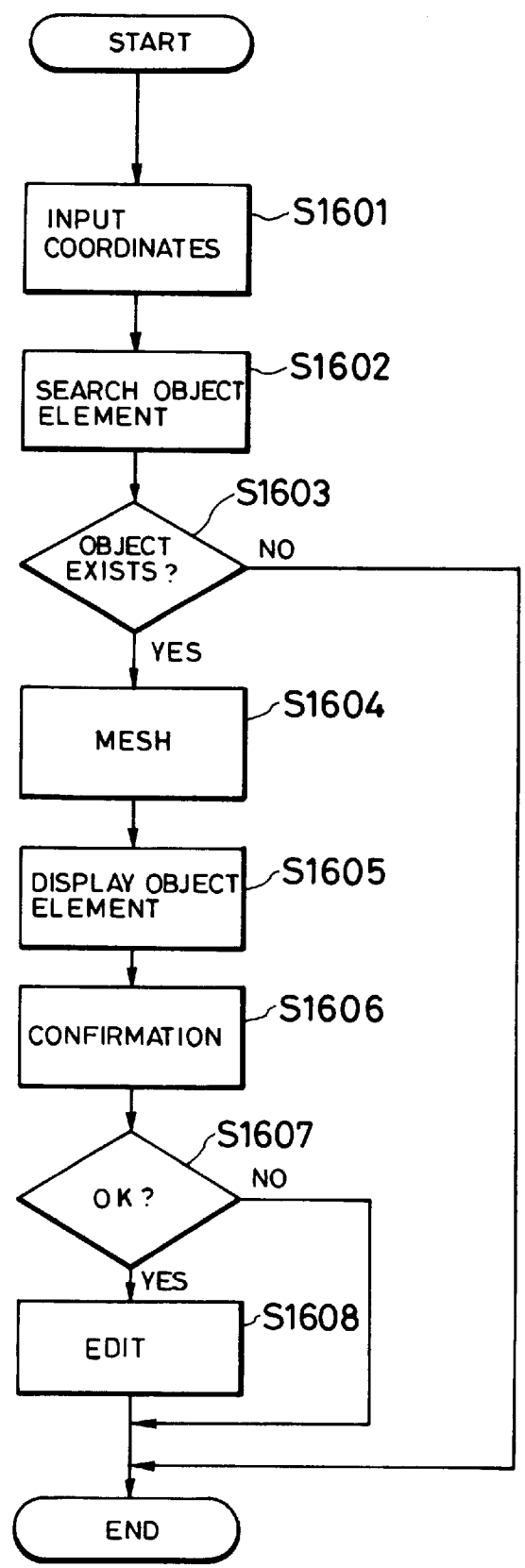
FIG. 33 is a flow chart of a process for clarifying the selected partial picture image in accordance with the present invention.

The process shown in FIG. 38 is devoid of judging Step S 1603 employed in the process shown in FIG. 33, so that Step S 1604 is executed regardless of whether the objective picture constituent element exists or not. In Step S 1605, the objective picture constituent element is displayed if any, and then a step which is the same as Step S 1002 in FIG. 27 is executed, thereby to output a menu. In Step S 2101, when any one of the items in the menu is selected, the process proceeds to Step S 1003. Then, editing operation is conducted in that same manner as the explained before in connection with FIG. 27. When a region out of the menu is appointed in Step S 2101, the CPU judges that the displayed partial picture is not the one that the operator would like to edit, and ceases the process without allowing editing.

In this case, it is desirable that the editing menu is displayed at a position where it does not hide the retrieved picture constituent element which is now on display. For instance, the menu is displayed in a manner as shown in FIG. 59. The position of display of this menu may be computed in relation to the position of display of the retrieved partial picture constituent element.

Although in the described embodiment the half-tone operation is conducted by covering the display area with black dots, this is not exclusive and the half-tone may be produced by white blanking or by effecting an inversion in the form of a mesh. When the display is made in a multiplicity of colors, the half-tone can be produced by covering the display area with a mesh of a specific color, or the colors are changed through inversion of the color data bits.

[Clarification of Other Selected Partial Image]

In the preceding embodiment, the area other than the selected partial picture constituent element is indicated by half-tone. This, however, is only illustrative. A different embodiment will be described hereinunder with reference to a flow chart shown in FIG. 40.

In Step S 2301, the coordinates ($x_c$, $y_c$) appointed by the operator are input, as in the case of the Step S 1601 in the flow chart shown in FIG. 38. Then, in Step S 2302, a retrieval is conducted to search the picture constituent element which contains the coordinates ($x_c$, $y_c$). As explained before, this retrieval can be conducted by the flow explained before in connection with FIG. 26. In Step S 2303, an operation is conducted to display the partial picture constituent element obtained in Step S 2302, i.e., the data in line ei. This also can be conducted by a known routine, i.e., Steps S 503 and S 504 in the process shown in FIG. 22. In Step S 2304, a message is output to a suitable portion on the display screen so as to enable the operator to check whether the partial picture constituent searched and displayed in response to the input coordinates is the one which the operator would like to edit. The confirmation or acknowledgment may be done through giving an answer YES or NO from the keyboard as in the preceding embodiment or by making use of a menu. When the menu is used as means for allowing the operator to give a confirmation or acknowledgment, the process may be as follows.

Figure 41A:
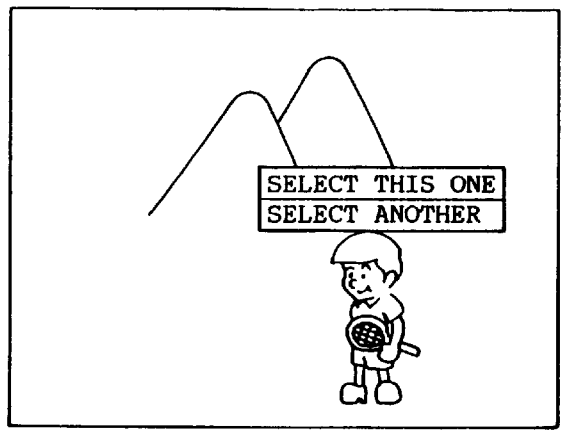
FIGS. 41A and 41B are illustrations for explaining the process shown in FIG. 23.

Namely, in this case, a menu as shown in FIG. 41A is displayed such that the operator can select one of the items in the menu. In next step S 2305, a judgment is made as to whether the selection of item in the menu has been completed. If the answer is NO, the process proceeds to Step S 2306 in which EXCLUSIVE OR is computed with the masking data corresponding to the selected partial picture constituent element or the element itself, thereby inverting the display of the retrieved partial picture constituent element. Then, the process returns again to Step S 2305, and this operation is repeated until any item in the menu is selected. In the meantime, therefore, the retrieved partial picture constituent element "person playing tennis" is displayed alternatingly in the state shown in FIG. 41A and in the state shown in FIG. 41B, so that this partial picture blinks to enable the operator to judge whether the displayed partial picture data is what he would like to edit.

Figure 41B:
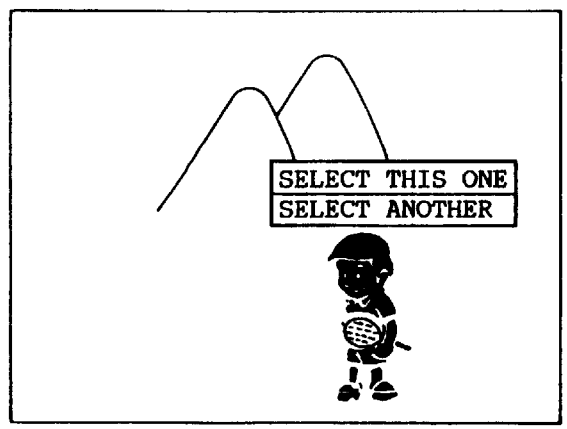

When selection of an item in the menu is detected, the process proceeds to Step S 2047 in which a judgment is conducted as to which item has been selected from the menu. When the selected item is the "Select This", the CPU judges that this partial picture constituent element is the very one that is desired by the operator, and proceeds the process to Step S 2308, whereas, if the selected item is the "Select Another", the CPU judges that the partial picture now on display is not the one which the operator would like to select, and ceases the operation. In the latter case, the CPU may proceeds the process for retrieval of next lines from the presently retrieved line i. The blinking of the displayed partial picture constituent element is not essential. That is, the retrieved partial picture may be displayed in inverted state as shown in FIG. 41B until an item in the menu is selected. When the judgment in Step S 2302 has proved that there is no object of retrieval, the process may be proceeded without display of dummy and, hence, without blanking, and the editing operation may be conducted over the whole display area.

[Clarification of Other Selected Partial Picture Constituent Element]

(FIG. 42)

In the preceding embodiment, in order to distinctively indicate the selected partial picture constituent element, half-tone operation or inversion is conducted after displaying the whole picture, and then the selected partial picture constituent element is displayed again. This, however, is not exclusive. For instance, the half-tone operation may be conducted simultaneously with the formation of the picture. This offers an advantage particularly in the case where the hardware adopts bit block transfer, because the reduction in speed due to addition of this function can be minimized. A typical example of bit block transfer is realized as BitBlt (Bit Block Transfer) in SMALL-TALK 80 (registered trademark of Xerox). Although in this example the bit block transfer is realized by means of software, various proposals have been made to construct hardware realizing this function. The following description, therefore, will be made on an assumption that hardware realizing this function is incorporated.

A standard method or program for representing a bit pattern by this SMALL-TALK 80 is shown below.

In the following program, a mark @ represents a demarcation and may be regarded as being materially identical to a comma.

aBB←BitBlt
destform: Display
sourceForm: sForm
halftoneForm: Form black
combinationRule: Form over
destOrigin: 0@0 extent 200@400
clipRect: (0@0 corner: 1023@1023)
aBB copyBits.

The "destForm: Display" means that the destination of the bit pattern is the CRT display, while the "souceForm: sForm" means that the object of transfer is the sForm. Thus, when sForm corresponds to the partial picture constituent element "person", the data concerning the "person" is displayed on the CRT. The "halftoneForm: Form black" represents the pattern of half-tone and suggests that the whole pattern be blackened, i.e., that half-tone operation is not conducted. If "Form gray" is substituted for "Form black" so as to realize a spotted pattern, only the spotted portion is displayed to realize the half-tone display. The "combinationRule: Form over" is used to appointing the value of the destination depending on the states of bits of the destination and the object to be transferred. In case of "Form over", the object is transferred to the destination. The "destOrigin: 0@0" means the coordinates of the destination. In this case, both the x- and y-coordinates are zero. The "destOrigin: 0@0 extent 200@400" means that the object of the transfer is a rectangular region having x-coordinates of 0 to 200 and y-coordinates of 0 to 400. The "clipRect: (0@0 corner: 1023@1023)" means that the clipping region on the display screen is 0 to 1023 in terms of the x-coordinate and 0 to 1023 in terms of the y-coordinate.

Under these conditions, bit block transfer is allocated to the variable aBB and sends a message "copyBits", whereby the transfer is executed.

Thus, the half-tone operation conducted simultaneously with the display of the partial picture constituent element is effective particularly when the half-tone function is included as a basic function for bit pattern display.

In this case, when the masking is conducted in Step S 503 shown in FIG. 22, the function "halftoneForm: Form black" is used so that the half-tone operation is not conducted but the overlying picture portion is cut and, when the element in the line $e_i$ is written in Step S 504, the "halftoneForm: Form black" is used if the partial picture constituent element in the line $e_i$ has been selected, whereby the display is conducted in the ordinary way. However, when the partial picture constituent element in the line $e_i$ has not been selected, the "halftoneForm: Form gray" is used to conduct half-tone display. It is to be understood that the logical product (AND) of the image and the data mentioned before corresponds to "combinationRule: Form and" in the SMALL TALK-80. Similarly, the logical sum (OR) corresponds to "combinationRule: Form under".

Figures 40, 42:
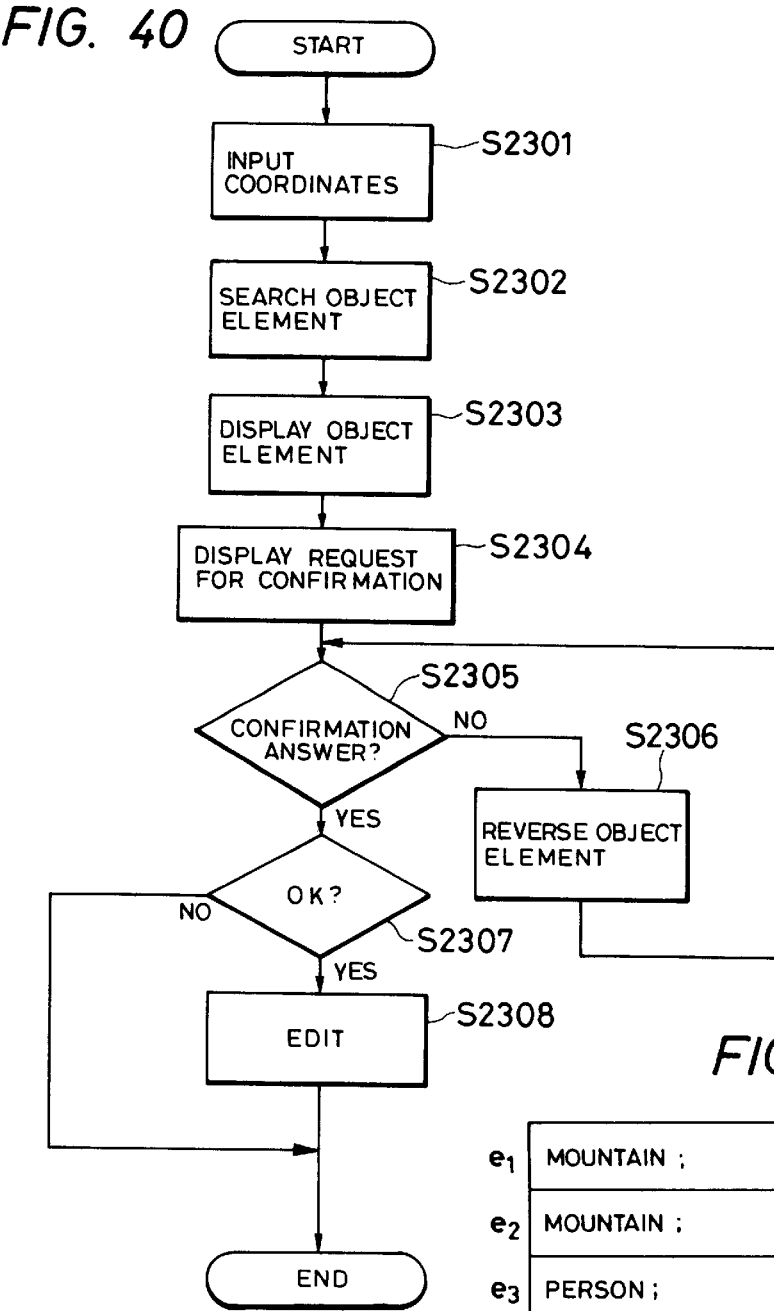
FIG. 40 is a flow chart of another example of the process for clarifying the selected partial picture constituent element.
FIG. 42 is an illustration constituent table in another embodiment of the present invention.

As an example of means for enabling the operator to check whether the partial picture constituent data of the line $e_1$ has been selected, it is possible to add a select/non-select flag column may be added to the picture constitution table 3010 shown in FIG. 20, and the content of this column is rewritten when the objective partial picture constituent element has been found. An example of such a picture constitution table is shown in FIG. 42. Thus, when the content of the column 2504 is "0", the CPU judges that the desired partial picture constituent element has not been selected and gives instructions for effecting the half-tone display, whereas, when the content is "1", the CPU judges that the desired element has been selected and enables the selected partial picture constituent element to be displayed without conducting half-tone operation.

More specifically, in Step S 1206 of the flow chart shown in FIG. 38, when the displayed partial picture constituent element has been judges as being the objective element, i.e., when the number i is judged to be within a predetermined range in Step S 904 of FIG. 26, "1" is set in the column 2504 of the line $e_i$ in the picture constitution table shown in FIG. 42, whereas, when the i is judged as being out of the range, "0" is set in the column 2504. In Step S 1604, therefore, the control as to whether the half-tone operation should be made is conducted instead of the re-display conducted in the process shown in FIG. 22.

Step S 1605 may not be executed. When this step is not executed, if a portion of the objective partial picture constituent element is hidden behind other partial picture constituent element, only the hidden portion is displayed in the normal way. This function is effective because it enables the operator to recognize what portion of this partial picture will be hidden in the final picture. This method, however, suffers from a problem in that when most portion of the selected partial picture constituent element is hidden, the operator cannot easily recognize this element. To obviate this problem, it is preferred that only the selected partial picture constituent element is displayed without half-tone mesh, though such a display does not enable the operator to confirm what portion will be hidden in the final picture. Preferably, a suitable switching means is provided to enable the operator to selectively use one of these two modes.

The final picture can be displayed by setting "1" in the column 2504 of all the lines in the table shown in FIG. 42.

Although in the described embodiment a column for storing data concerning the selection is added to the picture constituent table, this is not exclusive and various other methods can be used equally well. For instance, the arrangement may be such that the identifier of the selected element is stored in a different storage area and whether the half-tone operation is to be conducted or not is determined by checking whether this identifier coincides with that of the objective element.

As will be understood from the foregoing description, in the described embodiment, the partial picture constituent element selected by the operator for the editing purpose is clarified so that the operator can confirm that the partial picture constituent element in which he is interested has been correctly selected, whereby the efficiency of the editing operation is improved remarkably.

The half-tone operation or inversion, adopted in this embodiment for the purpose of clarifying the selected partial picture constituent element, is only illustrative, and various other means which is capable of enabling the selected partial picture constituent element to be easily recognized and distinguished from other elements can be used equally.

Thus, in the described embodiment, the partial picture constituent element selected by the operator for the editing purpose is clarified so that the operator can confirm that the partial picture constituent element in which he is interested has been correctly selected, whereby the efficiency of the editing operation is improved remarkably.

[Selection of Partial Picture Constituent Element]
(FIGS. 43A to 43E, FIG. 44)

A description will be made hereinunder as to an improved process of retrieval for picking up the desired partial picture constituent element from among a plurality of superposed elements.

In the preceding embodiments, the retrieval of the partial picture constituent elements is conducted by bringing the graphic cursor 8010 to the position of the objective partial picture constituent element by means of the mouse 2060, and then appointing this element by pressing the mouse key. Then, the partial picture constituent elements are retrieved in the order reverse to that of the display, i.e., from the uppermost one to the lower ones, until the partial picture constituent element containing the coordinates appointed by the graphic cursor is detected. This method, however, is disadvantageous in that the objective partial picture constituent element cannot always be detected when a plurality of picture constituent elements are superposed one on another. It is assumed here that the "inner" or "under" "mountain" rather than the "outer" or "upper" "mountain" is to be selected. (Note that in the preceding embodiments the "outer" or "upper" "mountain" is selected.)

The process for selecting the "under" mountain will be described hereinunder with reference to FIG. 43A.

It is assumed that the graphic cursor 8010 appoints coordinates $(x_c, y_c)$.

In this case, the following conditions are met:

$$x_1 \leq x_c < x_1 + \Delta x_1$$
$$y_1 \leq y_c < y_1 + \Delta y_1$$

and $$x_2 \leq x_c < x_2 + \Delta x_2$$
$$y_2 \leq y_c < y_2 + \Delta y_2$$

In the preceding embodiment, the retrieval is conducted by examining the partial picture constituent elements as to whether the rectangular regions of these elements contain the appointed coordinates $(x_c, y_c)$, from the outermost one to the inner ones. In consequence, the "outer" mountain rather than the "inner" mountain is selected undesirably.

In this embodiment, therefore, means are provided for clearly showing some partial picture constituent elements which are expected to contain the pointed coordinates (such elements will be referred to as "candidate elements" hereinunder) in a predetermined order in such a manner as to enable the operator make access to the element in which he is actually interested.

Figure 43A:
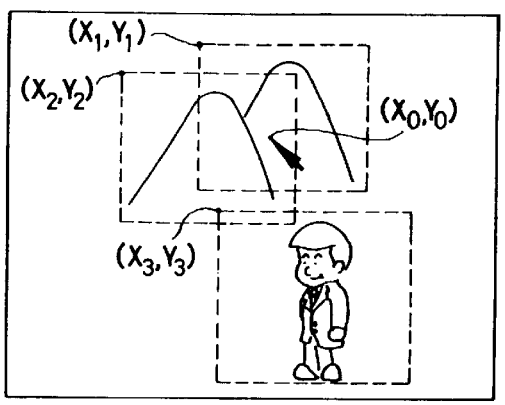
FIGS. 43A to 43E are illustrations of a process for selecting one of the partial picture constituent elements in the present invention.

This process will be explained with reference to FIGS. 43A to 43E and the flow chart shown in FIG. 44. The process shown by the flow chart shown in FIG. 44 is an improvement in the process shown in FIG. 26.

In Step S 1701, the coordinates $(x_c, y_c)$ appointed by the operator are input in the manner explained before. In next Step S 1702, a value n is substituted for i. The operation conducted in Step S 1702 to S 1707 is materially the same as that conducted in Steps S 901 to S 906 in the flow chart shown in FIG. 26, so that description of this operation is omitted to avoid duplication of explanation. Thus, the process proceeds from Step S 1705 to S 1708 when a partial picture constituent element with a region containing the input coordinates $(x_c, y_c)$ is detected.

In Step S 1708, the thus detected partial picture constituent element is displayed as one of the candidate elements. The process for the display may be the same as that performed in Steps S 503 and S 504 in the flow chart shown in FIG. 22. In the next Step S 1709, a menu is displayed for enabling the operator to confirm this candidate element. Although the confirmation may be made through input of an answer YES or NO from the keyboard, the described embodiment makes use of a menu which is adapted to be selected by the operator by means of the graphic cursor 8010, so as to avoid any reduction in the efficiency due to alternating between use of the keyboard and the mouse.

Figure 43B:
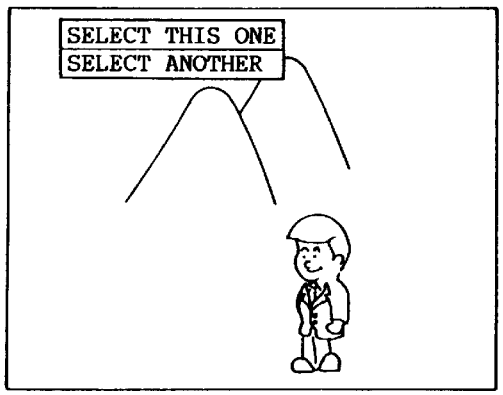
Figure 43C:
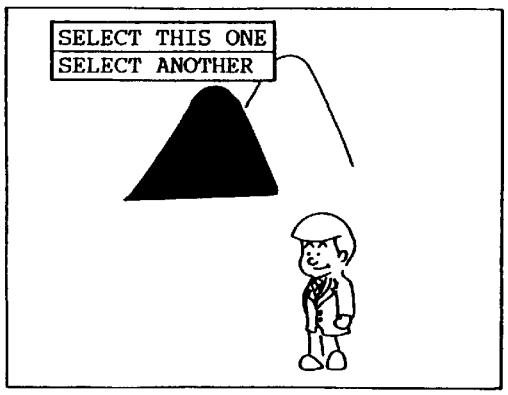
Figure 44:
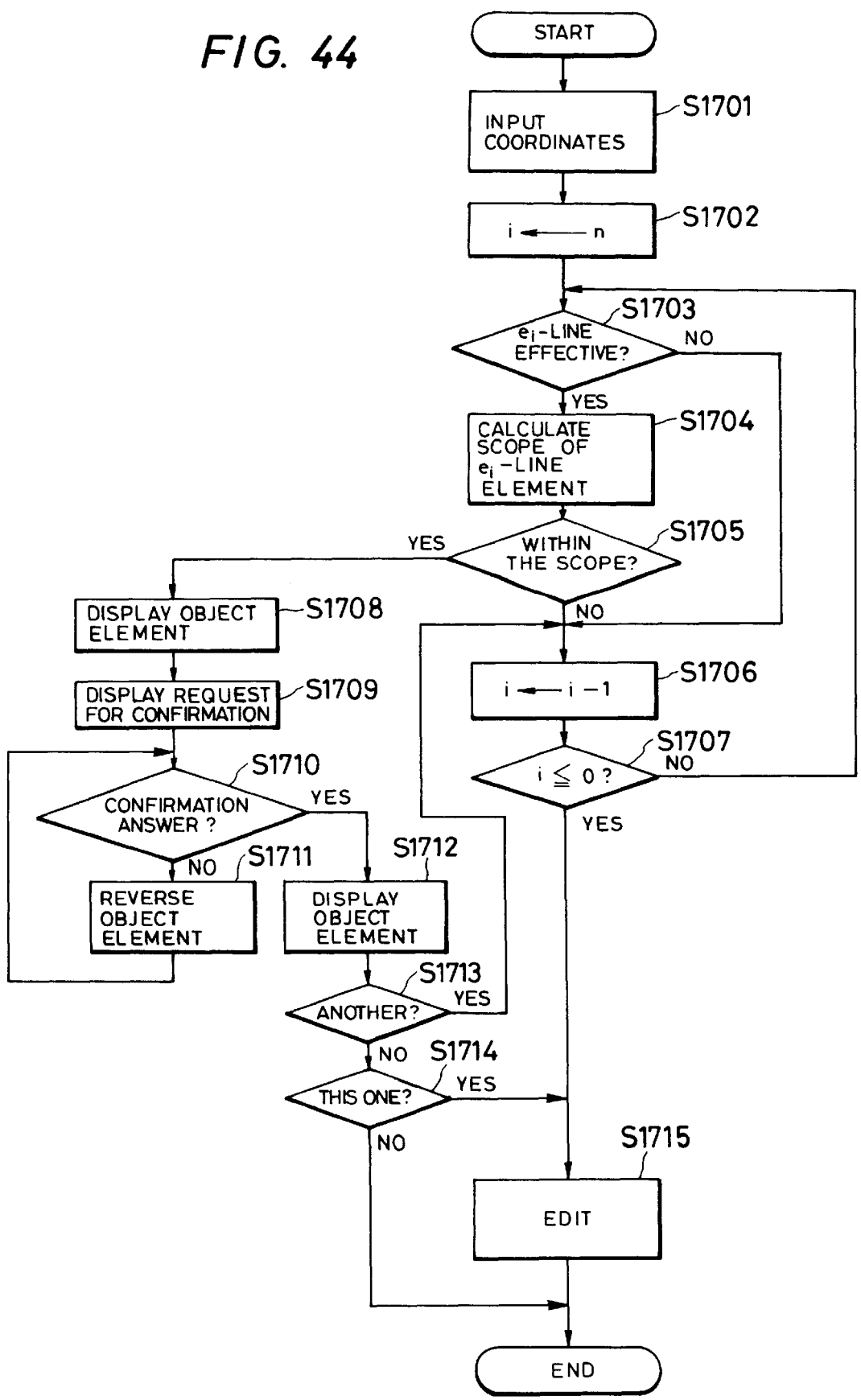
FIGS. 44 and 45 are flow charts of a retrieving process for retrieving partial picture element constituent elements in this embodiment.

Thus, at the moment when the Step S 1708 is commenced, the "outer" mountain is displayed as shown in FIG. 43B. In Step S 1710, a judgment is conducted as to whether a response has been made by the operator after display of the menu. When it is judged that there has been no response, the process proceeds to Step S 1711 in which the presently searched partial picture constituent element which is not the one that has been interested in by the operator, i.e., the "outer" mountain, is inverted as shown by FIG. 43C. This inversion can be conducted by, for example, inverting the picture element data of the masking data shown in FIG. 21 and then computing the logical sum (OR) of the inverted data and the display iamge. The inversion, however, is not essential. That is, all what is required is that the searched partial picture constituent element is displayed in a manner different from that of other elements so as to enable the operator to easily recognize this element.

The process return again to Step S 1710 when the inversion display process is completed. When there is no response, the process proceeds to Step S 1711 in which the inverted display image is inverted once again so that the image is displayed as shown in FIG. 43B. Steps S 1710 and S 1711 are executed repeatedly and alternatingly as long as the response is delayed, so that the candidate element blinks seemingly.

The operator can respond whether the blinking partial picture constituent element is the one which he has appointed by the mouse 2060. The process then proceeds to Step S 1712 in which the presently selected partial picture constituent element is displayed again. If this step is not taken, the selected partial picture constituent element may be displayed in inverted state, depending on the timing of input of the response. In Step S 1713, an answer is given by the operator to a question posed in a menu, as to whether the partial picture constituent element which has blinked is the very one which has been longed for by the operator. The answer is given by appointing either "Select This" or "Select Another" in the menu. If the blinked element is not the one in which the operator is interested, the operator selects "Select Another". In such a case, the process proceeds to Step S 1706 in which "1" is decremented from i so that the retrieval is commenced with the next partial picture constituent element, i.e., the element which directly underlies the blinked element. Since the partial picture constituent element to which the operator wishes to make access is the "inner" mountain, the operator selects "Select Another" so that the retrieval is commenced from the next element.

Figure 43D:
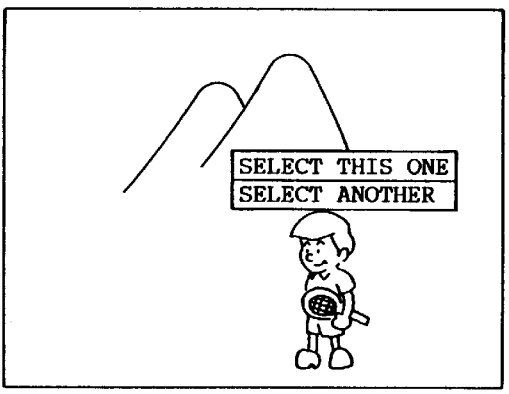
Figure 43E:
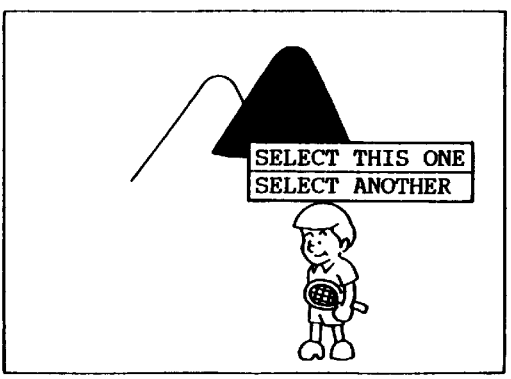

The retrieval is conducted in the same way as that explained above, with the value of i decremented by "1". When the Step S 1708 is commenced, the "inner" mountain is displayed as shown in FIG. 43D. As will be understood from this Figure, the retrieved partial picture constituent element is displayed on the front side for an easy recognition by the operator. Subsequently, the image shown in FIG. 43E and the image shown in FIG. 43E are alternatingly and repeatedly displayed in Steps S 1710 and S 1711.

In Step S 1713, a judgment is conducted as to whether the response made by the operator is "Select Another" or not. If the answer is YES, the process proceeds to Step S 1706 as explained before so that the next (inner) partial picture constituent element is retrieved. However, when the operator has appointed any region other than "Select Another" by the graphic cursor 8010, the process proceeds to Step S 1714 in which a judgment is conducted as to whether the operator has selected "Select This". If the answer is YES, the process proceeds to Step S 1715 whereby the desired edition on the selected partial picture constituent element is commenced. When the judgment in Step S 1714 has proved that the graphic cursor appoints a region other than "Select This" and "Select Another", the CRT judges that the input is a mistake and ceases the retrieving operation without allowing editing to be commenced. In order to allow the retrieval to be suspended, it is possible to add an item "Suspend" to the menu.

Whether the desired partial picture constituent element has been found out or not can be known by examining the value of i at the moment of completion of the retrieval. When the value of i is other than "0", it is judged that the objective partial picture constituent element has been found. However, when i has been reduced to zero, it is judged that the desired element could not be found.

In this embodiment, when the condition of $i \leq 0$ is met, the CPU judges that the objective partial picture constituent element does not exist, so that the process proceeds to Step S 1715 so as to allow the editorial operation on the whole picture.

As will be understood from the foregoing description, in this embodiment, a retrieval is conducted through a plurality of partial picture constituent elements in the order reverse to the order of display in order to find the objective partial picture constituent element which has been appointed by the operator through, for example, a graphic cursor. The objective partial picture constituent element, when it is found, is displayed in such a manner that it can be distinguished from other partial picture constituent elements such as by blinking, thereby enabling the operator to confirm that the displayed partial picture constituent element is the very one appointed by himself. The operator, therefore, can select without fail the partial picture constituent element in which he is interested. In addition, it becomes possible to select the partial picture constituent most part of which is hidden behind other element or elements. In consequence, the efficiency of the work is improved remarkably.

In the described embodiment, the number n is substituted for i as the initial value. It is possible, however, to use the number of the partial picture constituent elements stored in the picture constitution table 301. In such a case, Step S 1702 can be eliminated, so that the processing speed is further increased.

In consequence, the described embodiment enables the operator to select a desired partial picture constituent element from among a plurality of elements constituting a picture on display, thus contributing greatly to the efficiency of image editing operation.

A further embodiment of the invention, which is an improvement in the embodiment shown in FIGS. 43 and 44, will be described hereinunder. In this embodiment, an additional judgment is conducted as to whether the appointed coordinates ($x_c$, $y_c$) resides in the white blank portion (area in which "0" is set on each pixel) of the masking data of the "mountain". That is, this embodiment employs an additional criterion which concerns the masking data.

In the embodiments described before, when the graphic cursor is positioned by the operator to point the coordinates ($x_c$, $y_c$) as shown in FIG. 43A in order to select the "inner" mountain, the "outer" mountain is selected first, undesirably. In contrast, in this embodiment, a judgment is conducted as to whether the graphic cursor is pointing the white blank portion (non-transparent portion) of the masking data of the "outer" mountain shown in FIG. 21B.

This judgment is conducted in the following manner. The relative coordinates ($x_c'$, $y_c'$) of the coordinates ($x_c$, $y_c$) appointed by the graphic cursor 8010 with respect to the "outer" mountain are computed and then a judgment is conducted as to what portion of the masking data the relative coordinates ($x_c'$, $y_c'$) are located. In this judgment, the coordinates of the upper right portion of the "outer" mountain are used as the reference (0,0), so that the relative coordinates $x_c'$, $y_c'$ are defined as follows, respectively.

$$x_c'=x_2-x_c, y_c'=y_2-y_c$$

Figure 45:
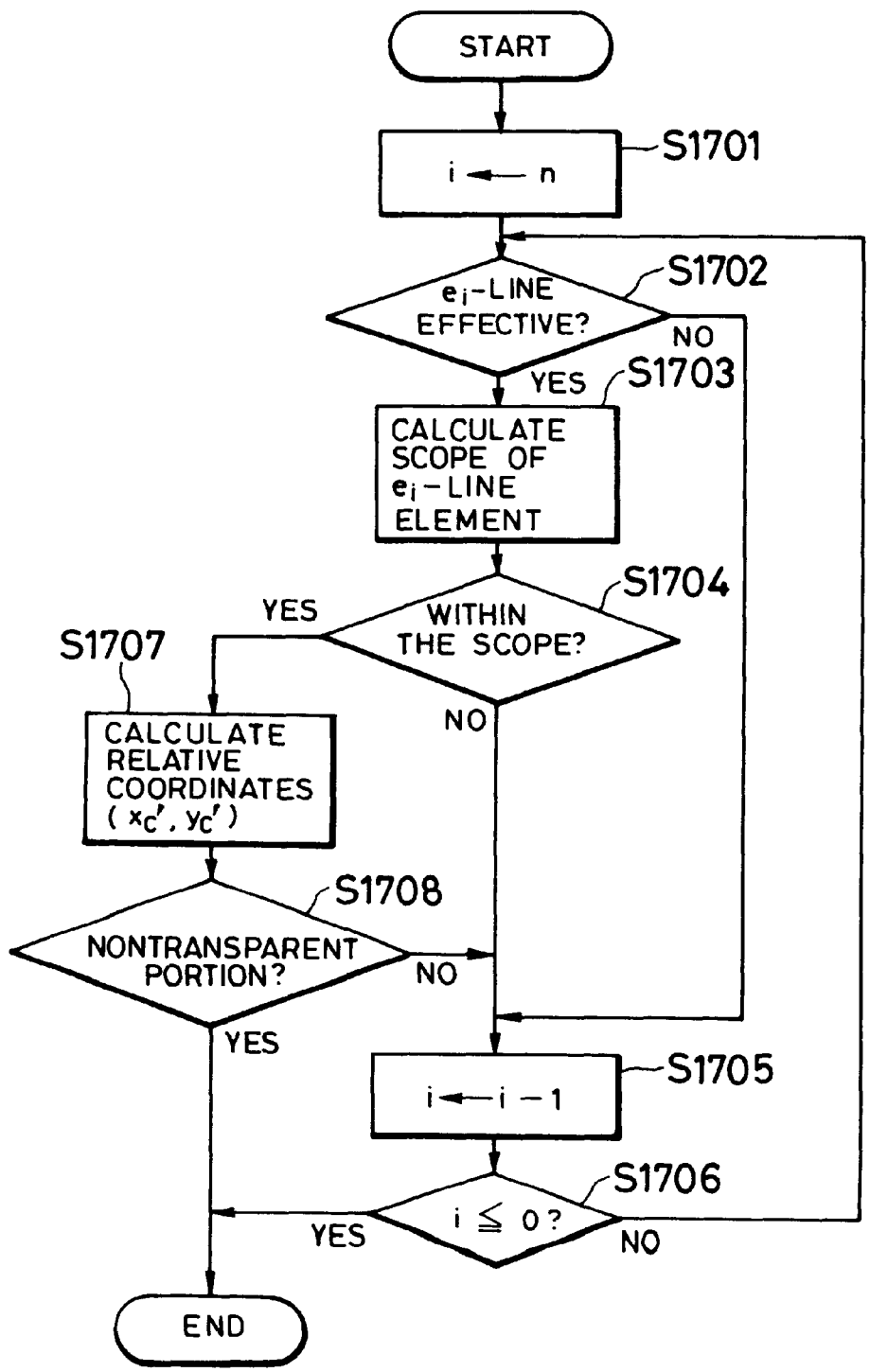

The outline of the above-described operation will be explained with reference to a flow chart shown in FIG. 45. The program for executing this flow is stored in the memory 2010a. It is assumed that the mouse 2060 has been operated to point coordinates ($x_c$, $y_c$).

In Step S 1701, initialization is conducted by substituting n for i so as to commence the retrieval from the "outermost" partial picture constituent element. In Step S 1702, a check is conducted as to whether the picture actually contains the partial picture constituent element in the line $e_i$ of the picture constitution table 3010 represented by i. In the described embodiment, this checking operation can be conducted by checking the line $e_i$ for the presence of any identifier. More specifically, the column 3020 of the line $e_i$ is checked as to whether this column contains only the delimiter or both an identifier and the delimiter. When only the delimiter is contained, the process proceeds to Step S 1705 in which i is decremented by "1" and then a judgment is conducted in Step S 1706 as to whether the number i has been reduced to zero. If not, the process returns to Step S 1702 to repeat the above-described operation.

On the other hand, when the judgment in Step S 1702 has proved that the line $e_1$ contains an identifier, the process proceeds to Step S 1703 in which the scope of region of this identifier is computed. In the next step S 1704, a judgment is conducted as to whether the input coordinates ($x_c$, $y_c$) exist in the computed region. When the input coordinates is out of the computed region, the process proceeds to Step S 1705 so that the same operation as that in the preceding embodiment is commmenced.

However, if the judgment in Step S 1704 has proved that the input coordinates ($x_c$, $y_c$) exist in the region of the partial picture constituent element registered in the line $e_i$, the process proceeds to Step S 1707 in which the relative coordinates ($x_c'$, $y_c'$) of the input coordinates ($x_c$, $y_c$) with respect to the masking data of this partial picture constituent element are computed. That is, if "mountain" is stored as an identifier in the line $e_i$, a judgment is conducted as to whether the relative coordinates ($x_c'$, $y_c'$) exist in the non-transparent portion (white portion) or in the transparent portion (black portion) of the masking data shown in FIG. 21B. When the judgment has proved that the relative coordinates ($x_c'$, $y_c'$) exist in the transparent portion, i.e., the region in which the displayed picture is retained, the CPU judges that the partial picture constituent element in the line $e_i$ is not the one which is appointed by the input coordinates ($x_c$, $y_c$). In this case, the process proceeds to Step S 1705 so as to re-start the retrieval.

Conversely, when the judgment in Step S 1708 has proved that the relative coordinates ($x_c'$, $y_c'$) exist in the non-transparent portion, i.e., the region where the displayed picture is masked, of the masking data, the CPU judges that the partial picture constituent element stored in the line $e_i$ is the very one that has been appointed by the operator.

Whether the objective partial picture constituent data has been found or not can be known by examining the value i. The value i reduced to zero means that the objective partial picture constituent element could not be found, otherwise the objective element could be found.

In the described process, the initialization is conducted by substituting n for i. This, however, is not essential and the initialization may be effected by substituting the number of the partial picture constituent elements in the picture constitution table 3010 for the number i. In such a case, Step S 1702 may be omitted, so that the processing speed can be further increased.

Thus, the described embodiment makes it possible to select without fail the desired partial picture constituent elements from among a plurality of elements constituting a picture. In consequence, the operator is relieved from the laborious work for picking up the partial picture constituent element to be edited, so that the efficiency of the editing operation can be improved remarkably.

[Display of Marks]

A description will be made hereinunder as to a further embodiment in which judging means is incorporated for conducting judgment as to whether the position pointed by pointing means is located on a mark pattern and, when the pointed position is on the mark pattern, the partial image indicated by the mark is recognized as the partial image to be edited.

[Basic Block Diagram]
(FIG. 1)

FIG. 1 is a block diagram showing the basic construction of the image editing apparatus of this embodiment. As described before, the apparatus has a CRT display 101 adapted to display an image, a keyboard 102 connected to a keyboard interface 108, and a mouse 103 serving as a pointing device and connected to a mouse interface 109. A reference numeral 104 denotes a video RAM (V-RAM) which stores image data corresponding to the image displayed on the CRT. The V-RAM 104 is adapted to deliver the image data to the CRT display through the CRT interface 107. The apparatus further has a CPU which is adapted to control the operation of whole of the apparatus in accordance with programs stored in an internal memory 105a. The memory 105a stores programs for executing various control flows which will be explained later, as well as programs which are prepared for editing purposes.

The apparatus further has a memory 110 having an internal structure which will be explained later. A magnetic disk 111 as an external memory device is connected to a disk interface 112. The interfaces and memories described above are connected to a system BUS 106.

[Display of Partial Image]
(FIGS. 46, 47 and FIGS. 50 to 52)

Figure 46:
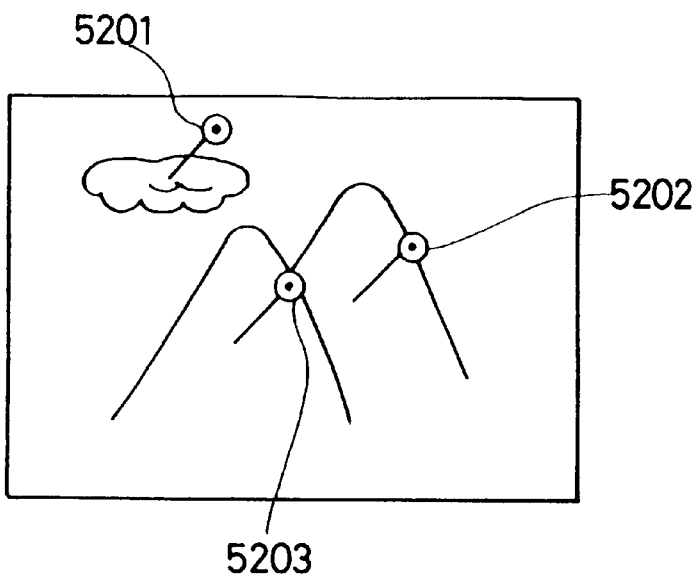
FIG. 46 is an illustration of a state in which marks are given to the respective partial images.

FIG. 46 shows an example of a picture displayed on a display screen at the time of start of the editing operation. Marks 5201 to 5203 indicate independent partial images. Each mark has a black circle encircled by a white circle to which is connected a leader line leading to the associated partial image. In this embodiment, the editing object is appointed by pointing one of these marks by a graphic cursor.

The process for realizing this display will be described hereinunder.

Figure 47:
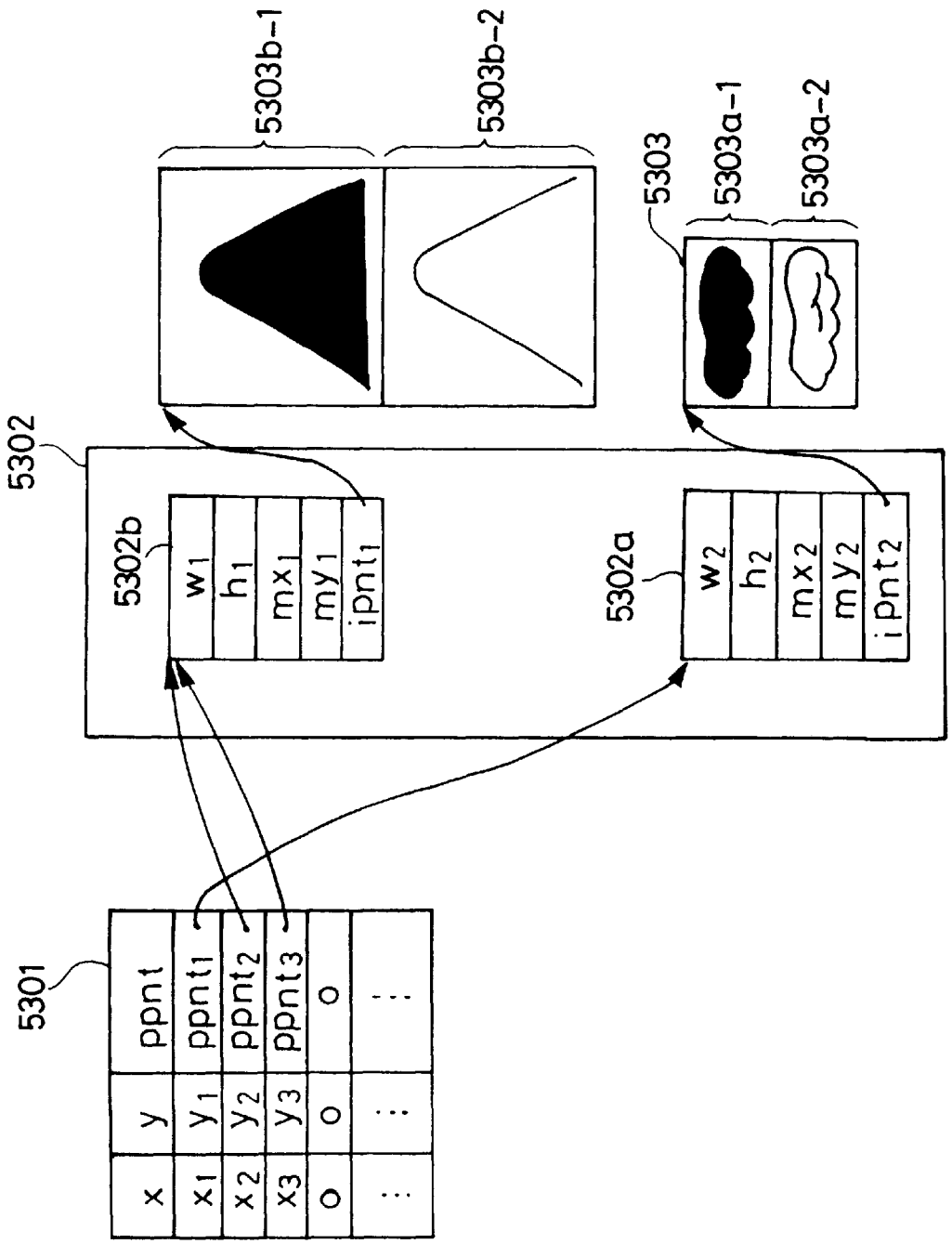
FIG. 47 is an illustration of the relationship between an illustration constituent table, partial image data table and patterns of partial images.

FIG. 47 shows various partial image data for constituting an illustration, together with mask pattern data and various data tables. An illustration constitution table 5301 contains partial image data for constituting an illustration to be displayed. More specifically, the illustration constitution table 5301 has a plurality of lines each of which contains a different partial image data. More specifically, each line has columns for defining the position (x-,y-coordinates) of each partial image data with respect to the display screen, and a column "ppnt" showing addresses of partial image tables containing data concerning the nature of respective partial image data.

A partial image table 5301 has lines which contain the width (W) and height (H) of each partial image and relative coordinates (mx, my) for displaying the mark associated with the partial image data, as well as a line "ipnt" which stores the initial address of storage of each partial image pattern.

In this embodiment, two partial images, i.e., "mountain" and "cloud", are used so that two partial image tables 5302a and 5302b are prepared. Actually, however, a greater number of partial image tables may be prepared in accordance with the number of the partial images to be employed. The illustration constitution table 5301 and the partial image tables 5302 are provided in a table memory 110a within the memory 110, while patterns 5303a-1, 5303a-2, 5303b-1 and 5303b-2 are stored in the partial image data storage area 110b. In this embodiment, patterns (raster image data) are used as the partial images. However, when the image is to be formed by a combination of a plurality of geometrical patterns, the partial image data may have the form of parameters which define the geometrical pattern, such as the starting and terminating positions of a straight line.

As shown in FIG. 47, the partial image data is stored in combination with the associated mask pattern data. For instance, in the case of the partial image "mountain", the partial image data 5303b-2 is stored together with the associated mask pattern data 5303b-1. The storage of the mask pattern data is necessary for the following reason. When it is desired to put the partial image data 5303b-2 on display by sending it to the V-RAM 104, if there is any preceding image set on the V-RAM 104 for display, it is necessary to mask the preceding data on the V-RAM 104 to cut out the region corresponding to the black region in the mask data pattern 5303b-1. Therefore, when any new partial image data is to be displayed, a preparatory operation is conducted to cut out the existing image by a mask pattern corresponding to the partial image to be displayed. This operation is necessary for displaying, for example, two "mountains" in an partly overlapping manner as shown in FIG. 46.

The process for displaying a partial image will be described with reference to a flow chart shown in FIG. 50. It is assumed here that the positions at which the respective partial images are to be displayed have been already appointed. The appointment of display positions may be conducted by, for example, moving a graphic cursor by the mouse 103 to a suitable position on the display screen and then inputting a suitable code identifying the partial image such as "mountains" through the keyboard 102. Alternatively, the coordinates of the display positions are input by means of the keyboard 102.

In Step S 601, "1" is set as the initial value of i, in order to successively display the partial images set in the illustration constitution table 5301 shown in FIG. 47 from the first line of this table. In Step S 602, the display screen, i.e., the V-RAM 104, is cleared. In Step S 603, a judgment is conducted as to whether the i-th line of the table contain any partial picture data. In this case, the display positions of three partial images have been input already, so that the process proceeds to next step S 604. In this embodiment, the judgment as to whether the i-th line contain any partial image data is conducted by checking whether the content of each line is not "0". Therefore, when "0" is set, it is judged that the line does not contain any partial image data. This judging method, however, is only illustrative and the table may have an additional column for storing a flag which indicates of presence or absence of the partial image data.

Figure 53:
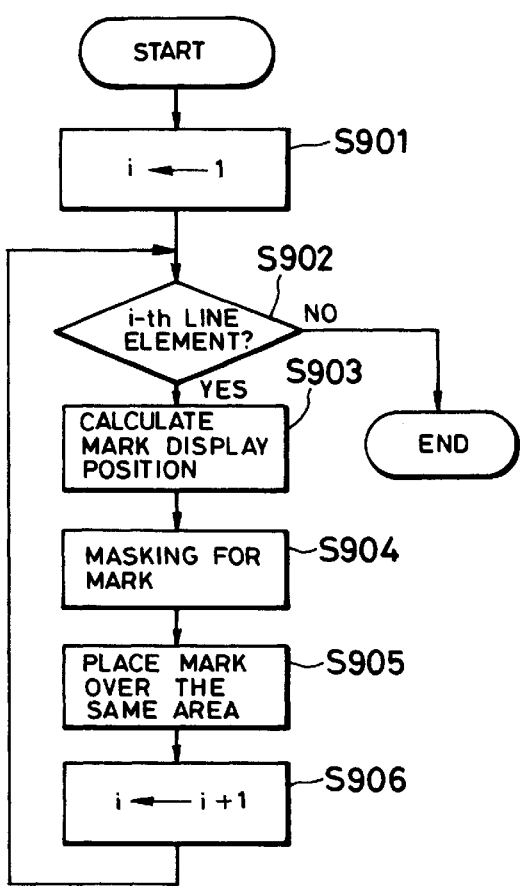
FIG. 53 is a flow chart illustrating the process for displaying a mark.

In Step S 604, the mask pattern data is transferred with reference to the partial image table 5302 shown in the column ppnt in the i-th line, so as to mask the display area starting from the coordinates $(x_i, y_i)$. In Step S 605, the partial image data is developed starting from the same coordinates. The process then returns to Step S 603 after incrementing i by "1" in Step S 606. This operation is repeated until the display of all the partial images is completed. Thus, an illustration as shown in FIG. 53 is finally displayed after the completion of display of all the partial images.

The display of the mask pattern data and the partial image data corresponding to a partial image is conducted by the process explained above. This process can suitably be executed by, for example, a personal computer AS-300 produced by CANON INC., as will be described hereinunder.

The computer AS-300 has a function to conduct logical computation on pixel basis between the raster image data in the memory and the data displayed on the CRT so as to suitably change the state of the display. When the AS-300 is used, as shown in FIG. 51, a data administration table 5701 is used to show the mask pattern data 5303a-1, while another data administration table 5702 is used to show the partial image data 5303a-2. Then, x- and y-coordinates are input, respectively, to the AX register and BX register which are set in a CPU of the computer AS-300. At the same time, the initial offset address and the segment address of the data administration tables are set in the DI register and ES register, respectively.

In addition, a raster operation code is set in the DL register. In the case of the transfer of the mask pattern, the raster operation code is "2" which means the logical product (AN) of the data on the V-RAM 104 and data obtained by inverting the mask pattern data. For the purpose of obtaining the logical sum (OR) between the partial picture data and the data on the V-RAM 104, "14" is input as the raster operation code. Then, a code "12" representing a process for displaying the content of the memory is input to the CL register, and a command "INT 15H" is executed whereby the transfer is conducted.

Columns XOFF and YOFF of the administration tables are set at "0", while the width of the mask pattern data or the partial image data is written in the column L of each administration table in terms of number of words each consisting of 16 pixels. Columns MEMOFF and MEMSEG are used for storing offset address and segment address so as to hold the initial addresses of storage of the mask pattern data 5303a-1 and 5303a-2 in the memory.

This setting operation can be done, provided that the raster image data has been formed to have a width which is a multiple of 16 pixels, by setting $\frac{1}{16}$ of the content of the column $W_2$ of the partial image table 5302a in the column XL and setting the content of the column H in the column YL, while setting the values in columns x, y of the illustration constitution table 5301 in AX register and BX register, respectively.

[Display of Mark Pattern]
(FIGS. 46, 48, 49 and 50)

In the actual use of the image editing apparatus of this kind, it often becomes necessary to alter the position of a specific partial image or to effect an editing to such a specific partial image, after building up of the final image by assembling a plurality of partial images.

In this embodiment, the operator can make access to a desired one of the stacked partial images for the purpose of effecting an edition, as will be understood from the following description.

Figure 48:
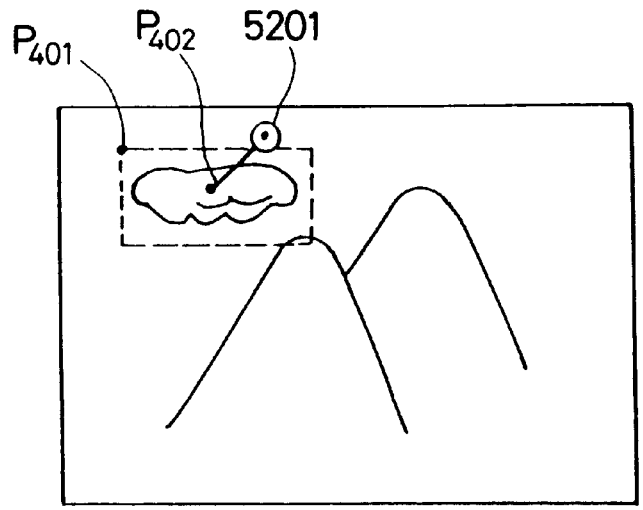
FIG. 48 is an illustration of the case where a mark is given to a partial image "cloud"

As explained before, the marks 5201 to 5203 are displayed at positions defined by the relative coordinates (mx, my) set in the partial image table 302. For instance, the position of display of the mark 5201 attached to the partial image "cloud" shown in FIG. 48 is determined such that the left lower end of the mark 5201 is located at coordinates $P_{402}$ ($x_1+mx_1$, $y_1+my_1$) obtained by summing (a) the position $P_{401}$ of display of the "cloud", i.e., coordinates having origin at the left upper corner of the display screen, and (b) the relative coordinates ($mx_1$, $my_1$) having origin at the left upper corner of the partial image "cloud". Actually, however, the display position of the mark 5201 is determined by computing the left upper end of the mark, because the development of mark image can easily be conducted by commencing the development from the left upper end as in the case of development of the partial image rather than commencing the development from the left lower end.

Figure 49:
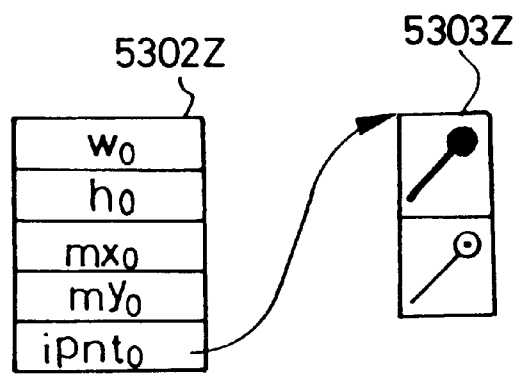
FIG. 49 is an illustration of the relationship between a mark table 302z and mark data and mark mask pattern.

As in the case of the partial image pattern, the mark 5201 also has a mask pattern data and partial image data. The relationship between a mark table 5302 and the mark data and the mark mask pattern is shown in FIG. 49. As in the case of the partial image explained before in connection with FIG. 47, the mark table 5302 is stored in the table memory 110a within the memory 110, while the mark data and the mark mask pattern data are stored in the mark data storage area 110c.

A description will be made hereinunder as to the process for displaying a mark, with reference to a flow chart shown in FIG. 53.

In Step S 901, an initial value "1" is set for i so as to enable the partial images in the illustration constitution table 5301 shown in FIG. 47 to be checked up from the beginning line. In Step S 902, a judgment is conducted as to whether the i-th line of the table 5301 contains any data concerning partial image. This judgment maybe done in the same manner as that in Step S 603 of the flow explained before in connection with FIG. 50. In Step S 903, a reference is made to the partial image table 5302 shown in the column ppnt of the i-th line, thereby to compute the position where the mark pattern is to be developed. The absolute coordinates (m$\theta$x$_i$, m$\theta$y$_i$) of the mark pattern position on the display screen is computed as follows, where the position ($x_i$, $y_i$) of development of the partial image, relative coordinates ($mx_1$, $my_1$) with respect to the partial image and the height $h_0$ of the partial image are given.

$$m\theta x_i = x_i + mx_k$$

$$m\theta y_i = y_i + my_k - h_0$$

In Step S 904, masking is commenced by the mark mask pattern data from the position computed in Step S 903. In Step S 905, the mark pattern is developed from the same coordinates as the mask. The process then returns to Step S 902 after conducting "1" increment of i in Step S 906. This operation is repeated until all the mark patterns are displayed, whereby a final display is obtained as shown in FIG. 46.

Figure 54A:
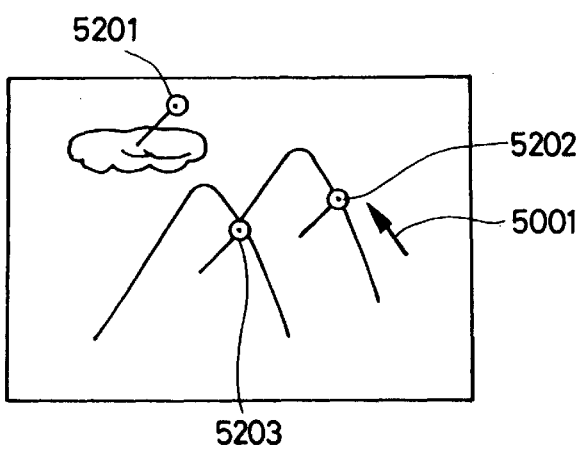
FIG. 54A is an illustration of the relationship between a mark provided on a partial picture and a graphic cursor.
Figure 54B:
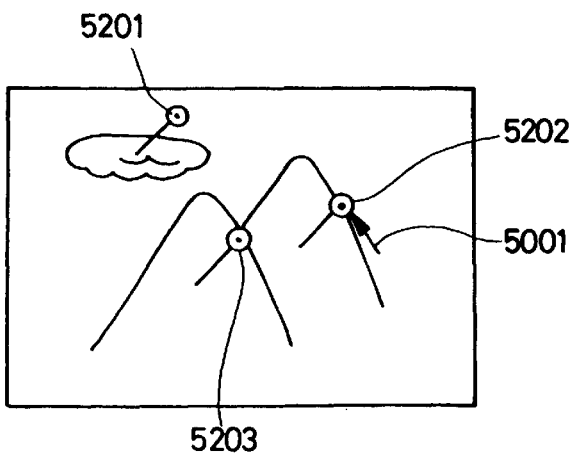
FIG. 54B shows a state in which a partial image "mountain" is appointed by a graphic cursor.
Figure 60:
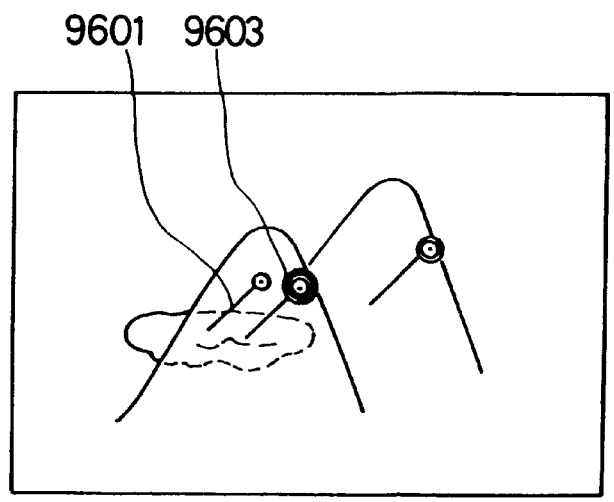
FIG. 60 is an illustration of a state in which different forms of marks are used for different types of partial pictures.

[Method of Appointing Partial Image to be Edited]
(FIGS. 54A, 54B and 55)

It often becomes necessary to suitably correct or modify one of partial images already put on display, during or after the building up of an illustration. In such a case, the operator can commence the process shown in FIG. 53 by pressing a predetermined key (not shown) on the keyboard 102 so as to put the marks on the respective partial images on display. Then, the operator moves the mouse 103 so as to bring the graphic cursor to point the mark associated with the desired partial image. The partial image is then selected as the operator presses a predetermined key.

In FIG. 54A, there are shown marks attached to the respective partial images of mountain, together with the graphic cursor 5001. In FIG. 54B, the graphic cursor 5001 has been moved to point the mark associated with the "inner" mountain. It will be seen that the appointment of a partial image is remarkably facilitated by the provision of the mark. In addition, the operator can recognized at a glance what partial image has been appointed. In this case, however, a question is posed as to whether the appointed position acutally exists in the mark.

A detailed description will be made hereinunder in this regard. In the following description, the displacement of the center of the circle of the mark from the upper left end of the mark pattern is represented by (mcx$_0$, mcy$_0$), while the radius of the circle is represented by $r_0$. The position of the graphic cursor is given by ($x_g$, $y_g$).

Since the position at which the display of the mark i computed as (m$\theta$x$_i$, m$\theta$y$_i$) as explained before, the coordinates of the center of the circle of each mark with respect to the display screen is computed as follows:

$$(m\theta x_i+mcx_0, m\theta y_i+mcy_0)$$

In consequence, it is necessary that the following inequality is met, in order that the position appointed by the graphic cursor is within the circle of a mark (in other words, the graphic cursor position is judged as being out of the circle when the inequality is not met):

$$(m\theta x_i+mcx_0-x_g)^2+(m\theta y_i+mcy_0-y_g)^2 \leq r_0^2$$

Thus, whether a mark has been pointed by the graphic cursor is judged by using the above inequality as a criterion, in accordance with a process which will be described hereinunder with reference to a flow chart shown in FIG. 55. The flow chart has been drafted on an assumption that the graphic cursor has been already set to point a definite point.

In Step S 1101, "1" is substituted for i as an initial value. In Step S 1102, a reference is made to the illustration constitution table so as to examine whether the lines represented by i contain data concerning partial image. Thus, Step S 1102 is materially the same as Step S 902 of the process explained before in connection with FIG. 53. When the judgment of this step has proved that there is no data concerning the partial image in the i-th lines, i is reduced to "0" in Step S 1106 so that the process returns to the main process.

In Step S 1103, the coordinates of the center of the circle of the mark, which is expressed as follows, is computed with respect to the partial image data in the i-th line.

$$(m\theta x_i+mcx_0, m\theta y_i+mcy_0)$$

Then a judgment is conducted in Step S 1104 as to whether the inequality mentioned before is satisfied. If the inequality is satisfied, this operation is ceased and the process returns to the main process. However, if the condition of the inequality is not met, i is incremented by "1" in Step S 1105 and the process returns to Step S 1102 so as to repeat the operation explained above with the new value of i.

It is, therefore, possible to confirm which one of the partial images has been appointed by the mouse 103, by examining the value of the variable i at the moment at which this operation is ceased. When the variable i has been reduced to zero, the CPU judges that the appointed partial image could not be found.

[Modification of Embodiment]
(FIGS. 56, 57A, 57B)

In the embodiment described above, the displacement of the mark position expressed in terms of coordinates with respect to the left upper ends of the raster image data 5303a-1 and 5303a-2 are written in the columns $mx_2$, $my_2$ of the partial image table 5302a. This, however, is not exclusive and the displacement of the mark position may be treated as the displacement of the reference position of the raster image data, i.e., the displacement of the origin of the local coordinates.

In such a case, the coordinates of the origin of each partial image are written in $x_i$, $y_i$ of the illustration constitution table 5301. Then, the coordinates of the position at which the display of the mark pattern on the display of each partial image are determined as $(x_i-mx_k, y_i-my_k)$, where $mx_k$ and $my_k$ are the values in the columns $mx_k$ and $my_k$ of the partial image table shown by the column $ppnt_i$. In case of the display of a mark, $(x_i-mx_0, y_i-my_0)$ is set as the position of start of display of the mark pattern for the partial image of the i-th line.

Representing the displacement of the center of the mark circle from the origin of the mark by $(mcx'_0, mcy'_0)$, it is possible to judge whether the position appointed by the graphic cursor 5001 resides in the area of the circle by examining whether the condition expressed by the following inequality is met.

$$(x_i+mcx'_0-x_g)^2+(y_i+mcy'_0-y_g)^2 \leq r_0^2$$

This method advantageously increases the speed of judgment because it is not necessary to trace the pointers.

Thus, the mark is formed to point the origin of each partial image, and, as shown in FIG. 56, the illustration constitution table is additionally provided with columns $mdx_i$ and $mdy_i$ for independently defining displacement concerning the mark.

In normal state of operation. "0" is set in each of the columns $mdx_i$ and $mdy_i$. In this case, "0" means that the displacement from the origin is zero. This, however, is not exclusive and other suitable numerical values may be set in these columns $mdx_i$ and $mdy_i$. The provision of this function does not provide any significant effect in the case of an illustration as shown in FIG. 46, but offers an advantage when the illustration as shown in FIG. 57A is to be processed. Namely, in the illustration shown in FIG. 57A, the partial image "cloud" is partially hidden behind the "outer" mountain, the marks associated with the cloud and the mark associated with the "outer" mountain are displayed substantially at the same position, causing a confusion as to which one indicates the cloud.

In order to obviate such a confusion, in this modification, an offset value—$\Delta x$ is input to the column $mdx_i$ of the first line (line containing data concerning "cloud") of the illustration constitution table 9201, while keeping the content of the column $mdy_i$ unchanged. In consequence, the mark indicating the partial image "cloud" is offset from the first position by the distance—$\Delta x$, as shown in FIG. 57B.

The input of the offset of the mark display position may be conducted by the operator through the keyboard 102. Alternatively, the mark is moved by a pop-up menu and the data in the columns $mdx_1$, $mdy_1$ of the illustration constitution table 9201 are automatically changed in accordance with the movement. It is also possible to arrange such that a n automatic conversion is conducted to search a region of the cloud which is not hidden by the "outer" mountain and to locate the mark on the center of the thus searched region.

Anyway, the change in the position of the mark a shown in FIG. 57B causes a corresponding change in the content of the respective columns in the illustration constitution table 9201, so that the aforementioned inequality is still effective as the criterion for the judgment as to whether the position pointed by the graphic cursor 5001 is within the region of the mark.

[Another Modification]
(FIG. 58)

In the embodiment and the modification described before, the mark is constituted by a double circle and a leader line through which the double circle is connected to the partial image. Such a form of the mark, however, is only illustrative.

For in stance, it is possible to use triangular m arks adapted to point the respective partial images, as shown in FIG. 58. In this case, the reference position of the mark may be set at the center of the triangle, though the reference position is set on the lower apex in the illustrated case.

The arithmetic operation for judgment concerning the position of then graphic cursor in relation to the mark, which is employed in the embodiment and the modification described before, tends to lower the speed of retrieval.

It is possible to conduct this judgment by examining the coordinates of the appointed position with respect to the mask pattern data of the mark. For instance, the pixel data in the mask pattern data of the mark corresponding to the appointed coordinates position are read and examined as to whether they are "black" or "white", i.e., whether they are "1" or "0". It is possible to make the mask pattern data have a size greater than that of the mask data, so that the mark itself is displayed as if it floats above the display screen. In addition, the appointment is facilitated by virtue of the increased mask pattern data.

When two marks are displayed in an overlapping manner as shown in FIG. 57A, if the operator who wishes to select the "outer" mountain rather than the cloud points the "outer" of "overlying" mark and pushes an appointing key, the cloud is picked up, undesirably, because the first line of the illustration constitution table 5301 or 9201 contains the partial image data "cloud". This problem, however, can be overcome without difficulty, by providing a means for acknowledgment by the operator, such as a key through which an acknowledgment is input. For instance, the operator who wishes to make access to the "outer" mountain presses a denial key NO when the cloud is selected. At the same time, the flow chart shown in FIG. 55 is modified such that, when the input is given through the denial key, the variable number i representing the line is automatically incremented by "1" so as to enable the second line to be retrieved. Alternatively, the flow chart shown in FIG. 55 may be modified such that the variable number i is initially set at n (total number of partial images) rather that at "1" in Step S 1101, so that the retrieval in Step S 1105 is carried out in a decremental mode so that the partial image "mountain" is accessed in advance to the "cloud".

[Still Another Modification]
(FIGS. 59 to 63)

In order to enable the operator to distinguish different partial images, it is possible to use different forms of marks for different partial images. For instance, the size of the region in which the mark can be appointed is progressively increased from the region for the mark associated with the "innermost" partial image towards the uppermost one. Alternatively, the number of circles of the mark is increased in the same way. For instance, in FIG. 60, the mark 9601 indicates the partial image "cloud", while the mark 9603 indicates the "pouter" mountain.

Figure 61:
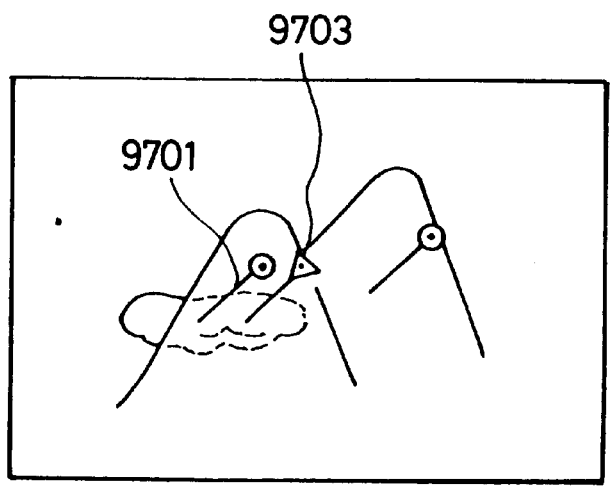
FIG. 61 is an illustration of the case in which the form of display of the marks is changed in accordance with a variation in the state of overlap of the partial pictures.
Figure 62:
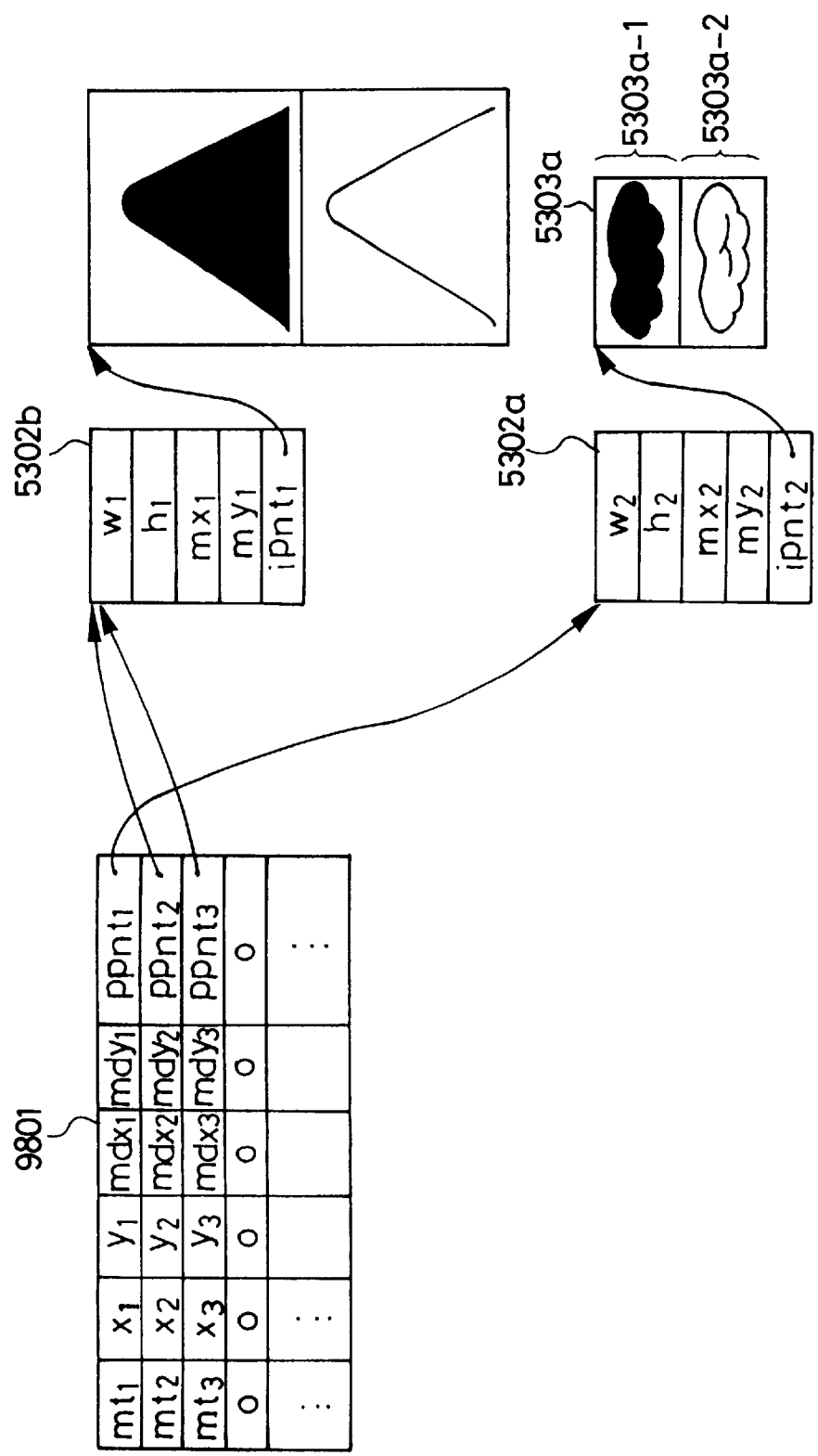
FIG. 62 shows a relationship between illustration constitution tables in FIG. 61.

It is also possible to design such that the shape of the mark varies depending on the manner of overlap of the partial images as shown in FIG. 61, as denoted by 9701 and 9703 in FIG. 61. This can be achieved by providing a new column $mt_1$ on the illustration constitution table, as shown in FIG. 62. In this column $mt_1$, serial Numbers are allotted from the "innermost" or "outermost" partial picture.

On the other hand, a plurality of forms of marks are prepared so that different forms are used in combination with the different serial Numbers of the partial images.

Figure 63:
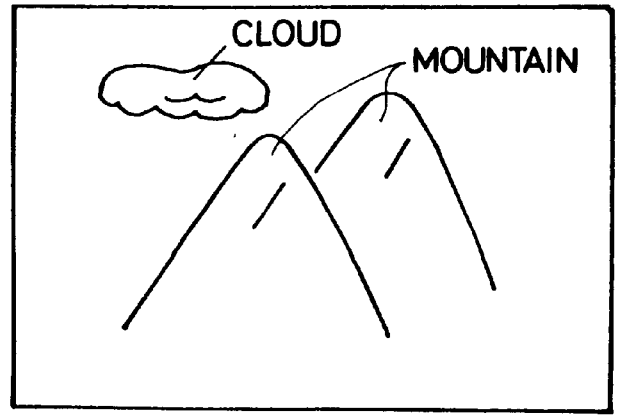
FIG. 63 is an illustration of state in which letters are used in place of marks.

It is also possible to construct such that letters describing the names of the partial images are attached to the respective partial images in place of the marks as shown in FIG. 63, so that the operator can appoint the desired partial image without fail. This function offers an advantage particularly in the drafting of explanatory drawings because the operator can always understand definitely what partial image is being displayed. A hard copy or hard copy data of the image screen with such explanatory letters on display can be utilized as explanatory drawings without requiring any additional writing of explanation. Needless to say, the letters describing the names of the partial images may be substituted by, for example, numerals or short sentences.

As will be understood from the foregoing description, in this embodiment of the invention, a mark is annexed to each of a plurality of partial images constituting an illustration. When the operator has appointed a position within a region of a mark, the apparatus judges that the partial image associated with this mark has been appointed by the operator, and the operator can know the nature of the partial image which is going to be edited. At the same time, the retrieving speed is increased by virtue of the provision of the marks. In consequence, the efficiency of the editorial work can be increased remarkably.

In addition, the load posed on the operator is significantly reduced because the marks have an identical size regardless of the size of the partial images.

When all the marks have an identical form, the data for displaying the marks may be set as constants in the program rather than being stored in the memory 110 so as to enable the mark to be displayed by combination of specific patterns.

The programs may be stored in the memory 110 although in the described embodiments the programs are stored in the memory in the CPU 105.

It is also possible to construct such that two "mountains" overlapping each other form a single partial image with a single mark. In such a case, the operator is required only to distinguish two partial images, namely, "cloud" and "mountains" from each other, so that the selecting operation can be reduced and the construction of the illustration becomes very easy to understand.

It is also to be understood that the use of the personal computer AS-300 made by CANON is only illustrative.

As has been described, in this embodiment, each partial image carries a mark so that the operator can select any desired partial image by pointing one of the marks and the operator can clearly distinguish the partial image which he would like to edit. Consequently, the speed of retrieval is increased and the condition for the editing work can be improved significantly.

Furthermore, the operator can easily appoint the desired partial image because the area for appointing the partial image can be set regardless of the size of the partial image.

Figure 65:
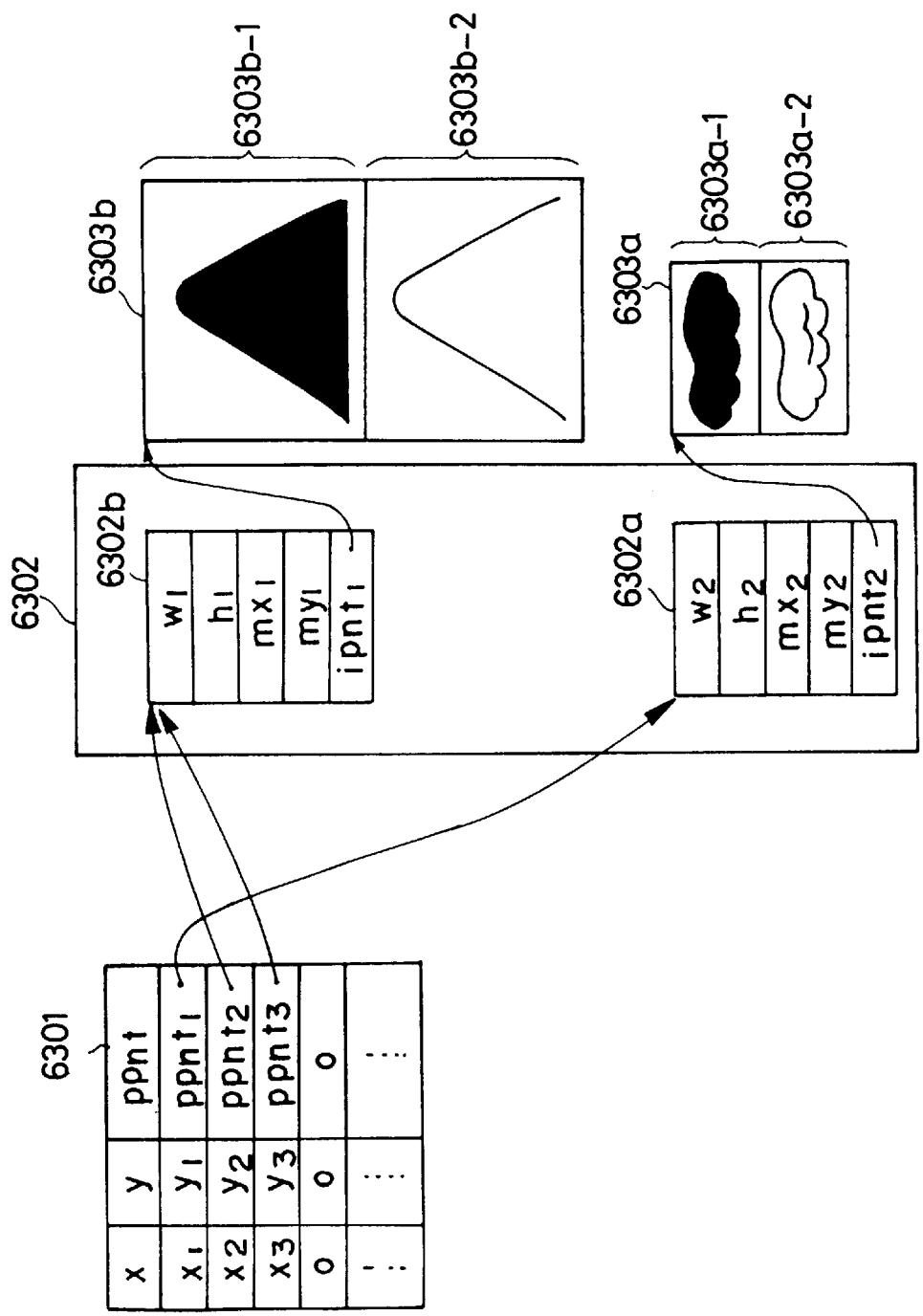
FIG. 65 shows the relationship between the illustration constitution table, partial picture table and partial image patterns.

[Another Embodiment]
(FIGS. 64 and 65)

In the preceding embodiments, a mark is allotted to each partial image. A description will be made hereinunder with specific reference to FIGS. 64 and 65 as to a different embodiment in which partial images are connected through lines to partial image indicating regions.

Referring to FIG. 64, there are three partial images, namely a "cloud" and two "mountains", displayed on a CRT display. At the same time, regions are provided on the CRT out of the area for displaying illustration, at positions corresponding to function keys 6211 to 6216 provided on the keyboard. These regions are connected through lines 6221 to 6223 to the partial images in the illustration displaying area. When the user wishes to edit or correct one of the partial images, he can make access to such a partial image by pressing the function key corresponding to the region which is connected to the designated partial image.

A description will be made first in regard to the method of displaying the partial images. In the following description, it is assumed that two partial images, e.g., a "mountains" and a "cloud" are to be displayed. This, however, is only illustrative and actual apparatus can employ a multiplicity of different partial images which are suitably combined to construct a desired illustration.

FIG. 66 is an illustration similar to that in FIG. 56, showing data concerning the respective partial images, mask patterns associated with the partial images and various data tables. An illustration constitution table 6301, which is used for forming the illustration displayed on the CRT, has a plurality of lines. Each line contains columns for defining the position (x-y coordinates) of each partial image on the display screen and a column (ppnt) which stores a partial data table 6302 containing data concerning the partial image.

The partial image table 6302 has areas for storing the width (W) and height (H) of each partial image, areas relative coordinates (mx, my) with respect to the left upper corner of each partial image, and an area (ipnt) for storing the initial address of storage of each partial image pattern. Preferably, the relative coordinates (mx, my) are positioned at the center of each partial image.

In this embodiment, there are provided two partial image tables 6302a and 6302b, because two partial images, i.e., "mountains" and "cloud" are used. Thus, three or more partial image tables may be provided depending on the number of partial images employed.

The illustration constitution table 6301 and the partial image tables 6302 are set in the table memory 110a within the memory 110. The patterns 6303a-1, 6303a-2 and 6303b-1, 6303b-2 are stored in partial image data storage section 110b of the memory 110. As in the preceding embodiments, the patterns of the partial images are suitably stored in the form of raster image data. However, the data can be stored in the form of combination of various parameters such as starting and terminal ends of straight lines, when the partial images are composed of a plurality of geometrical patterns.

The data of each partial image, e.g., the "mountains," includes two kinds of data, namely, mask pattern data 6303b-1 and partial image data 6303b-2 which are set in a pair. When the partial image data 6303b-2 is to be put on display by being transferred to the V-RAM 104, if there is any preceding image on the V-RAM, the area corresponding to the partial image data 6303b-2 to be newly displayed is cut out by the blackened area of the mask pattern data 6303b-1. Thus, when any partial image is to be displayed, the image already existing on the display is cut out by the mask pattern data corresponding to the partial image data to be newly displayed. It is, therefore, possible to display two mountains in an overlapping manner as shown in FIG. 64. The process for conducting such a display has been described already with reference to a flow chart in FIG. 50 and, therefore, is not detailed here.

The display of the lines 6221 to 6223 is conducted as follows. Each of these lines connects each of the regions on the CRT corresponding to the function keys on the keyboard to a corresponding partial image, more specifically, the position defined by the relative coordinates (mx, my) set in the partial image table 6302. For instance, as shown in FIG. 66, the partial image "cloud" is connected through the line 6221 to a region 6211 corresponding to the function key. This region will be referred to as "function key 6211" for simplification of explanation. More specifically, the line 6221 is formed to connect (a) coordinate $P_{402}$ ($x_1+mx_1$, $y_1+my_1$) obtained by adding the relative coordinates ($mx_1$, $my_1$) having an origin on the left upper end of the partial image to the coordinates ($x_1$, $y_1$) having origin at the left upper corner of the display screen and (b) coordinates of the center of the function key 6211. Obviously, the coordinates of the center of the function key are out of the image display area of the display screen.

FIG. 67 shows a function key coordinates table which shows the coordinates of the function keys 6211 to 6216 with respect to the display screen. Thus, the sets of coordinates shown in the first to sixth lines correspond to the function keys 6211 to 6216. Thus, the lines interconnecting the partial images to the function keys are drawn to connect the coordinates of centers of the partial images and the coordinates set in the function key coordinates table shown in FIG. 67.

Figure 68:
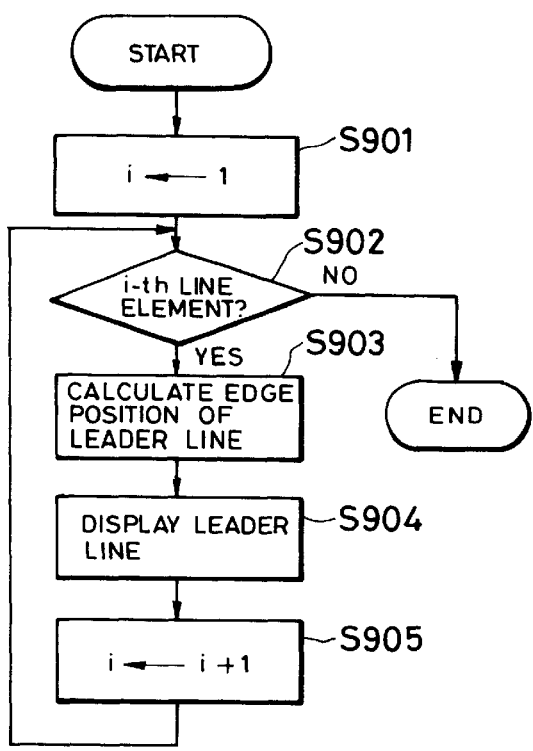
FIG. 68 is a flow chart illustrating the process for displaying leaders.

A process for displaying these lines will be described hereinunder with specific reference to a flow chart shown in FIG. 68. It is assumed here that the display of the partial images has been completed.

In Step S 901, "1" is set as initial value of the variable number i so that a reference may be made to the illustration constitution table 6301 in FIG. 65 starting from the first line of this table. In Step S 902, a judgment is conducted as to whether the i-th line contains any data concerning partial image. This judgment may be conducted in the same way as that in Step S 603 shown in FIG. 50. In Step S 903, the coordinates of one end of the line to be drawn are determined with respect to the partial image table 6302 shown in the column (ppnt) of the i-th line.

In Step S 904, a line is drawn between the coordinates determined in the preceding step S 903 and the coordinate ($sx_i$, $sy_i$) of the function key set in the i-th line in the function key coordinates table 6501. In Step S 906, the variable number i is incremented by "1" and then the process is returned to Step S 902. This operation is repeated until lined are drawn between all the partial images and the corresponding function keys so that an image as shown in FIG. 64 is formed so as to enable the operator to recognize the relationship between the partial images and the function keys at a glance. Once this display is formed, the operator can make access to the desired partial image by pressing the function keys corresponding to the designated partial image.

In the described embodiment, it is necessary that the positions of the function keys on the keyboard are displayed on the CRT display 101. This, however, is not essential and the same effect will be produced by providing switches or keys under the display device for exclusive use in the appointment of partial images and lines are drawn to interconnect the partial images to the corresponding keys or switches. In operation, the CPU judges the states of these keys or switches to detect which one of the partial images is being accessed.

When the aforementioned personal computer AS-300 produced by Canon Inc. is used, the lines can be drawn in a manner which will be explained hereinunder.

Coordinates values $sx_i$ and $sy_i$ are set in the AX register and BX register, respectively. Then, "0" is set in the CL register and the command "INT 15H" is executed, whereby the starting end of the line is determined. Then, the terminal end of the line is determined by inputting coordinate values ($x_i+mx_k$) and ($y_i+my_k$) in the AX register and the BX register, respectively, setting "2" in the CL register and executing the command "INT 15H".

Figure 69A:
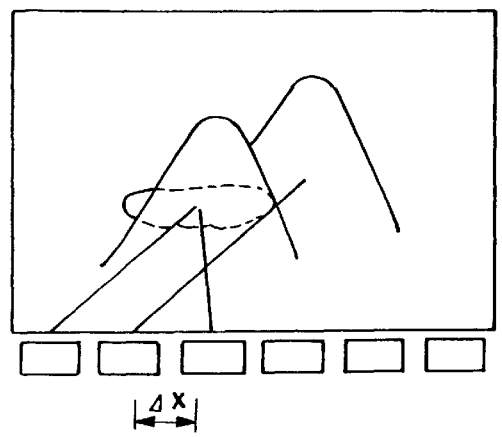
FIGS. 69A and 69B are illustrations of the manner in which the positions of the leaders are changed.
Figure 69B:
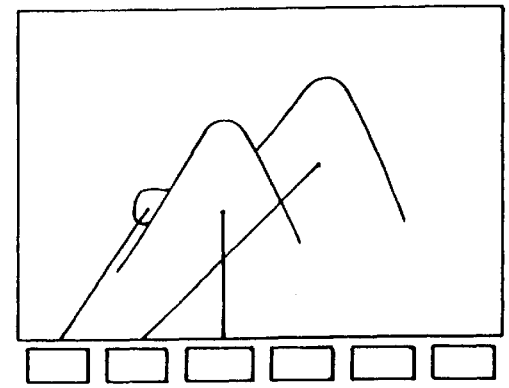

[Modification of Embodiment]
(FIG. 56 and FIGS. 69A, 69B)

In the embodiment described above, the values in the columns $mx_2$, $my_2$ in the partial image table 6302 are determined as relative position with respect to the left upper corner of the respective partial images. This, however, is not exclusive and these values in the columns $mx_2$, $my_2$ may be the reference positions on the respective partial images, i.e., the origins of the local coordinates.

In this case, coordinates of the origin of each partial image are set in the columns $x_i$ and $y_i$ of the illustration constitution table 6301. At the same time, the coordinates of the position at which the display of each partial image is started is set at ($x_i-mx_k$, $y_i-my_k$). The values $mx_k$ and $my_k$ are the values set in the columns $mx_k$ and $my_k$ of the partial image table appointed by the content of the column (ppnt$_i$) of the partial image table. The line between the partial image and the function key is therefore drawn so as to interconnect the coordinates ($x_i$, $y_i$) to the coordinates ($sx_i$, $sy_i$) of the function key. This reduces the operation required for displaying the line so that the processing speed can be increased.

With reference to FIG. 56 mentioned before, a description will be made as to an arrangement in which the illustration constitution table is provided with coordinates mdx$_i$, mdy$_i$ which represent small displacements of the lines. In this case, the coordinates of each line is seemingly represented by ($x_i$+mdx$_i$, $y_i$+mdy$_i$).

In normal operation, "0" is set in the columns mdxi and mdyi. The value "0" means that the deviation from the origin is zero. It is possible, however, to set any desired value in these columns as desired.

It is not necessary to set specific values in these columns mdx$_i$ and mdy$_i$ when the displayed illustration have partial images which are arranged in discrete forms as shown in FIG. 64. However, when the displayed illustration has partial images closely overlapping each other as shown in FIG. 69A, it is very helpful to set specific values in these columns mdx$_i$ and mdy$_i$. Namely, in FIG. 69A, the partial image "cloud" is hidden behind the "outer" mountain so that the lines are drawn substantially from the same position to cause a confusion as to which one of the function keys is connected to the "cloud".

This problem, however, can be overcome as follows. Namely, in such a case, an offset value—$\Delta x$ is input to the column mdx$_1$ of the first line of the illustration constitution table 9201, while keeping the content of the column mdy$_1$ unchanged. In consequence, the position of start of the line connected to the partial image "cloud" is offset by an amount—$\Delta x$ as will be seen from FIG. 69B.

The input of the amount of offset of the starting point of the line may be made by the operator through the keyboard or, alternatively, the arrangement may be such that the line is moved by pop-up menu and the amount of movement of the line is automatically written in the column mdx$_1$ and mdy$_1$ in the illustration constitution table 9201. It is also possible to search any region of the partial image "cloud" which is not hidden by the "outer" mountain and to automatically set the starting point of the line at the center of the thus searched region.

Anyway, a change in the position of the starting end of the line as shown in FIG. 69B is automatically accompanied by a corresponding change in the contents of the related columns in the illustration constitution table 9201, so that the desired partial image can be selected without fail by the function key.

In the foregoing description, the lines are displayed by making use of the function coordinates table 6501 which define the coordinates of the function keys. However, when the position s of th e function keys are fixed as shown in FIG. 64, it is possible to define the positions of the function keys provided that the coordinates of the first function key 6211 and the pitch of the arrangement of the function keys are given. Namely, representing the coordinates of the first function key 6211 by ($stx_0$, $sty_0$) and the pitch of the function keys ($\Delta stx_0$, $\Delta sty_0$), the determination of the terminal ends of the lines in Step S 904 can be conducted by executing computation of the following coordinates.

$$(stx_0+(i-1)\cdot\Delta stx_0, sty_0+(i-1)\cdot\Delta sty_0)$$

[Another Modification]
(FIGS. 70 to 74)

In the embodiment and the modification described hereinbefore, the regions for appointing the partial images are set outside the image display area. This, however, is only illustrative and the described embodiment also may b e modified as follows.

Figure 70:
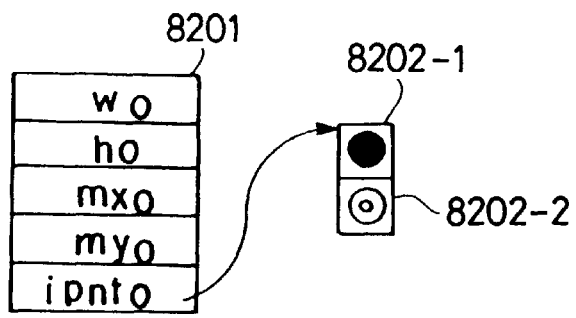
FIG. 70 is an illustration of the relationship between mark patterns and a mark table.
Figure 71:
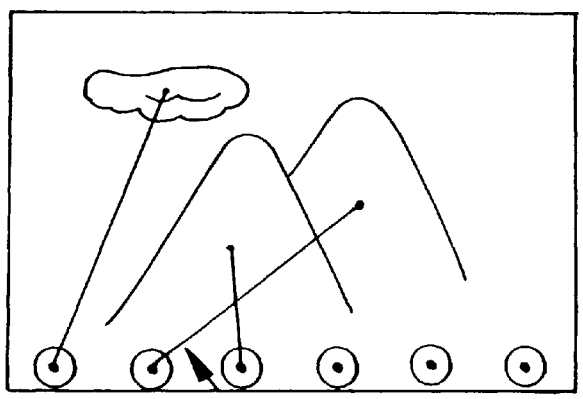
FIG. 71 is an illustration of operation in a case where one of the partial pictures is appointed by a graphic cursor.

A mark pattern 8202-2 is determined as shown in FIG. 70, and the thus defined marks are arranged in a lower portion of the image display area at a predetermined pitch as shown in FIG. 71. These marks are connected to the respective partial images through leader lines. This arrangement is effective when the number of partial images employed exceeds the number of the function keys. A table shown in FIG. 70, referred to as a "mark table", is provided in the table memory 110a. A numeral 8202-1 denotes a mask pattern data corresponding to the mark pattern 8202-2.

In this modification, positions for displaying the mark patterns 8202-2 are set in the function coordinates table 6501, as the points for enabling the selection of the partial images. The display of these mark patterns is conducted in the same way as the process for displaying partial images explained before in connection with the flow chart shown in FIG. 50. In this case, the Steps S 604 and S 605 are executed by using the values $sx_i$, $sy_i$ set in the i-th line of the function coordinates table 6501 in place of the values in the columns $x_i$, $y_i$ in the illustration constitution table 6301 or the table 9201 shown in FIG. 56. The completion of Step S 603 can be judged by examining whether the condition of i$\leq$n is met, where n represents the number of the mark patterns. It will be understood that, since the mark patterns are connected through leader lines to the respective partial images, the operator can easily appoint the desired partial image to be edited by the same manner regardless of the sizes of the partial images. The appointment of the mark pattern may be made by controlling a graphic cursor so as to point the desired mark pattern through a manual movement of the mouse 103 or by determining fixed relations between the mark patterns and suitable keys on the keyboard 102 and pressing the key corresponding to the desired mark pattern.

A description will be made hereinunder as to the case where the illustration is composed of a greater number of partial images than them number of the mark patterns which is in this case six. Obviously, the number of the mark patterns may be increased corresponding to the increase in the number of the partial images. In this case, however, a method will be described which enables the existing six mark patterns or function keys to select any one of seven or more partial images.

Figure 72:
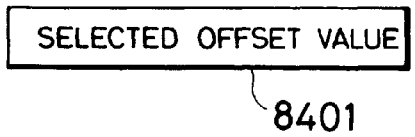
FIG. 72 is an illustration of a selection offset value storage section.
Figure 73:
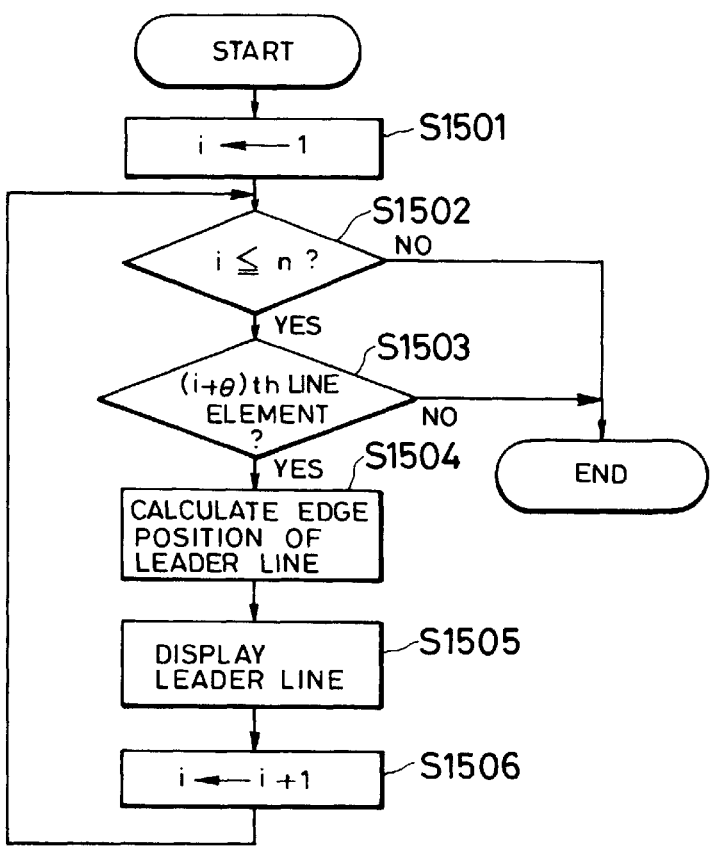
FIG. 73 is a flow chart of a process for displaying leaders in the case where a multiplicity of partial images exist.

When there are seven or more partial images, six partial images are treated as a group of partial images. In operation, a leader line is drawn to a first group of partial images. If the leader line fails to the partial image which is to be selected by the operator, a leader line is connected to the next group of partial images. FIG. 73 shows a flow chart of a process for realizing such a line drawing operation. In FIG. 72, a reference numeral 8401 denotes a selection offset value storage section adapted for storing offset values $\theta$ which identifies each group. This storage section 8401 may be set in the table memory 110a. It is assumed here that the offset value storage section 8401 stores "6" ($\theta$=6).

In Step S 1501, "1" is set as the initial value of the variable i. In Step S 1502, a judgment is conducted as to whether the value i is below the number "6" of the mark patterns or the function keys. If the condition of i$\leq$n is met in this judgment, a judgment is conducted as to whether the (i+$\theta$)-the line in the illustration constitution table 6301 or the table 9201 contains any data concerning a partial image. Then, an operation similar to that performed in Steps S 903 to S 905 is conducted in Steps S 1504 to S 1506.

Therefore, when the offset amount θ is "0", a leader line is displayed to lead to the partial pictures shown in the first to sixth lines in the illustration constitution table 6301 or 9201. Similarly, when the offset value θ is "6", a leader line is displayed to lead to the partial pictures shown in the seventh to 12th lines in the illustration constitution table 6301 or 9201. When a leader line is displayed to lead to the (i+θ)-the partial image while the i-th mark pattern or the function key is appointed, the CPU judges that the (i+θ)-the partial image is being appointed, proceeds the process to next step. It is possible to arrange such that the values to be set in the selection offset value storage section are variable through key input to pop-up menu, so that a large number of partial images can be selectively appointed with a small number of mark patterns or the function keys.

When the mark pattern is appointed by the graphic cursor, it is possible to effect a quicker judgment by examining the position of the coordinates appointed by the graphic cursor with respect to the mask pattern data of the mark pattern. Namely, the pixel data within the mask pattern data annexed to the mark on the coordinates appointed by the graphic cursor are read and judged whether they are "black" or "white", i.e., "1" or "0". By designing such that the mask pattern data of a mark greater than the mark data, the mask pattern can have a greater area so as to facilitate the appointing operation.

As will be understood from the foregoing description, in this embodiment of the invention, leader lines are drawn to indicate the correspondence between each of a plurality of partial images constituting an illustration and one of the partial image appointing portions such as mark patterns or function keys. Therefore, the operator can know very clearly the nature of the partial image which is going to be edited. In addition, the appointment of any desired partial image is very much facilitated. In consequence, the condition for the editorial work can be improved remarkably.

Figure 74:
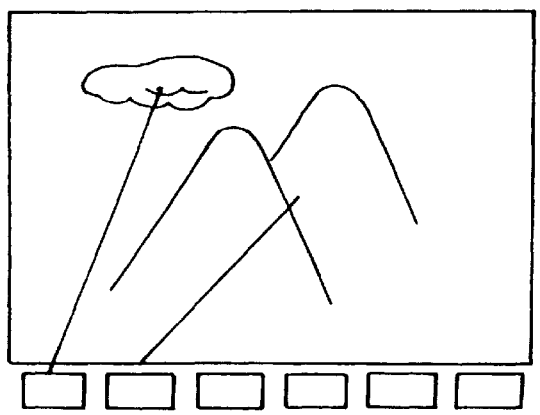
FIG. 74 is an illustration of an example of display of leaders used when a single partial image is formed by two images.

When the two "mountains" displayed in overlapping manner as shown in FIG. 74 is formed as a single partial image, only one leader line is used to indicate this single partial image. In such a case, whether the appointed partial image is the "cloud" or the "mountain" can be made quickly by a single selecting operation. In addition, the constituent elements of the illustration can be understood at a glance so that the operation of the image editing apparatus can be improved remarkably.

When all the marks have an identical form, the data for displaying the marks may be set as constants in the program rather than being stored in the memory 110 so as to enable the mark to be displayed by combination of specific patterns. The programs may be stored in the memory 110 although in the described embodiments the programs are stored in the memory in the CPU 105.

It is also to be understood that the use of the personal computer AS-300 made by Canon Inc. is only illustrative.

As has been described, in this embodiment, each of the partial images constituting an illustration is connected through a leader line to a suitable partial image appointing portion, so that the operator can clearly distinguish the partial image which he would like to edit. Consequently, the appointment of the partial image is facilitated and the condition for the editing work can be improved significantly.

[Another Embodiment]
(FIG. 75)

A description will be made hereinunder as to a different embodiment in which means are provided for energizing and de-energizing the appointing portions such as the marks.

FIG. 57 is a block diagram showing the basic construction of this embodiment.

This embodiment has a CRT display for displaying an image, a keyboard 102 connected to a keyboard interface 109, and a mouse 103 serving as a pointing device and connected to a mouse interface. A numeral 104 denotes a video RAM (V-RAM) for storing the image data corresponding to the image displayed on the CRT display. The V-RAM is adapted for outputting data to the CRT display 101 through the CRT interface 107. A numeral 105 denotes a CPU for controlling the operation of the whole apparatus, in accordance with programs stored in a memory 105a therein. The memory 105a stores programs of later-mentioned process, as well as programs used for editing purposes.

A memory 110 has a later-mentioned table memory 110a, partial image data storage section 110b and a mark display flag 110c. A magnetic disk 111 as an external memory device is connected to a disk interface 112. A numeral 113 denotes an auxiliary RAM having a capacity equal to that of the V-RAM 104. These interfaces and the memories are connected to a system BUS 106.

Energization and de-energization of the appointing portions such as the marks is conducted in a manner explained hereinunder. Each partial image is displayed in accordance with the following process.

Figure 76A:
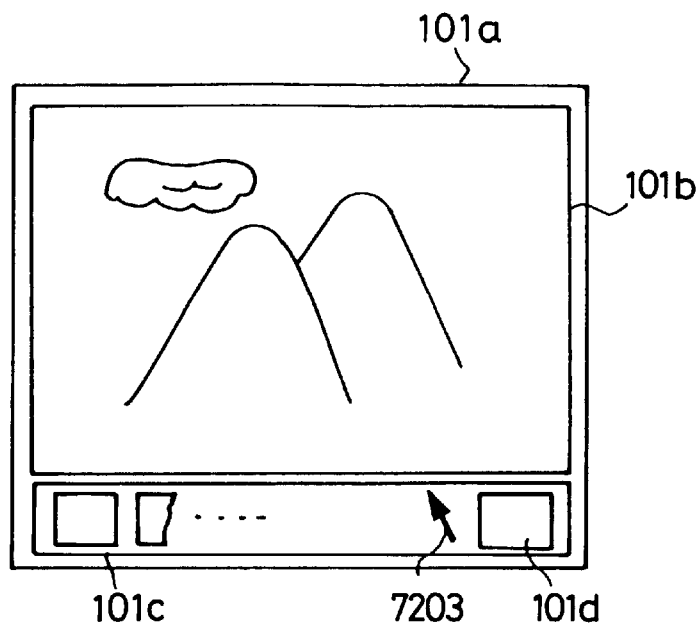
FIGS. 76A and 76B are illustrations of changes in the display of marks in the embodiment shown in FIG. 75.

FIG. 76A shows an example of an illustration displayed on the display screen. This illustration is composed of three constituent elements, namely, one "cloud" and two "mountains". These constituent elements are referred to as "partial images". Detailed description in connection with FIGS. 76A and 76B will be given later.

FIG. 56 shows various partial image data for constituting an illustration, together with mask pattern data and various data tables. An illustration constitution table 6301 contains partial image data for constituting an illustration to be displayed. More specifically, the illustration constitution table 6301 has a plurality of lines each of which contains a different partial image data. More specifically, each line has columns for defining the position (x-,y-coordinates) of each partial image data with respect to the display screen, and a column "ppnt" showing addresses of partial image tables containing data concerning the nature of respective partial image data.

A partial image table 5301 has lines which contain the width (W) and height (H) of each partial image and relative coordinates ($mx_i$, $my_i$) for displaying later-mentioned mark associated with the partial image data, as well as a line "ipnt" which stores the initial address of storage of each partial image pattern.

The illustration constitution table 6301 and the partial image tables 6302 are provided in a table memory 110a within the memory 110, while patterns 6303a-1, 6303a-2, 6303b-1 and 6303b-2 are stored in the partial image data storage area 110b. In this embodiment, patterns (raster image data) are used as the partial images. However, when the image is to be formed by a combination of a plurality of geometrical patterns, the partial image data may have the form of parameters which define the geometrical pattern, such as the starting and terminating positions of a straight line.

From the above explanation, it will be seen that the position at which the display of a partial image is commenced, i.e., the position of the left upper corner when the partial image data is developed in the V-RAM 104, is represented by ($x_i-mx_i$, $y_i-my_i$). Thus, the pattern of each partial image, when it is to be displayed, is opened from this position on the V-RAM 104.

A description will be made hereinunder as to the process for displaying the partial image "mountain", by way of example.

As shown in FIG. 65, the partial image data is stored in combination with the associated mask pattern data. For instance, in case of the partial image "mountain", the partial image data 6303b-2 is stored together with the associated mask pattern data 6303b-1. The storage of the mask pattern data is necessary for the following reason. When it is desired to put the partial image data 5303b-2 on display by sending it to the V-RAM 104, if there is any preceding image set on the V-RAM 104 for display, it is necessary to mask the preceding data on the V-RAM 104 to cut out the region corresponding to the black region in the mask data pattern 6303b-1. That is, when any new partial image data is to be displayed, a preparatory operation is conducted to cut out the existing image by a mask pattern corresponding to the partial image to be displayed. This operation is necessary for displaying, for example, two "mountains" in an partly overlapping manner as shown in FIG. 76A.

[Display of Marks]
(FIGS. 76A, 76B, 77, 78 and FIGS. 49A, 49B)

Figure 76B:
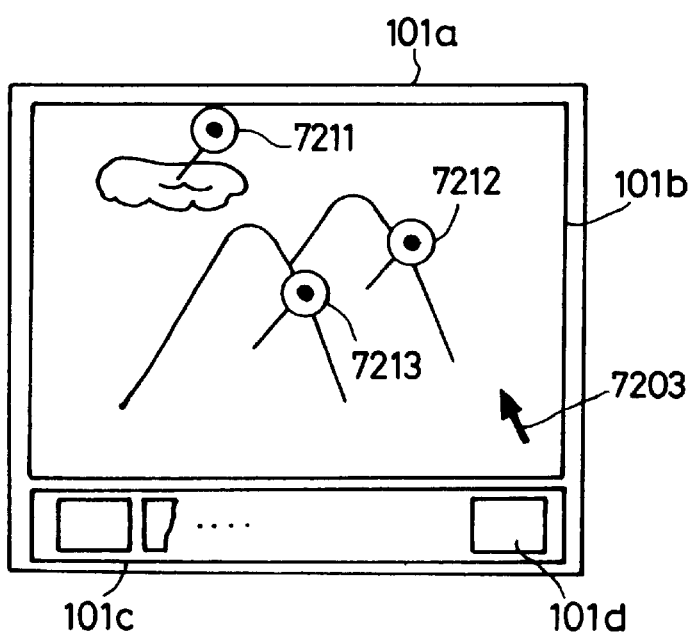

FIGS. 76A and 76B show examples of images displayed during editing operation of images. The illustration displayed is composed of three partial images. This number of partial images, however, has been selected for the purpose of simplifying the description. Actually, a greater number of partial images is employed for forming an illustration.

Referring to these Figures, 101a denotes the display area of the CRT display 101. An edition image display area for displaying images to be edited or formed is denoted by 101b. An auxiliary display area 101c is used, although not exclusively, for the purpose of displaying various menus used for the edition of the images displayed in the edition image display area 101b.

A graphic cursor 7203 is adapted to be freely moved throughout the display area 101a. Editing operation is conducted by moving the graphic cursor 7203 between the auxiliary display area 101c and the edition image display area 101b. As is well known, the graphic cursor 7203 follows the movement of the mouse 103.

It often becomes necessary to effect an editing (correction. movement and so forth) on a specific partial image after or during forming an illustration. In such a case, the operator moves the mouse 103 to bring the graphic cursor to a position where it points the designated partial image and then pressed a specific key on the mouse 103 thereby appointing and selecting the designated partial image. However, it is often difficult to visually check what partial image on the display has been actually pointed. In addition, it is difficult to correctly position the graphic cursor on the partial image particularly when the partial image has a small size.

To obviate these problems, this embodiment proposes to use, only when a partial image as the editing object is to be appointed, marks 7211 to 7213 constituted by double circles and leader lines. The reason why the marks are used only when the demand for appointment exists is that the normal operation is preferably conducted without such marks so as to enable the operator to confirm the state of the illustration over the entire area of the display.

For the purpose of appointing the desired partial image, the marks 7211 to 7213 are put on display in relation to the respective partial images. Then, the graphic cursor 7203 is moved to point the double circle of the mark associated with the designated partial image. By using such marks, it is possible to appoint any desired partial picture equally easily regardless of the sizes of the partial images.

The switching between the mode in which the marks are displayed and the mode in which the marks are not displayed is conducted as follows. Briefly, in this embodiment, the marks are displayed when the mark display flag 101c is "ON", while the graphic cursor 7203 is within the edition image display area 101b. The mark display flag 110c can be turned on and off by moving the graphic cursor to an editing region 101d in a menu shown in the auxiliary display area 101c in FIGS. 76A and 76B, and then pressing a switch provided on the mouse 103. The editing region 101d is adapted for conducting all the control concerning editing operation such as movement or correction of the selected partial image.

Thus, th e m arks are not displayed in the state shown in FIG. 76A because in this state the graphic cursor 7203 does not resides in the edition image display area 101b, even if the mark display flag 101c has been turned on. In the state shown in FIG. 76B however, the marks 7211 to 7213 are displayed because the mark display flag has been turned "ON" while the graphic cursor 7203 is within the edition image display area 101b.

The process of control of the display of marks will be described hereinunder with reference to a flow chart shown in FIG. 77.

In Step S 400, coordinates are input through the mouse 103 (or keyboard 102) and a judgment is conducted in Step S 401 as to whether there is any change in the coordinates input in Step s 401 and the switch on the mouse (or a predetermined key on the keyboard).

When this judgment has proved that there is no change from the data input previously, the process returns again to Step S 400. However, if there is a change in the coordinate values or in the state of theswitch, the process proceeds to next step S 402, in which a judgment is conducted as to whether there is any change in the input coordinate values. If there is no change in the coordinate values, the process proceeds to Step S 407 in which a predetermined editing operation is conducted. However, if any change is found in the coordinate values, the process proceeds to Step S 403 in which a judgment is conducted as to whether the mark display control operation is going to be started. Thus judgment is done by examining whether the mark display flag 110c is "ON" while the input coordinates are within the editing image display area 101b. If the answer is YES, the process proceeds to Step S 404 so that marks are displayed for the respective partial images, and editing operation is conducted in Step S 407. However, if NO is the answer to the question posed in Step S 403, the process proceeds to Step S 405 in which a judgment is conducted as to whether the mark display control is finished. This can be done by examining whether the mark display flag 110c is OFF or whether the input coordinates are out of the edition image display area 101b. If the answer is NO, the process proceeds to Step S 407, whereas, if the answer is YES, the next step S 406 is commenced in which a routine for erasing the marks is started.

It is to be noted that Step S 407 also includes on/off control of the mark display flag. The input for turning the mark display flag on and off may be input through other means than that described, e.g., through the keyboard 102.

The routine for erasing the marks conducted in Step S 406 is as follows. The image data displayed before the display of the mark has been transferred to the auxiliary RAM 113. As the Step S 406 is commenced, the image data is transferred from the auxiliary RAM 113 to the V-RAM 104 so that the illustration is fully displayed again on the display. This can be conducted by the following procedure.

In Step S 501, partial images (three partial images in this case) are displayed on the edition image display area 101b in accordance with the illustration constitution table 6301, and these partial images are stored in Step S 502 within the auxiliary RAM 113. Then, whether the mark display flag is ON is examined in Step S 503 and, if the flag is ON, the display of the flag is conducted in Step S 504.

Thus, when any editing is effected on the illustration, the display and erasion of the marks can automatically be performed in accordance with the procedure explained in connection with FIG. 77, as the process for re-displaying the illustration is executed as explained above. It will also be seen that the initialization or clearing of the auxiliary RAM 113 can be effected by conducting executing the illustration forming process after turning the mark display flag OFF and evacuating the illustration constitution table 6301.

As will be understood from the foregoing description, in this embodiment, the marks are displayed only when there is a demand for editing one of the partial images on display. The marks clearly indicate the partial images so that the operator can easily appoint the desired partial image by pointing one of the displayed marks. Thus, the described embodiment improves the efficiency of the editing operation.

In the described embodiment, when marks are displayed for all the partial images on display, the whole portion of the image displayed on the CRT display is preserved in the auxiliary RAM. This, however, is only illustrative and the arrangement may be such that only the portion of the image data in the region where the marks are to be displayed is preserved in the auxiliary RAM 7133.

FIG. 49A mentioned before shows the relationship between the mark table 5302z, mark pattern data 5303z-2 and mask pattern data 5303z-1. In this Figure, $w_0$ represents the width of the mark pattern data 5303z-2, while $h_0$ represents the height of the same. The origin of local coordinates of the mark are represented by $mx_0$, $my_0$, respectively. A column which stores the initial address data of storage of the mask pattern data 5303z-1 is represented by "$ipnt_0$". Therefore, when a mark is displayed, the image data which has been displayed within the regions of a width $w_0$ and a height $h_0$ are successively stored in cells 7601, 7602 . . . in the auxiliary RAM 113. The number of the cells is at least greater than the number of the partial images.

Thereafter, when the mark is erased, the image data stored in the cells 7601, 7602 . . . are returned to the original regions on the V-RAM 194.

Figure 78:
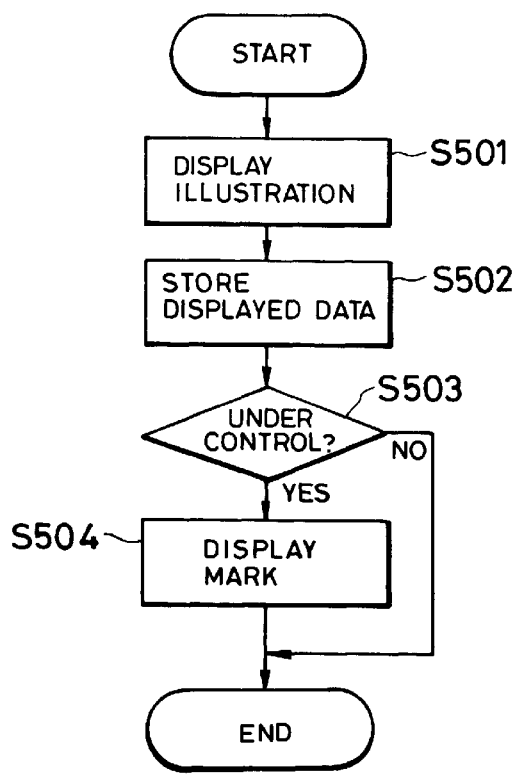
FIG. 78 is a flow chart of a process for displaying marks and storing image in the embodiment shown in FIG. 75.

When this arrangement is used, the operation conducted in Steps S 501 and S 502 in the flow chart shown in FIG. 78 is altered as shown below.

In the foregoing description, the operation conducted in Step S 501 is achieved on the basis of the coordinates $(x_i, y_i)$ of the center of each partial image. In this case, however, this coordinates is used as the origin of each mark. Thus, each mark occupies a rectangular region having an upper left corner and a right lower corner expressed as follows, respectively.

$(x_i-mx_0, y_i-my_0)$ $(x_i-mx_0+w_0-1, y_i-my_0+h_0-1)$

The rectangular regions for the plurality of marks are successively stored in the auxiliary RAM 113. In consequence, the rectangular regions where the marks corresponding to the first to third lines in the illustration constitution table 5301 are stored in the cells of the auxiliary RAM 113.

It is thus possible to realize display and erasion of the mark. This method offers advantages that a high-speed processing is possible when the illustration display area is large and the mark pattern is small while the number of partial images is small, and that the consumption of the memory is reduced.

In the described embodiment, the mark display flag is turned ON when a mouse key is pressed by the operator after the graphic cursor 7203 is moved to a position where it points the editing region 101d. The marks are displayed only when the mark display flag has been turned ON while the graphic cursor is within the editing image display region 101b. This mark displaying method, however, is only illustrative and various other methods may be used equally well. For instance, the display and evasive of the marks may be controlled in accordance with the state of the switch on the mouse 103, i.e., depending on whether the switch has been pressed or not. It is also possible to construct such that the marks are displayed whenever a suitable mark display control key on, for example, the keyboard 102 or such that the switching between the mark display mode and the mark erasing mode can be done by pressing this mark display control switch. In such a case, the step S 403 in the flow chart shown in FIG. 77 will have to be modified such that the CPU detects the commencement of the control for displaying the mark upon sensing the OFF state of the mark display flag 110c and pressing of the mark display key.

Figure 77:
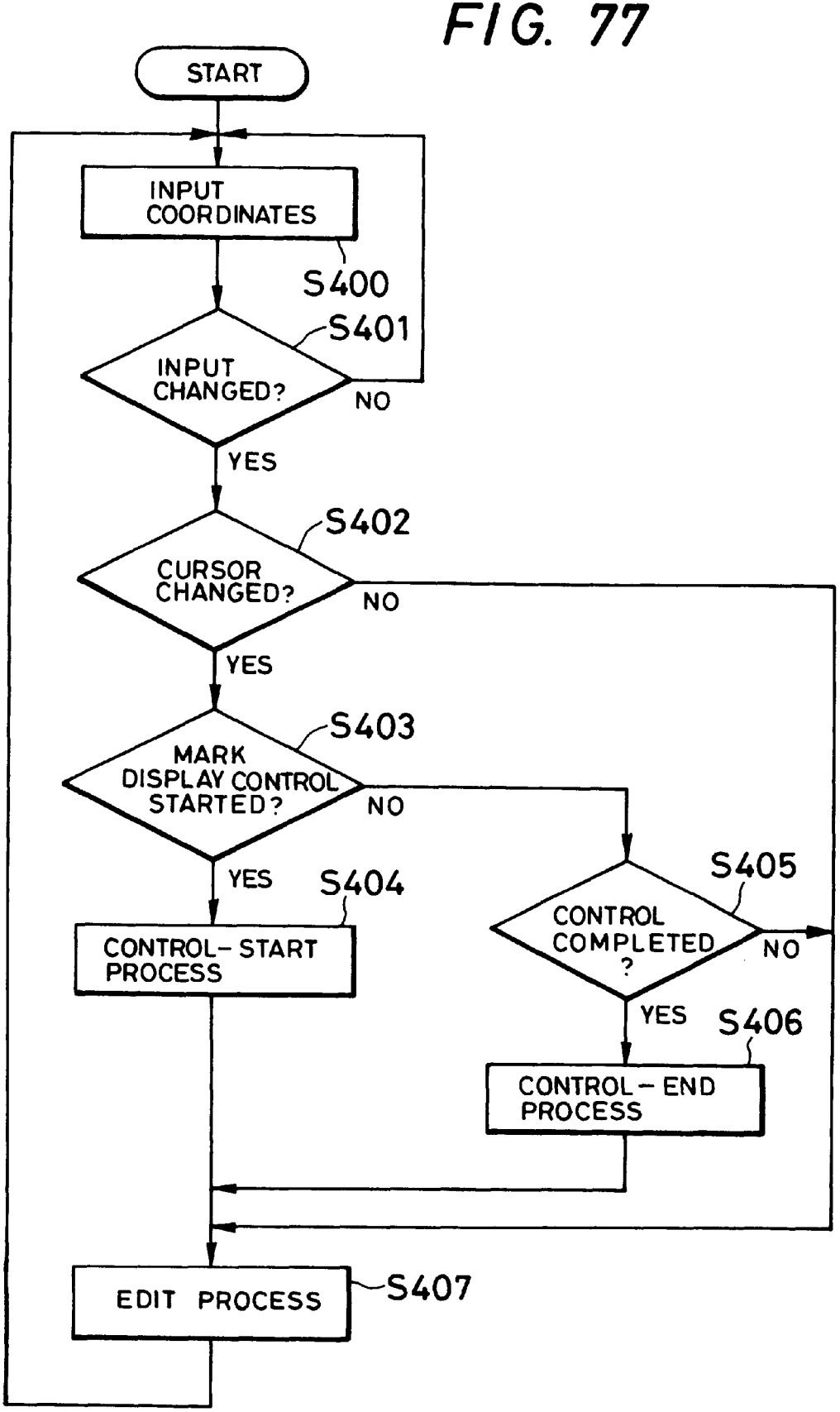
FIG. 77 is a control flow chart in the first embodiment.

Anyway, such a modification can be achieved by suitably replacing Steps S 403 and S 405 in the flow chart shown in FIG. 77 in accordance with the manner of detection of timing.

[Modification]
(FIG. 64)

Figure 79:
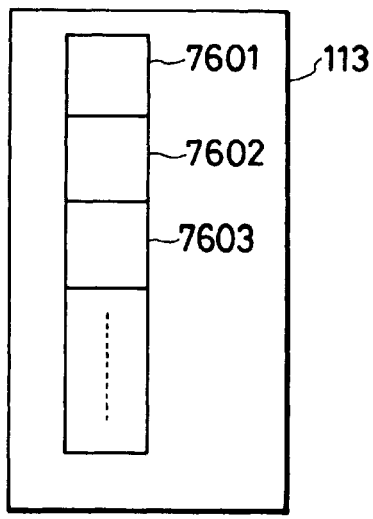
FIG. 79 is an illustration of the state in which data are stored in an auxiliary RAM.

In the embodiment described hereinabove, the mark pattern 5303z-2 shown in FIG. 79 is displayed for each of the partial images. This, however, is not intended to be limiting.

For instance, it is possible to establish fixed relations between the partial images and external keys such as switched on the display device or keys on the keyboard, through leader lines 6221 to 6223, as shown in FIG. 64. The leader lines may be used in the form of EXCLUSIVE OR with the V-RAM 104. When the EXCLUSIVE OR operation is conducted twice on the same leader line, the original leader lines appears again on the display, so that auxiliary RAM 113 may be dispensed with. When the operator wishes to appoint one of the partial images for the editing purpose, he has only to press one of the external keys 6211 to 6213 corresponding to the leader line leading from the designated partial image.

Figure 80:
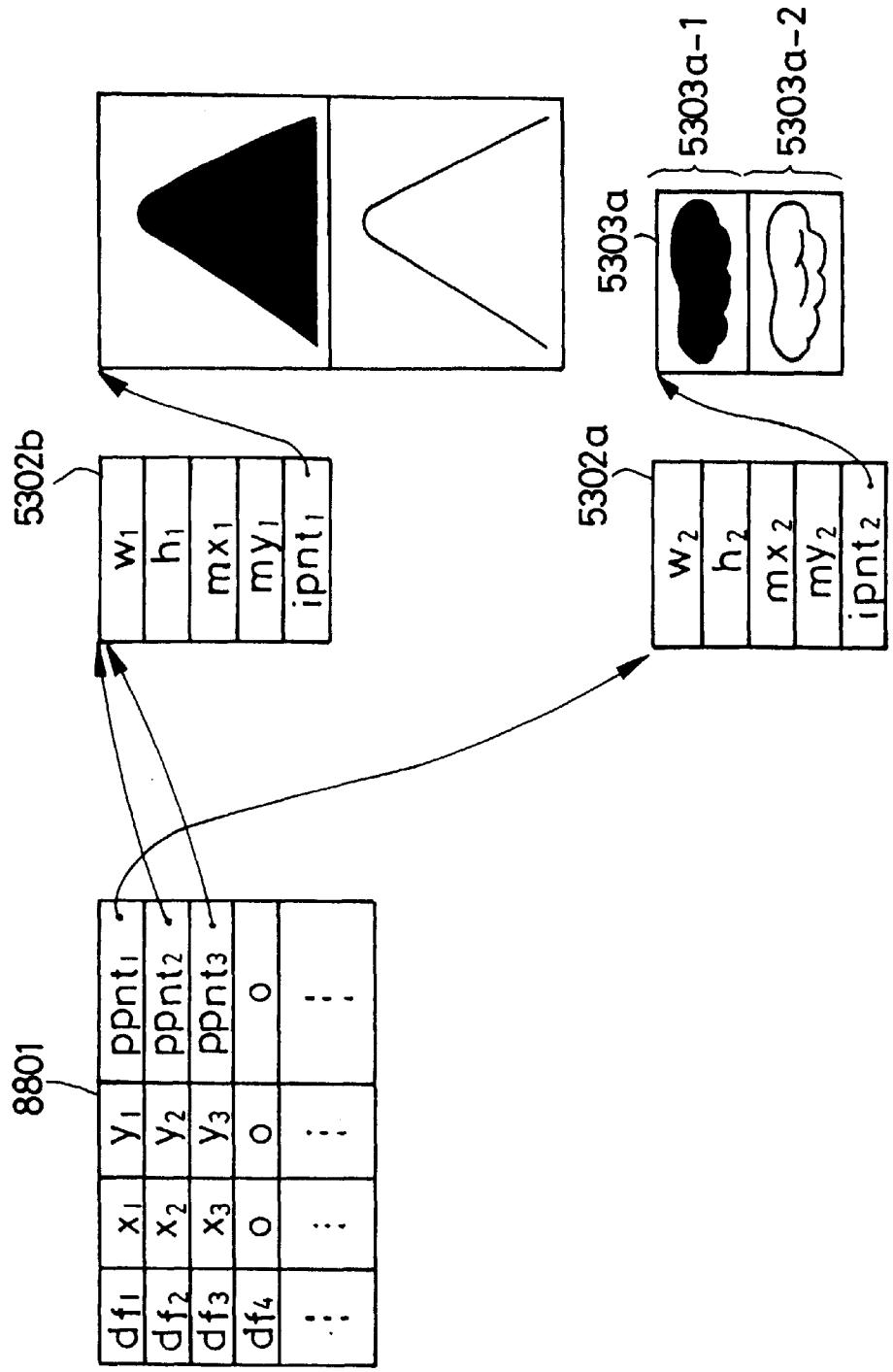
FIG. 80 shows partial image patterns, mask patterns and various data tables which are used in composing an illustration in a different embodiment of the present invention.
Figure 81:
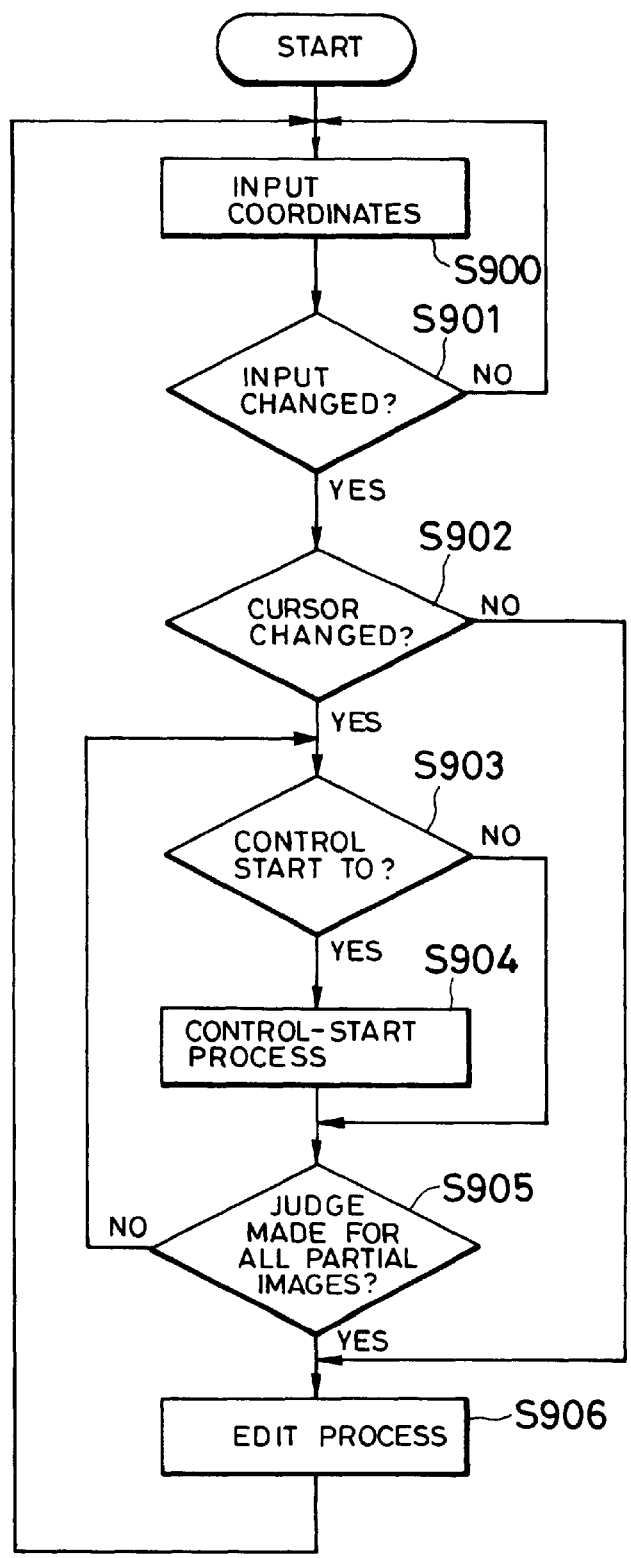
FIG. 81 is an illustration of a control flow chart showing the process of a control performed in the embodiment shown in FIG. 80.

[Another Modification]
(FIGS. 80 and 81)

Another modification will be described in which a different method is used for displaying marks.

In the embodiment described before, marks are displayed for all the partial images when the graphic cursor 7203 is in the editing image display area 101b while the mark display flag 110c has been turned ON. This, however, is only illustrative and the arrangement may be such that the display of marks is conducted in accordance with the distance between the graphic cursor 7203 and the mark. To this end, the illustration constitution table is formed as denoted by 8801 in FIGS. 80. This illustration constitution table 8801 is provided with a display flag column $df_i$. The display and erasion of the mark is conducted in accordance with the state (ON/OFF) in the display flag $df_i$.

To explain in more detail, a judgment is conducted as to the whether the distance between the graphic cursor 7203 and the position where the mark is to be displayed has become smaller than a predetermined value ($r_g$). Thus, the mark is displayed for any partial image which within a region of a radius $r_g$ from the graphic cursor which is being moved in the display area.

This judgment is conducted by checking where the following condition is met:

$$(x_i-x_g)^2+(y_i-y_g)^2 \leq rg^2$$

Where, $x_g$ and $y_g$ represents x- and y-coordinates of the graphic cursor, respectively.

This operation will be described hereinunder with reference to a flow chart shown in FIG. 8.

In Step S 900, coordinates are input from the mouse 103 or the keyboard 102. In Step S 901, a judgment is conducted as to whether any change has caused in the coordinates input in Step S 900 or the state of a switch on the mouse or a predetermined key on the keyboard 102, as compared with data received in preceding input cycle. If no change in the data is confirmed, the process returns again to Step S 900. However, when the judgment proved that a change has been caused in the coordinates or in the state of the switch, the process proceeds to next Step S 902 in which a judgment is conducted as to whether a change has been caused in the input coordinates. If the judgment has proved that there has been no change, the process proceeds to Step S 906 in which a predetermined editing operation is conducted. However, when any change is found in the coordinates, the process proceeds to Step S 903. In this Step S 903, a judgment is conducted as to whether the above inequality is satisfied, using the coordinates $(x_g, y_g)$ input in Step S 901, for each of the coordinates $(x_i, y_i)$ in the respective lines i of the illustration constitution table 8801, starting with the coordinates $(x_1, y_1)$ stored in the first line.

When the condition of the inequality is satisfied with the data in i-th line, the CPU turns the column $df_i$ of the i=the line ON, thereby causing a mark to be displayed at the coordinates $(x_i, y_i)$ in Step S 904. In Step S 905, a judgment is conducted as to whether check has been completed for all lines in the illustration constitution table. After the completion of the check, the process proceeds to Step S 906.

As has been described, in this modification, a mark or the like index is displayed only when the operator has tried to appoint one of the partial images. In consequence, the operator can easily appoint the desired partial image. The marks or indexes are not displayed unless the operation is in the mode for appointing a specific partial image, so that the operator can grasp the state of display over the entire display area without being hindered by the presence of marks.

In addition, the appointment of the partial image desired by the operator can be done easily by virtue of the fact that appointing regions such as marks can be provided regardless of the sizes of the partial images.

When the marks have an identical form, the mark display data is stored in the program in the form of constants without being stored in the memory 110, so that the mark may be formed by combination of patterns. The memory for programs may be provided in the memory 110, though it is provided in the CPU in the foregoing description.

As has been described, according to this embodiment of the invention, the marks or indexes for the respective partial images are displayed only when the operator has tried to appoint one of the partial images. These marks or indexes facilitate the appointment of the desired partial image. In addition, since the marks or indexes are displayed only when the appointment of one of the partial images in necessary, the operator in normal operation can grasp the state of illustration over the entire display area without being hindered by such marks or indexes.

What is claimed is:

1. An image editing apparatus comprising:

picture memory means for storing a plurality of pictures;

menu memory means for storing a menu having a plurality of items which are divided into groups with respective different classes, wherein each item included in one group is associated with at least one item included in another group having a lower class than the one group and each item is associated with a different one of the plurality of pictures stored in said picture memory means;

first display control means for controlling displaying on a display screen of a second plurality of pictures stored in said picture memory means;

designating means for designating one of the second plurality of pictures displayed by said first display control means;

second display control means for controlling displaying of a list of items included in one of the groups having a lower class than another of the groups including an item corresponding to the one picture designated by said designating means;

selecting means for selecting one of the list of the items displayed by said second display control means; and replacement means, in response to selection of one of the displayed list of items by said selecting means, for replacing the picture designated by said designating means with a picture associated with the selected one item, wherein content of the list of items displayed under control by said second display control means for a replacement picture replacing a picture at a predetermined position by said replacement means is different from content of the list of items displayed for the replaced picture.

2. An apparatus according to claim 1, wherein said second display control means displays the list of items on the one picture designated by said designating means.

3. An apparatus according to claim 1, wherein said designating means includes a cursor movable on the display screen and designates one of the displayed second plurality of pictures based on a coordinate position indicated with the cursor.

4. An apparatus according to claim 3, further comprising a pointing device for instructing movement of the cursor.

5. An apparatus according to claim 1, wherein each of the groups is provided with an item for instruction for movement of the one picture designated by said designating means.

6. An apparatus according to claim 1, wherein said replacement means replaces the designated picture with the associated picture for each one of the plurality of pictures displayed on the screen.

7. An apparatus according to claim 1, wherein one of the groups indicates a sport and another one of the groups having a lower class than the one group indicates actions of the sport.

8. An apparatus according to claim 1, further comprising memory means including the display screen.

9. An image editing method comprising:

a picture memory step of storing in a picture memory a plurality of pictures;

a menu memory step of storing a menu having a plurality of items which are divided into groups with respective different classes, wherein each item included in one group is associated with at least one item included in another group having a lower class than the one group and each item is associated with a different one of the plurality of pictures stored in said picture memory step;

a first display control step of controlling displaying on a display screen of a second plurality of pictures stored in said picture memory step;

a designating step of designating one of the second plurality of pictures displayed by said first display control step;

a second display control step of controlling displaying of a list of items included in one of the groups having a lower class than another of the groups including an item corresponding to the one picture designated by said designating step;

a selecting step of selecting one of the list of the items displayed by said second display control step; and a replacement step of, in response to selection of one of the displayed list of items by said selecting step, replacing the picture designated by said designating step with a picture associated with the selected one item, wherein content of the list of items displayed under control by said second display control step for a replacement picture replacing a picture at a predetermined position by said replacement step is different from content of the list of items displayed for the replaced picture.

10. A method according to claim 9, wherein said second display control step displays the list of items on the one picture designated by said designating step.

11. A method according to claim 9, wherein said designating step includes a cursor movable on the display screen and designating one of the displayed second plurality of pictures based on a coordinate position indicated with the cursor.

12. A method according to claim 11, further comprising a pointing step of instructing movement of the cursor.

13. A method according to claim 9, wherein each of the groups is provided with an item for instruction for movement of the one picture designated by said designating step.

14. A method according to claim 9, wherein said replacement step replaces the designated picture with the associated picture for each one of the plurality of pictures displayed on the screen.

15. A method according to claim 9, wherein one of the groups indicates a sport and another one of the groups having a lower class than the one group indicates actions of the sport.

16. A method according to claim 9, further comprising a memory step including displaying on the display screen.

17. A computer readable medium having recorded thereon codes for implementing a computer implementable method of image editing comprising:

a picture memory step of storing in a picture memory a plurality of pictures;

a menu memory step of storing a menu having a plurality of items which are divided into groups with respective different classes, wherein each item included in one group is associated with at least one item included in another group having a lower class than the one group and each item is associated with a different one of the plurality of pictures stored in said picture memory step;

a first display control step of controlling displaying on a display screen of a second plurality of pictures stored in said picture memory step;

a designating step of designating one of the second plurality of pictures displayed by said first display control step;

a second display control step of controlling displaying of a list of items included in one of the groups having a lower class than another of the groups including an in item corresponding to the one picture designated by said designating step;

a selecting step of selecting one of the list of the step of items displayed by said second display control step; and a replacement step of, in response to selection of one of the displayed list of items by said selecting means, replacing the picture designated by said designating step with a picture associated with the selected one item, wherein content of the list of items displayed under control by said second display control step for a replacement picture replacing a picture at a predetermined position by said replacement step is different from content of the list of items displayed for the replaced picture.

18. A computer readable medium according to claim 17, wherein said second display control step displays the list of items on the one picture designated by said designating step.

19. A computer readable medium according to claim 17, wherein said designating step includes a cursor movable on the display screen and designating one of the displayed second plurality of pictures based on a coordinate position indicated with the cursor.

20. A computer readable medium according to claim 19, further comprising a pointing device for instructing movement of the cursor.

21. A computer readable medium according to claim 17, wherein each of the groups is provided with an item for instruction of movement of the one picture designated by said designating step.

22. A computer readable medium according to claim 17, wherein said replacement step replaces the designated picture with the associated picture for each one of the plurality of pictures displayed on the screen.

23. A computer readable medium according to claim 17, wherein one of the groups indicates a sport and another one of the groups having a lower class than the one group indicates actions of the sport.

24. A computer readable medium according to claim 17, further comprising a memory step including displaying on the display screen.

* * * * *

UNITED STATES PATENT AND TRADEMARK OFFICE
CERTIFICATE OF CORRECTION

PATENT NO.    : 6,184,860 B1
DATED         : February 6, 2001
INVENTOR(S)   : Tadashi Yamakawa It is certified that error appears in the above-identified patent and that said Letters Patent is hereby corrected as shown below:

Title page,
Item [30], Foreign Application Priority Data, "61-201767" should read -- 61-211767 -- and 61-201768" should read -- 61-211768 --;
Item [56], OTHER PUBLICATIONS, "(May 196)," should read -- (May 1986), --.

Column 1,
Line 21, "a" should be deleted;
Line 23, "of" should be deleted; and
Line 32, "Edition" should read -- Editing --.

Column 2,
Line 43, "desried" should read -- desired --; and
Line 57, "before-hand" should read -- before hand --.

Column 3,
Line 26, "coordinates" should read -- coordinate --;
Lines 64 and 65, "Number" should read -- number --; and
Line 67, "Numbers" should read -- numbers --.

Column 4,
Line 2, "(MSB) ," should read -- (MSB), --;
Line 9, "constitute" should read -- constitutes --;
Line 36, "position Pi" should read -- position pi --;
Line 47, "inmost" should read -- in most --; and
Line 65, "cooridnates" should read -- coordinate --.

Column 5,
Line 39, "a" should read -- an --;
Line 45, "to" (first occurrence) should be deleted;
Line 54, "movment" should read -- movement --; and
Line 57, "s" should read -- a --.

Column 6,
Line 48, "of" should be deleted.

UNITED STATES PATENT AND TRADEMARK OFFICE
CERTIFICATE OF CORRECTION

PATENT NO. : 6,184,860 B1
DATED : February 6, 2001
INVENTOR(S) : Tadashi Yamakawa It is certified that error appears in the above-identified patent and that said Letters Patent is hereby corrected as shown below:

Column 7,
Line 32, "a" should read -- an --.

Column 8,
Line 22, "a" should read -- an --

Column 10,
Line 23, "resister" should read -- register --;
Line 35, "This" should read -- The --;
Line 40, "is" should read -- are --; and
Line 62, "over-lapping" should read -- overlapping --.

Column 11,
Line 60, "since" should read -- side --; and
Line 66, "lowered" should read -- lowered, --.

Column 12,
Line 66, "edition" should read -- editing --.

Column 13,
Line 4, "of,for" should read -- of, for --;
Line 10, "device" should read -- device, --; and
Line 63, "operation" should read -- operations --.

Column 14,
Line 57, "elements" should read -- element --; and
Line 61, "brignt" should read -- bright --.

Column 15,
Line 34, "maybe" should read -- maybe --; and
Line 57, "correspond" should read -- correspond to --.

Column 16,
Line 5, "will" should read -- will be --;
Line 11, "are a" should read -- area --;
Line 30, "if" should read -- is --; and
Line 54, "sebsequent" should read -- subsequent --.

UNITED STATES PATENT AND TRADEMARK OFFICE
CERTIFICATE OF CORRECTION

PATENT NO. : 6,184,860 B1
DATED : February 6, 2001
INVENTOR(S) : Tadashi Yamakawa It is certified that error appears in the above-identified patent and that said Letters Patent is hereby corrected as shown below:

Column 17,
Line 65, "operation" should read -- operations --;

Column 18,
Line 1, "be" (second occurrence) should be deleted;
Line 7, "edition" should read -- edit --;
Line 46, "operation" should read -- operations --;
Line 50, "builtup" should read -- built up --; and
Line 65, "is" should read -- are --.

Column 19,
Line 3, "feed" should read -- feel --;
Line 13, "feel" should read -- feeling --; and
Line 14, "screen. When" should read -- screen, when --.

Column 20,
Line 28, "$INTO^{10}_H$" should read -- $INTO10_H$ --;
Line 40, "V-RAM" should read -- V-RAM, --;
Line 41, "invalid" should read -- invalid, --; and
Line 45, "which" should read -- which do --.

Column 21,
Line 33, "is" should read -- are --.

Column 22,
Line 35, "edition" should read -- editing --;
Line 36, "edition" should read -- edit --;
Line 45, "system" should read -- systems --; and
Line 58, "edition" should read -- editing --.

Column 23,
Line 10, "method" should read -- methods --.

Column 24,
Line 33, "of" should be deleted;
Line 47, "coordinates" should read -- coordinate --;
Line 61, "$(x_1, Y_1)$" should read -- $(x_1, y_1)$ --; and
Line 67, "suggest" should read -- suggests --.

UNITED STATES PATENT AND TRADEMARK OFFICE
CERTIFICATE OF CORRECTION

PATENT NO.   : 6,184,860 B1
DATED        : February 6, 2001
INVENTOR(S)  : Tadashi Yamakawa It is certified that error appears in the above-identified patent and that said Letters Patent is hereby corrected as shown below:

Column 25,
Line 7, "are" should read -- be --;
Line 8, "date" should read -- data --;
Line 14, "date." should read -- data. --;
Line 25, "cooresponding" should read -- corresponding --;
Line 38, "store" should read -- stores --; and
Line 56, "if" should read -- in --.

Column 26,
Line 1, "disiplay" should read -- display --.

Column 27,
Line 2, "one on" should read -- on one --;
Lines 16, 17 and 39, "points" should read -- points to --;
Line 17, "points" should read -- points to --; and
Line 22, "pointed" should read -- pointed to --.

Column 28,
Line 11, "falls" should read -- fall --;
Line 16, "is" (second occurrence) should read -- in --;
Line 25, "point" should read -- point to --;
Line 28, "It" should read -- ¶ It --; and
Line 30, "can" should be deleted and "operator" should read -- operator can --

Column 29,
Line 3, "edition." should read -- editing. --;
Line 36, "selected, # the" should read -- selected, the --;
Lines 39 and 40, "Numbers" should read -- numbers --;
Line 46, "edition" (both occurrences) should read -- editing --; and
Lines 48, 58 and 59 "edition" should read -- editing --.

UNITED STATES PATENT AND TRADEMARK OFFICE
CERTIFICATE OF CORRECTION

PATENT NO. : 6,184,860 B1
DATED : February 6, 2001
INVENTOR(S) : Tadashi Yamakawa It is certified that error appears in the above-identified patent and that said Letters Patent is hereby corrected as shown below:

Column 30,
Line 8, "if" should read -- is --;
Line 16, "point" should read -- point to --;
Line 42, "set" should read -- sets --;
Lines 49 and 50, "edition" should read -- editing --; and
Line 56, "easily" should read -- easily, --.

Column 31,
Line 21, "edition" should read -- editing --;
Line 32, "points" should read -- points to --;
Line 53, "coordinate" should read -- coordinates --; and
Line 63, "edition" should read -- edit --.

Column 32,
Line 10, "Step," should read -- step, --;
Lines 52 and 57, "edition" should read -- edit --; and
Line 56, "pointing" should read -- pointing to --.

Column 33,
Line 10, "the" should read -- that --;
Line 15, "is" (second occurrence) should read -- be --; and
Line 45, "line ei." should read -- line $e_i$. --.

Column 34,
Line 17, "proceeds" should read -- proceed --; and
Line 62, "souceForm:" should read -- sourceForm: --.

Column 35,
Line 5, "appointing" should read -- appoint --; and
Line 56, "judges" should read -- judged --.

UNITED STATES PATENT AND TRADEMARK OFFICE
CERTIFICATE OF CORRECTION

PATENT NO.   : 6,184,860 B1
DATED        : February 6, 2001
INVENTOR(S)  : Tadashi Yamakawa It is certified that error appears in the above-identified patent and that said Letters Patent is hereby corrected as shown below:

Column 36,
Line 5, "portion" should read -- portions --;
Lines 6 and 34, "is" should read -- are --;
Line 9, "is" should read -- be --; and
Line 61, "one on" should read -- on one --.

Column 37,
Line 23, "make access to" should read -- access --;
Line 28, "in" (first occurrence) should read -- on --;
Line 58, "been interested in by" should read -- interested --;
Line 63, "iamge" should read -- image --; and
Line 65, "is" should read -- be --.

Column 38,
Line 1, "return" should read -- returns --;
Line 26, "make" should be deleted;
Line 35, "FIG. 43E" should read -- FIG. 43D --;
Line 47, "edition" should read -- edit --; and
Line 66, "editorial" should read -- editing --.

Column 39,
Line 33, "resides" should read -- reside --;
Lines 38 and 60, "point" should read -- point to --;
Line 42, "pointing" should read -- pointing to --; and
Line 50, "located." should read -- located in. --.

Column 40,
Line 4, "is" should read -- are --;
Line 57, "for" should read -- of --; and
Line 63, "pointed" should read -- pointed to --.

Column 42,
Line 17, "an" should read -- a --;
Lines 35 and 39, "contain" should read -- contains --;
Line 41, "Therefore," should read -- There is, --; and
Line 45 "of" (first occurrence) should be deleted.

UNITED STATES PATENT AND TRADEMARK OFFICE
CERTIFICATE OF CORRECTION

PATENT NO. : 6,184,860 B1
DATED : February 6, 2001
INVENTOR(S) : Tadashi Yamakawa It is certified that error appears in the above-identified patent and that said Letters Patent is hereby corrected as shown below:

Column 43,
Line 43, "make access to" should read -- access --; and
Line 45, "edition," should read -- edit, --.

Column 44,
Line 14, "maybe" should read -- may be --;
Line 20, "is" should read -- are --;
Line 51, "point" should read -- point to --; and
Line 54, "recognized" should read -- recognize --.

Column 45,
Line 3, "is" should read -- be --; and
Line 14, "point" should read -- point to --.

Column 46,
Line 8, "point" should read -- point to --;
Line 40, "a n" should read -- an --;
Line 43, "a" should read -- as --;
Line 48, "pointed" should read -- pointed to --;
Line 57, "in stance," should read -- instance, -- and "m arks" should read -- marks --;
Line 58, "point" should read -- point to --; and
Line 63, "then" should read -- the --.

Column 47,
Line 11, "points" should read -- points to --;
Line 19, "make access to" should read -- access --;
Line 27, "that" should read -- than --;
Line 42, "pouter" should read -- outer --; and
Lines 48 and 52, "Numbers" should read -- numbers --.

Column 48,
Line 31, "pointing" should read -- pointing to --; and
Line 54, "make access to" should read -- access --.

UNITED STATES PATENT AND TRADEMARK OFFICE
CERTIFICATE OF CORRECTION

PATENT NO. : 6,184,860 B1
DATED : February 6, 2001
INVENTOR(S) : Tadashi Yamakawa It is certified that error appears in the above-identified patent and that said Letters Patent is hereby corrected as shown below:

Column 50,
Line 24, "lined" should read -- lines --;
Line 29, "make" should be deleted;
Line 30, "to" should be deleted; and
Line 33, "are" should read -- be --.

Column 51,
Line 12, "is" should read -- are --;
Line 19, "have" should read -- has --; and
Line 55, "position s of th e" should read -- positions of the --.

Column 52,
Line 4, "b e" should read -- be --; and
Line 40, "them" should read -- the --.

Column 53,
Line 37, "is" should read -- are --.

Column 55,
Line 16, "an" should read -- a --;
Line 39, "an" should be deleted and "(correction." should read -- (correction, --;
Line 43, "points" should read -- points to --; and
Line 47, "pointed" should read -- pointed to --.

Column 56,
Line 3, "edition" should read -- editing --;
Line 12, "th e m arks" should read -- the marks --;
Line 14, "resides" should read -- reside --;
Line 16, "FIG. 76B" should read -- FIG. 76B, --; and
Line 31, "theswitch" should read -- the switch --.

Column 57,
Line 7, "erasion" should read -- erasure --;
Line 20, "pointing" should read -- pointing to --;
Line 51, "this" should read (second occurrence) -- these --.
Line 52, "is" should read -- are --; and
Line 66, "erasion" should read -- erasure --.

UNITED STATES PATENT AND TRADEMARK OFFICE
CERTIFICATE OF CORRECTION

PATENT NO.     : 6,184,860 B1
DATED          : February 6, 2001
INVENTOR(S)    : Tadashi Yamakawa It is certified that error appears in the above-identified patent and that said Letters Patent is hereby corrected as shown below:

Column 58,
Line 8, "points" should read -- points to --;
Line 13, "evasive" should read -- erasure --;
Line 42, "lines appears" should read -- lines appear --;
Line 62, "erasion" should read -- erasure --; and
Line 65, "the" (first occurrence) should be deleted.

Column 59,
Line 8, "Where," should read -- where -- and "represents" should read -- represent --; and
Line 64, "in" should read -- is --

Column 62,
Line 15, "in" should be deleted.

Signed and Sealed this

Nineteenth Day of November, 2002

Attest:

Attesting Officer

JAMES E. ROGAN
Director of the United States Patent and Trademark Office